United States Patent
Hara et al.

(10) Patent No.: US 7,283,893 B2
(45) Date of Patent: Oct. 16, 2007

(54) GROUP ROBOT SYSTEM, AND SENSING ROBOT AND BASE STATION USED THEREFOR

(75) Inventors: Keita Hara, Nara (JP); Masaki Hamamoto, Nara (JP); Yoshiji Ohta, Osaka (JP); Kenji Ohta, Kitakatsuragi-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/440,958

(22) Filed: May 24, 2006

(65) Prior Publication Data

US 2006/0217843 A1  Sep. 28, 2006

Related U.S. Application Data

(62) Division of application No. 10/299,047, filed on Nov. 18, 2002, now Pat. No. 7,082,351.

(30) Foreign Application Priority Data

Nov. 20, 2001 (JP) ............................. 2001-355017

(51) Int. Cl.
*G05B 19/418* (2006.01)
(52) U.S. Cl. ...................... 700/248; 700/250; 700/258; 901/31; 901/33; 901/37; 901/46; 901/47; 318/568.16
(58) Field of Classification Search ............... 700/245, 700/248, 250, 258; 318/568.16; 901/31, 901/33, 37, 46, 47
See application file for complete search history.

(56) References Cited

U.S. PATENT DOCUMENTS 4,954,962 A  9/1990  Evans et al.
5,525,882 A  6/1996  Asaka et al.
6,206,324 B1  3/2001  Smith
6,687,571 B1  2/2004  Byrne et al.
6,791,472 B1 *  9/2004  Hoffberg ............... 340/905
7,082,351 B2 *  7/2006  Hara et al. ............. 700/248

FOREIGN PATENT DOCUMENTS

JP  07-093028  7/1995
JP  8-30327  2/1996
JP  11-168407  6/1999

OTHER PUBLICATIONS

Yamauchi, "Spread Spectrum Communication for Higher Performance of Next Generation", Tokyo Denki Daigaku Shuppan Kyoku, 1994, pp. 43-75, 105-117.

(Continued)

*Primary Examiner*—Thomas Black
*Assistant Examiner*—McDieunel Marc
(74) *Attorney, Agent, or Firm*—David G. Conlin; William J. Daley, Jr.; Edwards, Angell, Palmer & Dodge LLP

(57) ABSTRACT

Communication system of a group robot system is made hierarchical, having a base station as an uppermost layer and a plurality of layers formed by a plurality of sensing robots, and the plurality of sensing robots are controlled such that a sensing robot belonging to an upper layer of the hierarchical structure has higher sensing resolution than a sensing robot belonging to a lower layer of the hierarchical structure. Thus, a group robot system capable of efficiently searching for an object can be obtained.

5 Claims, 40 Drawing Sheets

OTHER PUBLICATIONS

Shirkohdaie, "A control scheme for measure of performance and efficiency of tactical cooperative robots", 2002, Internet, pp. 1-6.

Huang et al., Construction and soccer dynamics analysis for an integrated multi-agen soccer robot system, 2001, Internet, pp. 84-93.

Lee et al., A robot in intelligent environment: Soccer robot, 1999, Internet, pp. 73-78.

Yamauchi, A cooperative hunting behaviour by mobile-robot troops, 1999, Internet, p. 1.

Lumelsky, Decentralized motion planning for multiple mobile robots: The cocktail party model, 1997, Internet, p. 1.

* cited by examiner

FIG.19
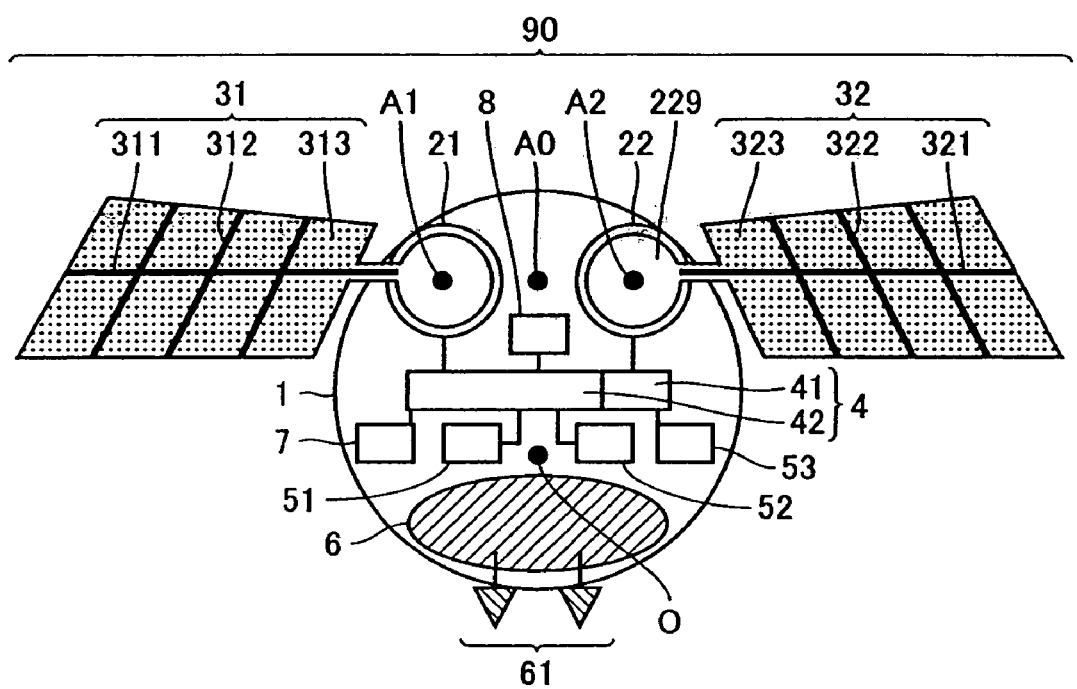
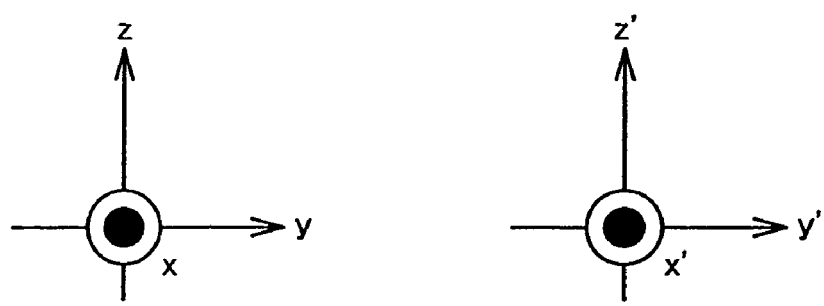

$\tau = 0°$ $\tau = 45°$ $\tau = 90°$ $\tau = 135°$ $\tau = 180°$ $\tau = 225°$ $\tau = 270°$ $\tau = 315°$

FIG.60

|  |  | $x''+$ | $x''-$ | $z''+$ | $z''-$ | $\theta y''+$ | $\theta y''-$ |
|---|---|---|---|---|---|---|---|
| S1 | stroke $\theta$ ↑ |  |  | O |  |  |  |
|  | stroke $\theta$ ↓ |  |  |  | O |  |  |
|  | $-d\theta/dt$ ↑ |  |  | O |  |  |  |
|  | $-d\theta/dt$ ↓ |  |  |  | O |  |  |
|  | $-d\alpha/d\theta > d\alpha_{th}$ | O |  |  |  |  |  |
|  | $-d\alpha/d\theta < d\alpha_{th}$ |  | O |  |  |  |  |
|  | $\beta$ is about vertical to stroke direction. |  |  | O |  |  |  |
|  | $\beta$ is not vertical to stroke direction. |  |  |  | O |  |  |
|  | $\beta > 0$ | O |  |  |  |  |  |
|  | $\beta < 0$ |  | O |  |  |  |  |
| S2 | $-d\beta/dt$ ↑ | O |  | O |  | O |  |
|  | $-d\beta/dt$ ↓ |  | O |  | O |  | O |
| S3 | stroke $\theta$ ↑ |  |  |  | O |  |  |
|  | stroke $\theta$ ↓ |  |  | O |  |  |  |
|  | $d\theta/dt$ ↑ |  |  |  | O |  |  |
|  | $d\theta/dt$ ↓ |  |  | O |  |  |  |
|  | $d\alpha/d\theta > d\alpha_{th}$ |  | O |  |  |  |  |
|  | $d\alpha/d\theta < d\alpha_{th}$ | O |  |  |  |  |  |
|  | $\beta$ is about vertical to stroke direction. |  |  |  | O |  |  |
|  | $\beta$ is not vertical to stroke direction. |  |  | O |  |  |  |
| S4 | $d\beta/dt$ ↑ | O |  |  | O |  | O |
|  | $d\beta/dt$ ↓ |  | O | O |  | O |  |

FIG.61

|  | RIGHT ACTUATOR | | LEFT ACTUATOR | |
|---|---|---|---|---|
|  | DRIVING FREUENCY | FLAPPING MOTION PATTERN | DRIVING FREUENCY | FLAPPING MOTION PATTERN |
| UP | 35Hz | B | 35Hz | B |
| DOWN | 25Hz | B | 25Hz | B |
| GO FORWARD | 30Hz | A | 30Hz | A |
| HOVER | 30Hz | B | 30Hz | B |
| TURN RIGHT | 30Hz | B | 30Hz | A |
| TURN LEFT | 30Hz | A | 30Hz | B |

GROUP ROBOT SYSTEM, AND SENSING ROBOT AND BASE STATION USED THEREFOR

This application is a divisional of co-pending U.S. application Ser. No. 10/229,047, filed Nov. 18, 2002, now U.S. Pat. No. 7,082,351, the teachings of which are incorporated herein by reference.

BACKGROUND OF THE INVENTION

1. Field of the Invention

The present invention relates to a group robot system in which a number of robots searching for an object operate collectively, as well as to a sensing robot and a base station used therefor.

Conventionally, referring to FIG. 62, Japanese Patent Laying-Open No. 8-30327 discloses a single or a plurality of sensor mechanisms for collecting information of external environment, a practical environment recognition system operating in an actual environment and having a hierarchical information processing mechanism generating from sensor information ① from the sensor mechanism, appropriate motion instruction ② for an actuator mechanism, and an intelligent robot. According to this technique, in accordance with the state at the time of sensing, the hierarchical information processing mechanism provides motion instruction ② such that the actuator mechanism appropriately changes position of itself or of an object as well as external environment such as illumination, so that the sensor mechanism functions satisfactorily.

2. Description of the Background Art

In the technique described in Japanese Patent Laying-Open No. 8-30327, the plurality of sensor mechanisms and sensor information processing units from upper to lower orders are always in operation.

In a robot system using other sensing robot, all sensors performs sensing with same sensitivity, that is, the same sensing resolution.

Therefore, when an object of searching is detected, a sensing robot searching in a region far from the object of searching performs the search with the same sensing resolution as that of a sensing robot searching in a region close to the object of searching.

As a result, it has been difficult to alleviate burden resulting from processing the sensor information of the sensing robot and to reduce power consumption of the sensing robot. Further, as all the sensing robots have uniform sensing resolution, it has been impossible to set sensing resolution of a specific sensing robot. Therefore, it has been difficult to set higher the sensing resolution after detecting the object of searching and to grasp detailed overall information of the object of searching in a short time period.

Therefore, in the conventional group robot system, it has been difficult to efficiently search for the object.

An object of the present invention is to provide a group robot system capable of efficiently inspecting an object when an object of searching is detected, as well as to provide a sensing robot and a base station used therefor.

SUMMARY OF THE INVENTION

According to a first aspect, the present invention provides a group robot system, including a plurality of sensing robots used for searching for an object, and a base station controlling the plurality of sensing robots, wherein the plurality of sensing robots are controlled such that manner related to searching for the object differ dependent on the distance from the base station.

Because of this configuration, the plurality of sensing robots are controlled such that the manner related to searching for the object differ in accordance with the distance from the base station, and therefore efficient searching of the object becomes possible.

In the group robot system in accordance with the first aspect of the present invention, the manner related to searching for the object may be the sensing resolution of each of the plurality of sensing robots.

Because of this configuration, the sensing resolution of each sensing robot may be adjusted in accordance with the distance from the base station, and efficient searching of the object becomes possible.

In the group robot system in accordance with the first aspect of the present invention, the plurality of sensing robots may consist of a plurality of groups in accordance with the distance from the base station, and sensing resolutions of the plurality of sensing robots may be controlled such that the sensing robots of the group close to the base station have higher resolution than the sensing robots of the group far from the base station.

According to the above described configuration, sensing resolution of sensing robots are set higher in a group closer to the base station, and hence efficient searching of the object becomes possible.

In the group robot system in accordance with the first aspect of the present invention, sensing resolution of the plurality of sensing robots may be controlled such that a sensing robot closer to the base station has higher resolution than a sensing robot far from the base station.

According to the above described configuration, sensing resolution of a sensing robot closer to the base station is set higher, and hence efficient searching of the object becomes possible.

In the group robot system in accordance with the first aspect of the present invention, the manner related to searching of the object may be the speed of movement of each of the plurality of sensing robots.

In accordance with the above described configuration, the speed of movement of each sensing robot is adjusted in accordance with the distance from the base station, and efficient searching of the object is performed.

In the group robot system in accordance with the first aspect of the present invention, the plurality of sensing robots may consist of a plurality of groups in accordance with the distance from the base station, and the speed of movement of the plurality of sensing robots may be controlled such that the speed of the sensing robots in a group close to the base station is slower than the speed of the sensing robots of the group far from the base station.

By the above described configuration, the speed of movement of the sensing robots is set higher in a group closer to the base station, and efficient searching of the object becomes possible.

In the group robot system in accordance with the first aspect of the present invention, the speed of movement of the plurality of sensing robots may be controlled such that the speed of a sensing robot close to the base station is slower than sensing robot far from the base station.

By the above described configuration, the speed of movement of the sensing robot closer to the base station is set slower than sensing robot far from the base station, and efficient searching of the object becomes possible.

In the group robot system in accordance with the first aspect of the present invention, the sensing robot is a fluttering sensing robot that can fly through fluttering motion, and the manner of searching for an object may be the frequency of fluttering motion of the plurality of fluttering sensing robots.

In accordance with the above described configuration, the fluttering frequency of fluttering motion of each of the fluttering sensing robot is adjusted in accordance with the distance from the base station, and efficient searching of an object becomes possible.

In the group robot system in accordance with the first aspect of the present invention, the plurality of fluttering sensing robots may consist of a plurality of groups in accordance with the distance from the base station, and frequency of fluttering motion of the plurality of fluttering sensing robots may be controlled such that the frequency of the fluttering sensing robots in a group close to a base station is smaller than that of the fluttering sensing robots of a group far from the base station.

In accordance with the above described configuration, the fluttering frequency of fluttering motion of each of the fluttering sensing robot is made smaller in a group closer to the base station, and efficient searching of an object becomes possible.

In the group robot system in accordance with the first aspect of the present invention, the frequency of fluttering motion of the plurality of fluttering sensing robots may be controlled such that the frequency of the fluttering sensing robot closer to a base station is smaller than that of the robot far from the base station.

In accordance with the above described configuration, the fluttering frequency of fluttering motion of the fluttering sensing robot closer to the base station is made smaller, and efficient searching of an object becomes possible.

The sensing robot in accordance with the first aspect of the present invention searches for an object under the control of a base station, and when a plurality of sensing robots searches for an object, the manner related to search for an object of the plurality of sensing robot can be controlled such that the manner differ from each other, in accordance with the distance from the base station.

By such a configuration, the plurality of sensing robots are controlled such that the manner related to searching for an object differ in accordance with the distance from the base station, and efficient searching of the object becomes possible.

The base station in accordance with the first aspect of the present invention controls the plurality of sensing robots searching for an object, and it is capable of controlling the plurality of sensing robots such that the manner related to searching for the object of the plurality of sensing robots differ from each other, in accordance with the distance from the base station.

By the above described configuration, a plurality of sensing robots are controlled such that the manner related to searching of the object differ in accordance with the distance from the base station, and efficient searching of the object becomes possible.

According to a second aspect, the present invention provides a group robot system including a plurality of sensing robots used for searching for an object, and a base station for controlling the plurality of sensing robots, wherein a communication system of the group robot system has a hierarchical structure in which the base station is the highest layer and the plurality of sensing robots constitute a plurality of layers, and in the hierarchical structure, information related to control of each of the plurality of sensing robots is transmitted from the base station to each of the plurality of sensing robots successively to the lower side of the hierarchical structure, and from each of the plurality of sensing robots, information related to searching of the object of each of the plurality of sensing robots is transmitted to the base station successively upward through the hierarchical structure, so that the sensing robots are controlled such that the manner related to searching of the object differ in accordance with the layer of the hierarchical structure.

By the above described configuration, the plurality of sensing robots are controlled such that the manner related to searching of the object differ in accordance with the layer of the hierarchical structure, and efficient searching of the object becomes possible. Further, as communication takes place in the hierarchical structure, the distance of communication between each of the sensing robots or between the base station and the sensing robots can be made shorter as compared with the one-to-one communication between the base station and the sensing robot. Therefore, the scope of search while the base station is in a stationary state can be made wider, while reducing the size or weight of the communication mechanism of each sensing robot.

In the group robot system in accordance with the second aspect of the present invention, the manner related to searching of the object may be sensing resolution of the sensing robot.

By the above described configuration, as the sensing resolution of each of the plurality of sensing robots is adjusted in accordance with the layer of the hierarchical structure, efficient searching of the object becomes possible.

In the group system in accordance with the second aspect of the present invention, the plurality of sensing robots may consist of a plurality of groups in accordance with the layer of the hierarchical structure, and the sensing resolution of the plurality of sensing robots may be controlled such that the sensing robots of a group of a higher layer of the hierarchical structure has higher resolution than the sensing robots in the group of the lower layer of the hierarchical structure.

By the above described configuration, the sensing resolution of each of the plurality of sensing robots is set such that the resolution is higher in a group of a higher layer of the hierarchical structure, and efficient searching of an object becomes possible.

In the group robot system in accordance with the second aspect of the present invention, the sensing resolution of the plurality of sensing robots may be controlled such that a sensing robot of a higher layer of the hierarchical structure has higher resolution than a sensing robot of lower layer of the hierarchical structure.

By the above described configuration, the sensing resolution of each of the plurality of sensing robots is set such that a sensing robot belonging to a higher layer of the hierarchical structure has higher resolution, and efficient searching of an object becomes possible.

In the group robot system in accordance with the second aspect of the present invention, the manner related to searching of an object may be the speed of movement of the sensing robot.

By such a configuration, as the speed of movement of each of the plurality of sensing robots is adjusted in accordance with the layer of the hierarchical structure, efficient searching of an object becomes possible.

In the group robot system in accordance with the second aspect of the present invention, the plurality of sensing robots consist of a plurality of groups in accordance with respective layers of a hierarchical structure, and the speed of movement of the plurality of sensing robots may be controlled such that a sensing robot of a group of a higher layer of the hierarchical structure is slower than the sensing robot of a group of a lower layer of the hierarchical structure.

By the above described configuration, as the speed of movement of each of the plurality of sensing robots is made such that the speed is slower in the group belonging to a higher layer of the hierarchical structure, efficient searching of an object becomes possible.

In the group robot system in accordance with the second aspect of the present invention, the speed of movement of the plurality of sensing robots may be controlled such that a sensing robot of a higher layer of the hierarchical structure is slower than the sensing robot of a lower layer of the hierarchical structure.

By the above described configuration, as the speed of movement of each of the plurality of sensing robots is made such that the speed of a sensing robot in the group belonging to a higher layer of the hierarchical structure is slower, efficient searching of an object becomes possible.

In the group robot system in accordance with the second aspect of the present invention, the sensing robot is a fluttering sensing robot that can fly through fluttering motion, and the manner of searching for an object may be the frequency of fluttering motion of the plurality of fluttering sensing robots.

By the above described configuration, the frequency of fluttering motion of each of the plurality of fluttering sensing robots is adjusted in accordance with the layer of the hierarchical structure, and efficient searching of an object becomes possible.

In the group robot system in accordance with the second aspect of the present invention, the plurality of fluttering sensing robots may consist of a plurality of groups in accordance with the layer of hierarchical structure, and frequency of fluttering motion of the plurality of fluttering sensing robots may be controlled such that a fluttering sensing robot of a group of a higher layer of the hierarchical structure has smaller frequency than the fluttering sensing robot of a group of a lower layer of the hierarchical structure.

By the above described configuration, the frequency of fluttering motion of each of the plurality of fluttering sensing robots is made smaller in a group belonging to a higher layer of the hierarchical structure, and efficient searching of an object becomes possible.

In the group robot system in accordance with the second aspect of the present invention, the frequency of fluttering motion of the plurality of fluttering sensing robots may be controlled such that a fluttering sensing robot of a higher layer of the hierarchical structure has smaller frequency than a fluttering sensing robot of a lower layer of the hierarchical structure.

By the above described configuration, the frequency of fluttering motion of each of the plurality of fluttering sensing robots of a higher layer of the hierarchical structure is made smaller, and efficient searching of an object becomes possible.

The sensing robot in accordance with the second aspect of the present invention searches for an object under control of a base station, and used in a group robot system in which a communication system is set as a hierarchical structure in which the base station is the uppermost layer and the plurality of sensing robots constitute a plurality of layers, and the robot has a function of transmitting information related to searching of the object of the sensing robot belonging to layer lower than itself to a higher layer of the hierarchical structure, and the function of transmitting information related to an operation of a sensing robot belonging to a layer lower than itself, to a layer lower by one, of the hierarchical structure, and when an object is searched, manner related to searching of an object among the plurality of sensing robot can be controlled by the base station such that the manner differ from each other in accordance with the layer of the hierarchical structure.

By the above described configuration, the plurality of sensing robots are controlled such that the manner related to searching of the object differ in accordance with the layer of the hierarchical structure, and efficient searching of the object becomes possible. Further, as communication takes place in the hierarchical structure, the distance of communication between each of the sensing robots or between the base station and the sensing robots can be made shorter as compared with the one-to-one communication between the base station and the sensing robot. Therefore, the scope of search while the base station is in a stationary state can be made wider, while reducing the size or weight of the communication mechanism of each sensing robot.

The base station in accordance with the second aspect of the present invention controls a plurality of sensing robots so that the robots search for an object, used in a group robot system in which a communication system of the group robot system has a hierarchical structure in which the base station is the highest layer and the plurality of sensing robots constitute a plurality of layers, and in the hierarchical structure, information related to control of each of the plurality of sensing robots is transmitted from the base station to each of the plurality of sensing robots successively to the lower side of the hierarchical structure, and from each of the plurality of sensing robots, information related to searching of the object of each of the plurality of sensing robots is transmitted to the base station successively upward through the hierarchical structure, and the base station can control the plurality of sensing robots such that the manner related to searching of the object differ in accordance with the layer of the hierarchical structure.

By the above described configuration, the plurality of sensing robots are controlled such that the manner related to searching of the object differ in accordance with the layer of the hierarchical structure, and efficient searching of the object becomes possible. Further, as communication takes place in the hierarchical structure, the distance of communication between each of the sensing robots or between the base station and the sensing robots can be made shorter as compared with the one-to-one communication between the base station and the sensing robot. Therefore, the scope of search while the base station is in a stationary state can be made wider, while reducing the size or weight of the communication mechanism of each sensing robot.

According to the third aspect, the present invention provides a group robot system including a sensing robot used for searching of an object, and a base station for controlling the sensing robot, in which the sensing robot is controlled such that the manner related to searching of an object is changed in accordance with the stage of searching of the object.

By the above described configuration, the manner related to searching of an object of the sensing robot is changed in accordance with the stage of searching for the object, and efficient searching of an object becomes possible.

In the group robot system in accordance with the third aspect of the present invention, the manner related to the search of the object may be sensing resolution of the sensing robot.

By the above described configuration, the sensing resolution of the sensing robot is changed in accordance with the stage of searching of the object, and efficient searching of an object becomes possible.

In the group robot system in accordance with the third aspect of the present invention, the manner related to searching of an object may be the type of a detection sensor of the sensing robot, or a method of processing sensor information.

By the above described configuration, the type of the detection sensor or the sensor information of the sensing robot is changed in accordance with the stage of searching of the object, and efficient searching of an object becomes possible.

In the group robot system in accordance with the third aspect of the present invention, the aforementioned stage of searching of the object may be the stage of detection of the object by the sensing robot.

By the above described configuration, when the sensing robot detects the object, the manner related to searching of the object is changed, and therefore, after the sensing robot detects the object, efficient searching of the object becomes possible.

In the group robot system in accordance with the third aspect of the present invention, among the plurality of sensing robots, the manner related to searching of an object of that sensing robot which has detected the object may be changed.

By the above described configuration, the manner related to searching of an object of the sensing robot that has detected the object is changed, and therefore, efficient searching of an object becomes possible.

In the group robot system in accordance with the third aspect of the present invention, among the plurality of sensing robots, the manner related to the searching of the object of those sensing robots that are positioned around the sensing robot that has detected the object may be changed.

By this configuration, as the manner of search of an object of the sensing robot that has detected the object is changed, and efficient searching of the object becomes possible.

In the group robot system in accordance with the third aspect of the present invention, the stage of searching of the object may be the stage where the sensing robot cease to detect the object.

By the above described configuration, the manner related to searching of the sensing robot is changed when detection of an object is stopped, and therefore, after detection of the object is stopped, efficient searching of the object becomes possible.

In the group robot system in accordance with the third aspect of the present invention, among a plurality of sensing robots, the manner related to searching of an object of that sensing robot which ceases to detect the object may be changed.

By the above described configuration, the manner related to searching of an object of the sensing robot that ceases to detect the object is changed, and therefore, after detection of the object is stopped, efficient searching of the object becomes possible.

In the group robot system in accordance with the third aspect of the present invention, among the plurality of sensing robots, the manner related to searching of an object of sensing robot positioned in a region around the sensing robot that ceases to detect the objects may be changed.

By the above described configuration, the manner related to searching of an object of sensing robot positioned in the region around the sensing robot that ceases to detect the object is changed, and efficient searching of an object becomes possible.

According to the third aspect of the present invention, the sensing robot searches for an object under the control of a base station, and the sensing robot is controlled such that the manner related to searching of an object of the sensing robot is changed by the base station in accordance with the stage of searching of the object.

By the above described configuration, the manner related to searching of an object of the sensing robot is changed in accordance with the stage of the search of the object, and efficient searching of an object becomes possible.

According to the third aspect of the present invention, the base station controls a plurality of sensing robots searching for an object, and controls the sensing robots such that the manner related to searching of an object by the sensing robot change in accordance with the stage of searching of the object.

By the above described configuration, the manner related to searching of an object of the sensing robot is changed in accordance with the stage of searching of the object, and efficient searching of an object becomes possible.

According to a fourth aspect, the present invention provides a group robot system including a plurality of sensing robots used for searching for an object, and a base station for controlling the plurality of sensing robots, wherein the plurality of sensing robots search for an object, moving along with the movement of the base station, while maintaining a tolerable range of positional relation with the base station.

By such a configuration, the plurality of sensing robots search for an object while moving along with movement of the base station, with tolerable range of positional relation with the base station being maintained, and therefore, efficient searching of an object becomes possible.

In the group robot system in accordance with the fourth aspect of the present invention, preferably, the plurality of sensing robots move while maintaining tolerable range of positional relation with each other.

By the above described configuration, the plurality of sensing robots move while maintaining tolerable range of positional relation with each other, and therefore, more efficient searching of an object becomes possible.

In the group robot system in accordance with the fourth aspect of the present invention, preferably, the plurality of sensing robots are set to move in such an arrangement in that the base station is positioned at the center of concentric circles, when the plurality of sensing robots are arranged concentrically.

By the above described configuration, the plurality of sensing robots move arranged in such a state in that the base station is positioned at the center of concentric circles with the plurality of sensing robots arranged concentrically, and therefore, more efficient searching of an object becomes possible.

In the group robot system in accordance with the fourth aspect of the present invention, preferably, the base station is set to move toward an object, when a sensing robot detects the object.

By the above described configuration, when a sensing robot detects an object, the base station moves toward the object, and hence more efficient searching of an object becomes possible.

In the group robot system in accordance with the fourth aspect of the present invention, preferably, the base station moves such that there is no gap and no overlap between the search area of each of the plurality of sensing robots.

By the above described configuration, the base station moves such that there is no gap and no overlap generated between search areas of the plurality of sensing robots, and therefore, more efficient searching of an object becomes possible.

In the fourth aspect, the sensing robots search for an object under the control of the base station, and when an object is searched by a plurality of sensing robots, the robots are controlled by the base station such that the robots move along with the movement of the base station while searching for the object, maintaining a tolerable range of positional relation with the base station.

By the above described configuration, the plurality of sensing robots move along with the movement of the base station, searching for an object, while maintaining a tolerable range of positional relation with the base station, and therefore, efficient searching of an object becomes possible.

According to the fourth aspect of the present invention, the base station controls a plurality of sensing robots used for searching for an object, and controls the plurality of sensing robots such that the robots move along with the movement of the base station while maintaining a tolerable range of positional relation with the base station, searching for the object.

By the above described configuration, the plurality of sensing robots move along with the movement of the base station, to search for an object, while maintaining a tolerable range of positional relation with the base station, and therefore, efficient searching of an object becomes possible.

According to a fifth aspect, the present invention provides a group robot system including a plurality of sensing robots used for searching for an object, and a base station for controlling the plurality of sensing robots, wherein the plurality of sensing robots are controlled such that the manner related to searching of the object of each of the plurality of sensing robots is independent from each other.

By the above described configuration, the manner related to searching of the object of each of the plurality of sensing robots can be controlled independently, and efficient searching of an object becomes possible.

In the group robot system in accordance with the fifth aspect of the present invention, when the manner related to searching of an object of each of the plurality of sensing robots is controlled independently, the manner related to searching of the object of each of the plurality of sensing robots may be controlled to be a in different fixed state, dependent on the environment.

By the above described configuration, the manner related to searching of an object of each of the plurality of sensing robots is controlled such that the manner is fixed differently in accordance with the environment, and efficient searching of an object becomes possible.

The sensing robot in accordance with the fifth aspect of the present invention is used for searching for an object under the control of a base station, and when a plurality of sensing robots are used for searching for an object, the manner related to searching of the object is controlled independently from other sensing robots.

By the above described configuration, as the manner of searching of the object is controlled independently for each of the plurality of sensing robots, efficient searching of an object becomes possible.

The base station in accordance with the fifth aspect of the present invention controls a plurality of sensing robots used for searching for an object, and it is capable of controlling, when a plurality of sensing robots search for the object, the manner related to searching of the object of each of the plurality of sensing robots independently.

By the above described configuration, the manner related to searching of an object of each of the plurality of sensing robots can be controlled independently, and efficient searching of an object becomes possible.

A program for operating the above described sensing robot or the base station is executed by a computer, and the sensing robot or the base station functions in the group robot system. The program may be recorded on a recording medium such as a CD-ROM and read by the sensing robot, or it may be installed from an information network such as the Internet and read by the robot.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a front view showing a structure of the fluttering sensing robot in accordance with an embodiment of the invention.

FIG. 60 is a table representing correspondence between change in the manner of fluttering of a left wing and the resulting change in the state of flight.

FIG. 61 is a table representing combinations of patterns of the manner of fluttering to realize basic operations of fluttering flight.

DESCRIPTION OF THE PREFERRED EMBODIMENTS

The group robot system including sensing robots and a base station in accordance with an embodiment will be described with reference to FIGS. 1 to 17. In the present embodiment, by way of example, a group robot system will be described, which searches for a heat source such as a fire or a person, searches for toxic gas such as CO or toxic radiation, searching for metal such as land mine, or collects three-dimensional image data for collecting VR data for urban planning within an area of as small as several meters square up to as large as several kilometers square.

According to the present embodiment, when toxic gas is to be searched for in a whole town, the group robot system do not search for the gas over all the urban areas at one time, but a group of fluttering sensing robots for searching with a base station placed at the center of concentrical circles searches for the object in each of a number of divided areas of the town. When the group of fluttering sensing robots finishes searching of the toxic gas or toxic radiation of one of the divided areas of the town mentioned above, the base station starts free movement to start searching in the next one of the divided areas of the town, and the base station stops when it reaches the target area of the town.

Following the movement of the base station, pheromone robots and sensing robots start movement. When the base station stops its movement in the next area of the town, the group of sensing robots searches for the toxic gas or the toxic radiation of the divided area of the town, with the base station being the center of concentric circles. In this manner, according to the present embodiment, the group of a plurality of sensing robots search in a divided area transmits the result of searching to the base station and when searching of an area is completed, the group of robots moves with the base station being the center, and searches in the next area. By repeating this operation of movement, the whole area is searched. At this time, when the group of fluttering sensing robots moves such that there is no gap or overlapping between the scope of search of each of the plurality of fluttering sensing robots, efficient searching becomes possible.

The group robot system in accordance with the present embodiment will be described with reference to FIGS. 1 to 22. The group robot system 100 used for the present embodiment consists of a base station BS, a plurality of fluttering sensing robots CS, and a plurality of fluttering pheromone robots FE, as shown in FIG. 1.

Figure 1:
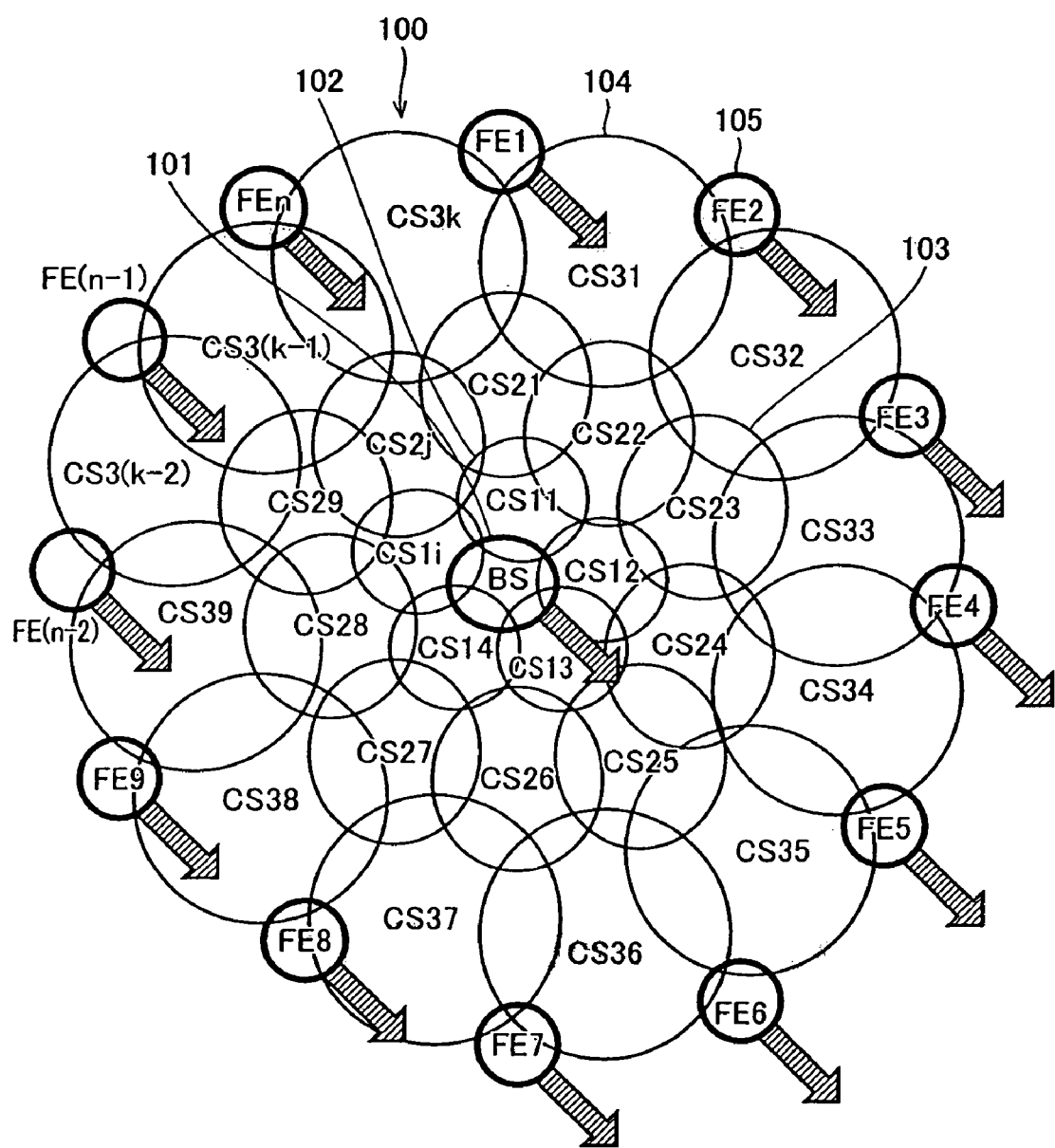
FIG. 1 shows the group robot system in accordance with an embodiment of the invention.
Figure 7:
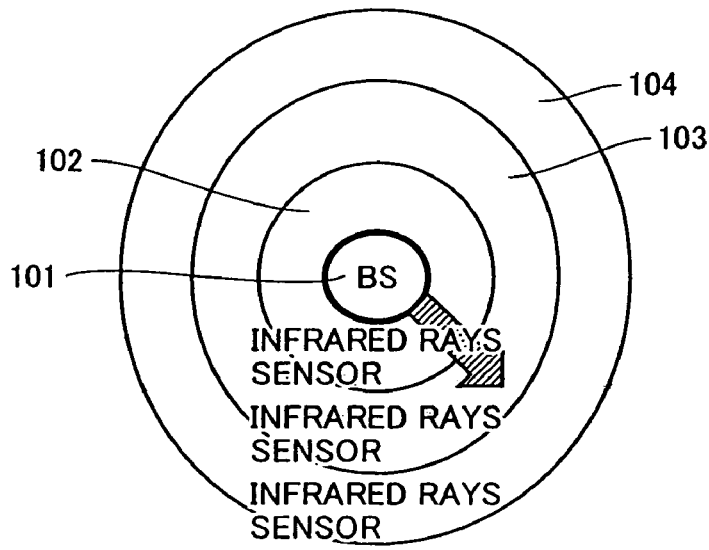
FIGS. 7 to 9 represent relation between change in selected sensor and hierarchical structure of communication, before and after detection of the object by a fluttering sensing robot of the group robot system in accordance with the present embodiment.

FIG. 1 is a schematic illustration of the overall image of the robot group. FIG. 7 shows relation between the position and hierarchical structure in communication between each of the sensing robots CS and between the sensing robot CS and the base station BS in the group robot system. In the present embodiment, the plurality of fluttering sensing robots CS is divided into three groups, that is, a group 102 (CS11 to CS1$i$) closest to the base station BS, a group 103 (CS21 to CS2$j$) second closest to the base station, and a group 104 (CS31 to CS3$k$) farthest from the base station. Though the robots are divided into three groups in the present embodiment, the number of groups is not limited to three, and what is necessary is that there is a plurality of groups.

Figure 2:
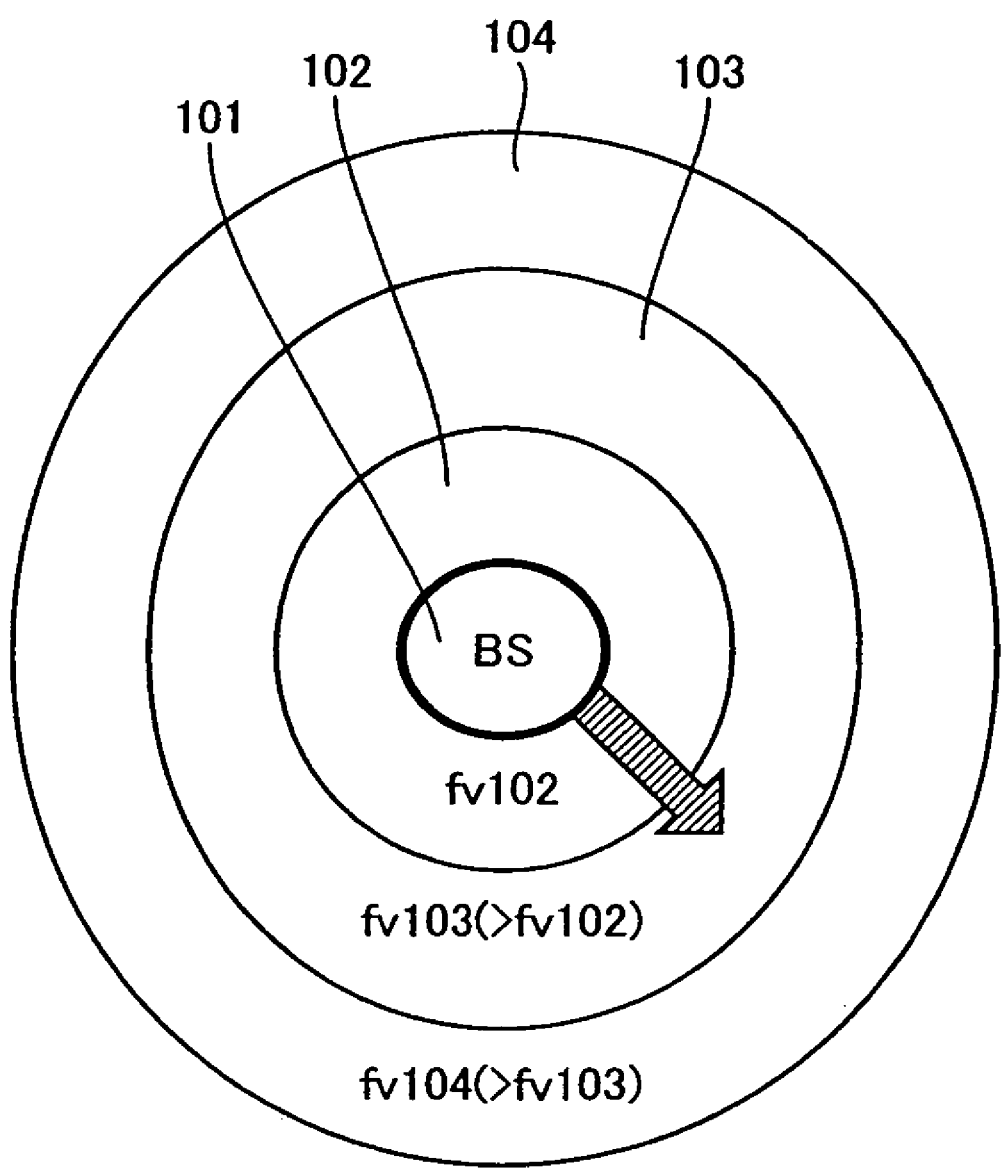
FIG. 2 represents relation between fluttering frequency and position of fluttering sensing robots in the group robot system of the present embodiment.

FIG. 2 shows relation between position and fluttering frequency fv between each of the sensing robots CS and between each sensing robot CS and the base station BS, of the group robot system.

The distance of movement per unit time of a fluttering sensing robot 104 (CS31 to CS3$k$) farthest from the base station BS is larger than that of the sensing robot 103 (CS21 to CS2$j$) that are second farthest. In other words, fluttering frequency fv104 of fluttering sensing robot 104 (CS31 to CS3$k$) is larger than fluttering frequency fv103 of fluttering sensing robot 103 (CS21 to CS2$j$).

Similarly, the distance of movement per unit time of sensing robot 103 (CS21 to CS2$j$) is larger than that of sensing robot 102 (CS11 to CS1$i$) closest to the base station BS. In other words, fluttering frequency fv103 of fluttering sensing robot 103 (CS21 to CS2$j$) is larger than fluttering frequency fv102 of fluttering sensing robot 102 (CS11 to CS1$i$).

Therefore, in the present embodiment, sensing robots CS of lower layer having larger fluttering frequency, that is, the sensing robots belonging to the layer farther from the base station, move faster and have lower resolution.

Figure 3:
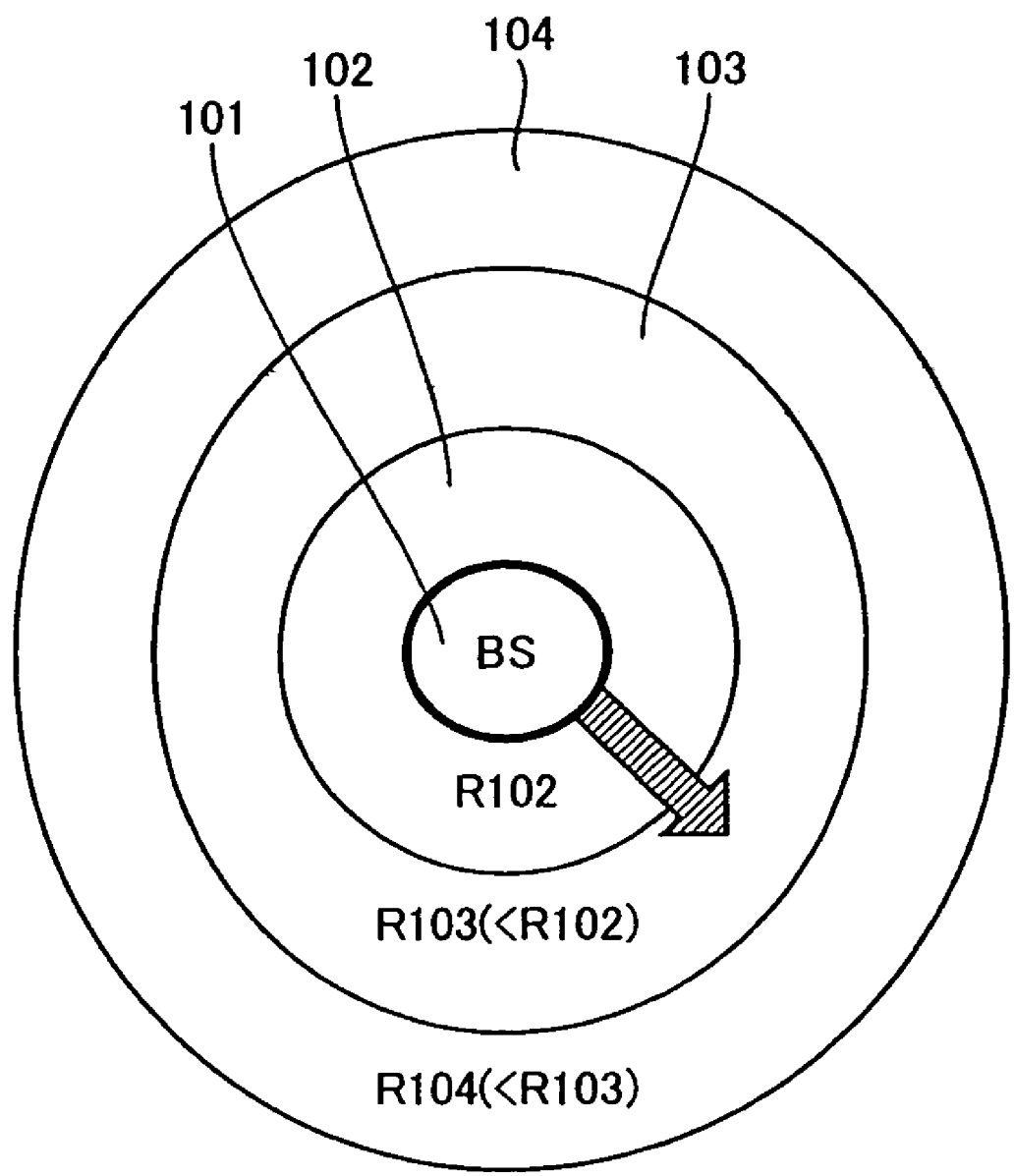
FIG. 3 represents relation between magnitude of resolution and position of fluttering sensing robots of the group robot system in accordance with the present embodiment.

FIG. 3 represents relation between position and sensing resolution R between each of the sensing robots CS and between the sensing robot CS and the base station BS of the group robot system.

Assume that sensor accuracy and sampling rate are the same among all sensing robots CS. From the relation between the position of the robots and the distance of movement per unit time described above, the sensing resolution is as follows. Namely, spatial resolution R104 for detecting an object of sensing robot 104 (CS31 to CS$k$) farthest from base station BS101 is lower than resolution R103 for detecting an object of fluttering sensing robot 103 (CS21 to CS2$j$) that is the second farthest from base station. Specifically, fluttering sensing robot 104 (CS31 to CS3$k$) farthest from the base station BS101 has lower accuracy of position detection for detecting the object, or lower precision of measurements of the size of an obstacle, as compared with fluttering sensing robot 103 (CS21 to CS2$j$) that is the second farthest.

Similarly, assuming that sensor accuracy and sampling rate are the same among all sensing robots, because of the relation between the position of the robots and the distance of movement per unit time described above, the spatial resolution R103 for detecting an object of fluttering sensing robot 103 (CS21 to CS2$j$) is lower than spatial resolution R102 for detecting an object of fluttering sensing robot 102 (CS11 to CS1$i$) that is closest to the base station BS101. Specifically, sensing robot 103 (CS21 to CS2$j$) has lower accuracy of position detection for detecting an object and lower precision of measurements of the size of the obstacle, as compared with fluttering sensing robot 102 (CS11 to CS1$i$) that is closest to the base station BS101.

In the example above, spatial resolution is different because of the difference in distance of movement per unit time (speed of movement), with the sampling rate being the same. When all the fluttering sensing robots move approximately at the same speed, the spatial resolution may be made different by changing sampling rate.

When a sensing robot CS detects an object, presence/absence of the object, position information and the like are transmitted to base station BS101 through a method which will be described later. Based on the transmitted information, base station BS101 starts free movement toward the object. As base station BS101 moves, sensing robots CS positioned approximately concentrically also move toward the object. A sensing robot CS closer to base station BS, that is, the higher layer of the hierarchical structure, has higher spatial resolution. Therefore, as the base station BS comes closer to the object, accuracy of position detection for detecting the object or sensing information related to the size of an obstacle that is to be transmitted to base station BS, becomes higher.

Alternatively, the following approach may be possible. Namely, when a sensing robot detects an object, the robot that has detected the object comes to have higher resolution, and at the same time, presence/absence of the object, position information and the like are transmitted to base station BS101 by the method which will be described later.

Figure 4:
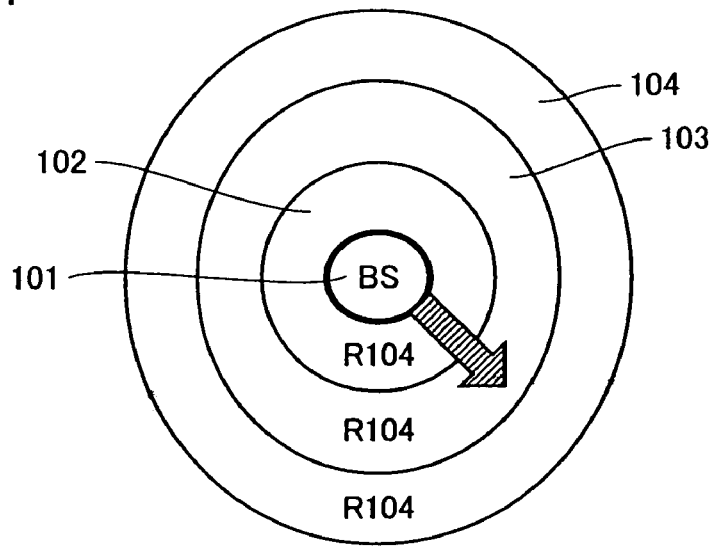
FIGS. 4 to 6 represent relation between time-change in sensing resolution and position, before and after detection of an object by a fluttering sensing robot of the group robot system in accordance with the present embodiment.

FIG. 4 shows an example of the relation between position and time-change sensing resolution R before and after detection of an object 106 between each of the sensing robots CS and between the sensing robot CS and the base station BS of the group robot system.

Figure 5:
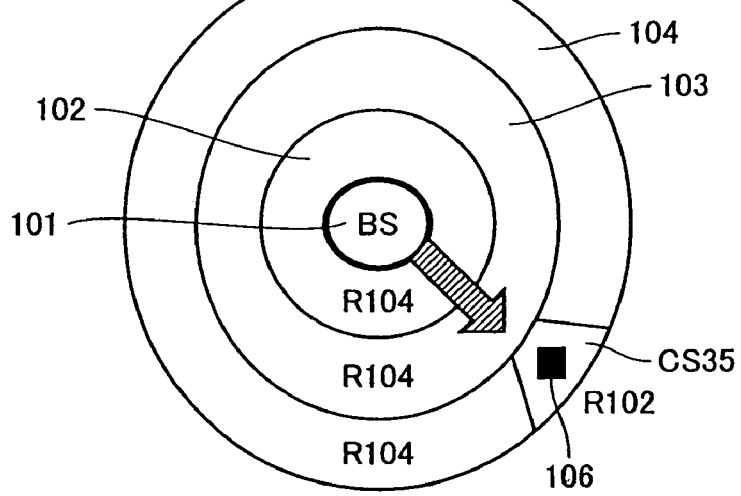

Before detection of the object, referring to FIG. 4, sensing resolution of the sensing robot group is R104. When a sensing robot CS35 of the outermost layer detects object 106, sensing resolution of sensing robot CS35 is changed to R102 (>R104) as shown in FIG. 5. More specifically, after detection of object 106, sensing robot CS35 that has detected the object comes to have higher spatial resolution R by increasing sampling rate, or comes to have higher sensing resolution R by decreasing fluttering frequency so as to lower the speed of movement.

Figure 6:
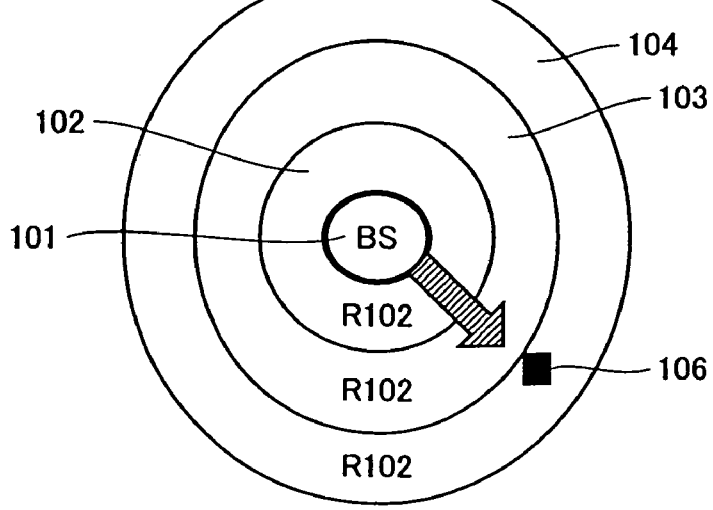

Thereafter, when an object detection signal indicating detection of an object is transmitted to base station, the base station instructs all sensing robots CS to set spatial resolution higher by increasing sampling rate, or to increase resolution by decreasing fluttering frequency so as to slower the speed of movement. Thus, sensing resolution R of all the sensing robots CS is changed to R102 (>R104) as shown in FIG. 6. At this time, sensing resolution R of only that sensing robot CS35 that has detected the object may be set higher.

After detection of object 106, information of position detection of the object or information related to the size of the obstacle that is of higher precision, is transmitted to the base station.

Alternatively, the sensing robot may utilize ultrasonic sensor or infrared sensor until detection of the object, and when a sensing robot detects the object, the sensing robot that has detected the object may switch the sensor type to a CCD (Charge Coupled Device) or to a CMOS (Complementary Metal Oxide Silicon) image sensor, so as to enable transmission of more detailed image information of the object.

FIG. 7 shows an example of position and time-change of the sensor selected before and after detection of object 106 between each of the sensing robots CS and between the sensing robot CS and the base station BS of the group robot system.

Figure 8:
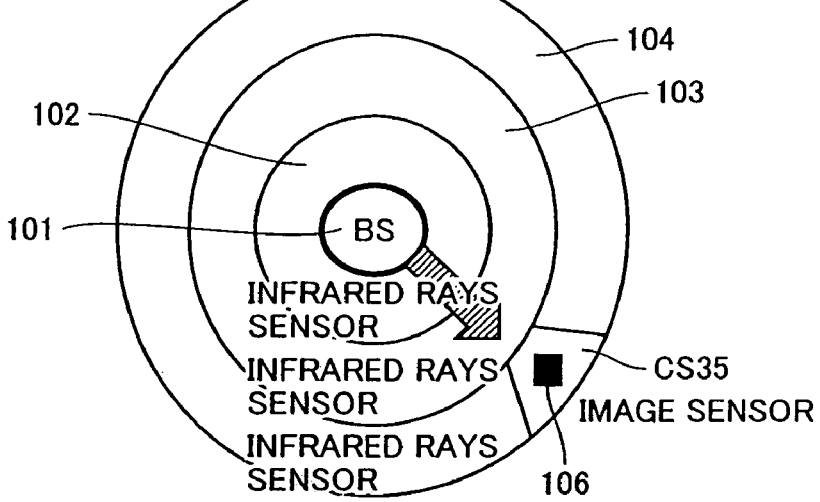
Figure 9:
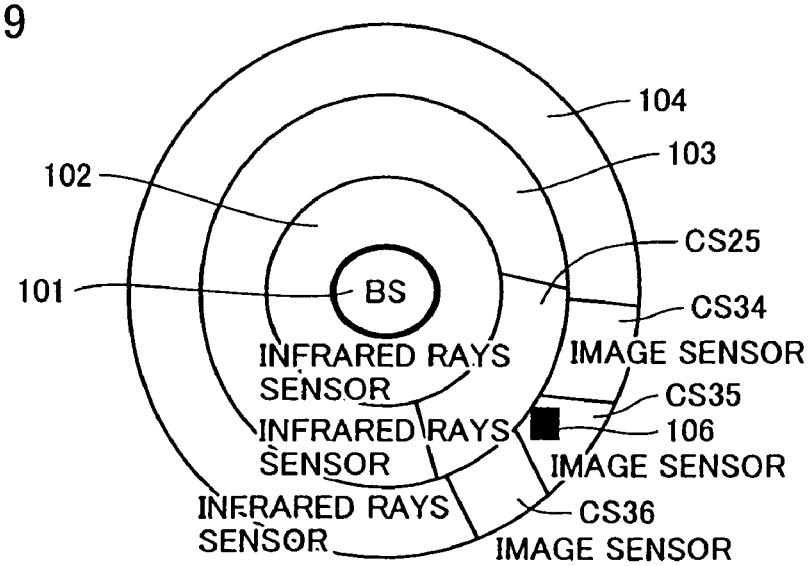

Before detecting an object, the sensor of the sensing robot group is an infrared detection sensor as shown in FIG. 7. Then, when a sensing robot CS35 the outermost layer detects object 106, sensing robot CS35 switches the sensor from the infrared detection sensor to a CMOS image sensor, as shown in FIG. 8.

Thereafter, presence/absence of the object detected by sensing robot CS35, position information and the like are transmitted to base station BS101 by the method, which will be described later, and the sensor type of sensing robots CS34 and CS36 around the object 106 governed by a sensing robot CS25 of higher layer to which sensing robot CS35 that has detected the object belongs, is switched from the infrared detection sensor to the CMOS image sensor (or CCD). In this manner, it becomes possible to transmit detailed overall image of the object efficiently in a short time.

Figure 10:
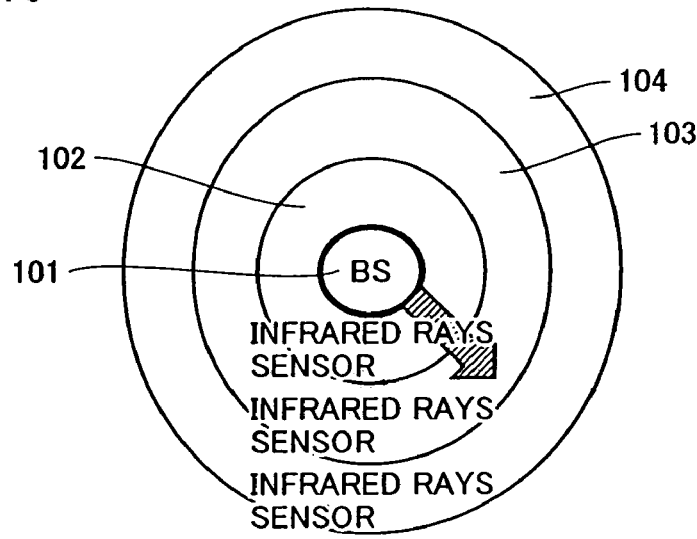
FIGS. 10 to 12 represent relation between change in selected sensor and hierarchical structure of communication, before and after detection of the object by a fluttering sensing robot of the group robot system in accordance with the present embodiment.
Figure 11:
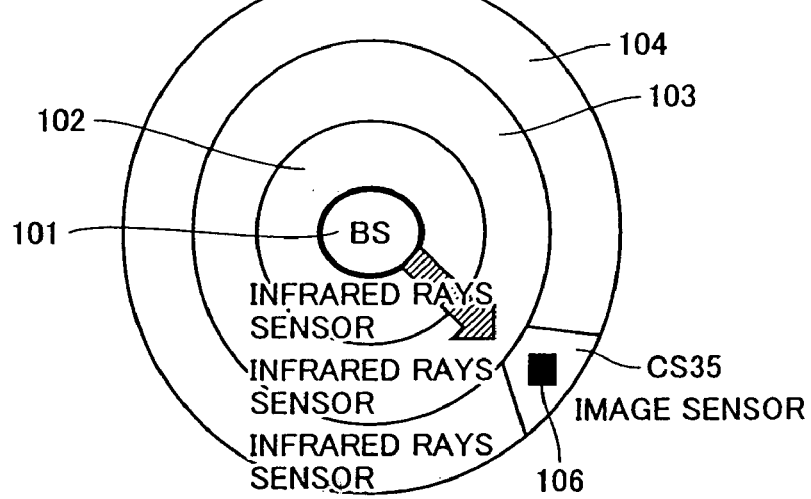
Figure 12:
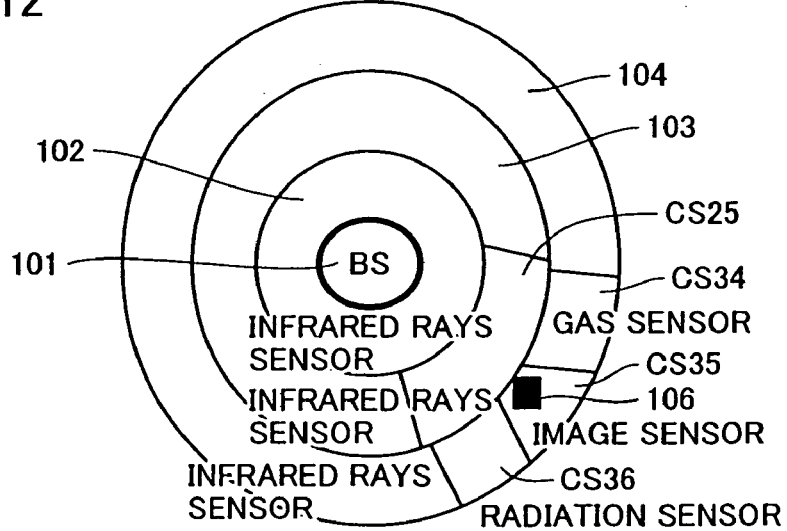

Alternatively, another approach may be adapted as shown in FIGS. 10 to 12, in which, before detecting an object, the sensor of the sensing robot group is an infrared detection sensor as shown in FIG. 10. When a sensing robot CS35 of the outermost layer detects object 106, the sensor of sensing robot CS35 is changed from the infrared detection sensor to a CMOS image sensor as shown in FIG. 11.

Thereafter, presence/absence of the object detected by sensing robot CS, position information and the like are transmitted to base station BS 101 by the method which will be described later, and then, the type of the sensor of sensing robots CS34, CS36 and the like around the object 106 which are governed by sensing robot CS25 of the higher layer to which sensing robot CS35 that has detected the object belongs, is switched from the infrared detection sensor to a sensor that is different from the CMOS image sensor (or a CCD) used in the sensing robot CS35. For example, sensor of sensing robot CS34 may be switched to a toxic gas sensor for detecting CO, and the sensor of sensing robot CS36 may be switched to a sensor for detecting toxic radiation. By such an approach, detailed overall information of the object can be obtained efficiently in a short time.

Alternatively, the sensing robot may perform image processing of edge detection, until the object is detected, and when a sensing robot detects the object, image processing of the sensing robot that has detected the object may be changed to color detection processing. Namely, the sensor hardware is the same while the method of processing sensor information is changed after detection of the object.

Alternatively, even when a sensing robot detects an object, spatial resolution of the sensing robots, sensor type and the method of image processing may not be changed until scanning of a predetermined area by the group of robots is completed, and when scanning of the predetermined area is completed and there is a detection signal, the same area may be subjected to detection operation again, to find different information of the object, with different sensor spatial resolution, different sensor type or different method of image processing, by the group of sensing robots.

In such a group robot system of the embodiment as described above, when a large number of fluttering sensing robots detect an object while moving, the burden caused by processing of sensor information can be reduced, and as the robots move closer to the object of searching, accuracy of position detection of the object, or accuracy of sensing information related to the magnitude of obstacle, for example, can be set higher after the object is detected.

Even when the fluttering sensing robot group does not move, the burden caused by the processing of sensor information can be reduced and after detection of the object, information related to the position detection of the object or the magnitude of obstacle with higher accuracy can be obtained. Further, it is not the case that sensors of all the fluttering sensing robots operate constantly, and therefore, power consumption can be reduced.

When the sensor is switched to one having higher sensitivity upon detection of an object, it becomes possible to obtain detailed overall information of the object efficiently in a short time. Further, when the sensor type and the method of processing are changed upon detection of the object, information of different target values can be detected, again efficiently.

In the above described embodiment, examples have been described in which sensing resolution, speed of movement and fluttering frequency of fluttering sensing robots CS differ layer by layer. The effect that overall information of the object can be grasped efficiently can also be obtained in a group robot system in which sensing resolution, speed of movement and fluttering frequency differ group by group of the unit of two layers or three layers in a hierarchical structure including a plurality of layers.

Though an example of a group robot system having a hierarchical structure has been described in the embodiment above, the effect that overall information of the object can be grasped efficiently can also be obtained even when the plurality of fluttering sensing robots CS do not form a hierarchical structure that have different sensing resolution, speed of movement and fluttering frequency in accordance with the distance from the base station. Here, each of the fluttering sensing robots may have different sensing resolution, different speed of movement and different fluttering frequency, in accordance with distance from the base station. When sensing resolution is set to be higher closer to the base station and speed of movement and the fluttering frequency set to be lower closer to the base station, it becomes possible to obtain detailed overall information of the object that gradually increasing accuracy, as the base station comes closer to the object.

A group robot system of which sensing resolution becomes higher and the speed of movement and frequency becomes lower in the higher layer of hierarchical structure, that is, closer to the base station, has been described as an example of the embodiment. Alternatively, in the group robot system, sensing resolution may be set higher and the speed of movement and frequency are set lower in sensing robots CS of the lower layer of the hierarchical structure. In that case, as the sensing resolution of the lowermost layer is high until an object of searching is found, the possibility of failure to find the object of searching can be reduced. Further, when sensing by the sensing robots belonging to the higher layer of the hierarchical structure is stopped, burden in controlling and power consumption of the sensing robots CS of the higher layer and of the base station BS can be reduced.

Further, such an approach may also be possible in which when a sensing robot CS detects an object of searching, sensing resolution of only the sensing robot CS that detected the object and the sensing robots existing in the area around that sensing robot CS is set higher than others. Alternatively, when a sensing robot CS ceases to detect the object of searching, sensing resolution of that sensing robot CS may be set lower, and the sensing resolution of only the sensing robots CS existing in the area around that sensing robot CS may be set higher than others. Consequently, burden in control and power consumption of base station BS and sensing robots CS can be reduced. Even in a group robot system in which sensing robots CS that perform sensing change with time, burden in control and power consumption of the base station BS and the sensing robots CS may be reduced.

In summary, in the group robot system of the embodiment described above, the manner of detection of the object including speed of movement, frequency of fluttering motion and sensing resolution of each of the plurality of sensing robots can be controlled by the base station, independently for each of the sensing robot CS. Therefore, as compared with the conventional sensing robots in which the manner of detection of the object cannot be controlled independently, efficient searching of the object becomes possible.

Further, independent control of each of the sensing robots CS may be such that a specific sensing robot CS among the plurality of sensing robots CS performs operations until an object is detected, and when the object is detected, other sensing robots CS move to the position of the object to grasp detailed overall information. Namely, the control of the sensing robots CS may be fixed such that each robot can perform searching in its own manner of searching different from other robots.

Referring to FIGS. 1 to 14, communication between the base station BS101 and the plurality of sensing robots is implemented in a hierarchical structure. Base station 101 communicates with sensing robot 102 (CS11 to CS1$i$) of the group closest to the base station BS on the concentrical circles. From base station BS in the up stream, changes of fluttering such as the frequency or direction of fluttering, are transmitted to fluttering sensing robot 102 (CS11 to CS1$i$). From fluttering sensing robot 102 (CS11 to CS1$i$) of the down stream, presence/absence of the object, position information and the like are transmitted to base station BS.

Then, sensing robot 102 communicates with sensing robot 103 (CS21 to CS2$j$) of the neighboring group. From sensing robot 102 (CS11 to CS1$i$) in the up stream, changes of fluttering including frequency and direction of fluttering for a sensing robot 103 (CS21 to CS2$j$) that have been transmitted from the base station BS101 to sensing robot 102 (CS11 to CS1$i$) are transmitted to fluttering sensing robot 103 (CS21 to CS2$j$). From fluttering sensing robot 103 (CS21 to CS2$j$) in the down stream, presence/absence of the object, position information and the like are transmitted to sensing robot 102 (CS11 to CS1$i$).

Then, sensing robot 103 (CS21 to CS2$j$) communicates with sensing robot 104 (CS31 to CS3$k$) of the neighboring group. From sensing robot 103 (CS21 to CS2$j$) in the up stream, changes of fluttering including frequency and direction of fluttering for sensing robot 104 (CS31 to CS3$k$) that has been transmitted from base station BS101 through sensing robot 102 (CS11 to CS1$i$) to sensing robot 103 (CS21 to CS2$j$) are transmitted to fluttering sensing robot 104 (CS31 to CS3$k$).

Sensing robot 104 (CS31 to CS3$k$) in the down stream transmits presence/absence of the object, position information and the like to sensing robot 103 (CS21 to CS2$j$) in the up stream. Specifically, when an object is detected by fluttering sensing robot searching area CS31, detection signal is transmitted to sensing robot CS20 of the upper layer, and from sensing robot CS20, transmitted further to sensing robot CS11 of the higher layer. Finally, detection of the object is transmitted from sensing robot CS11 to base station BS.

It is unnecessary for base station BS to cover all the communication areas of all the fluttering robots. It may simply have communication intensity that can secure communication with the group closest to the base station of the surrounding concentrical circles. Therefore, communication intensity weaker than that ensures communication with all the sensing robots is sufficient, and hence power consumption for communication can be reduced.

When communication intensity between fluttering sensing robot CS11 and base station BS becomes lower than a predetermined level, the fluttering sensing robot moves toward the base station until the communication intensity again exceeds the predetermined level. The same applies when fluttering sensing robot CS11 as a higher layer robot communicates with fluttering sensing robot 103 (CS21 to CS24) in the down stream.

Though the sensing robot of the down stream moves until sufficient communication intensity is obtained in the example above, when communication intensity becomes lower than the predetermined level, the sensing robot and the sensing robot of the higher layer both may have communication powers increased, so as to ensure communication intensity between the sensing robot of the higher layer and the sensing robot governed by the robot of the higher layer.

Figure 13:
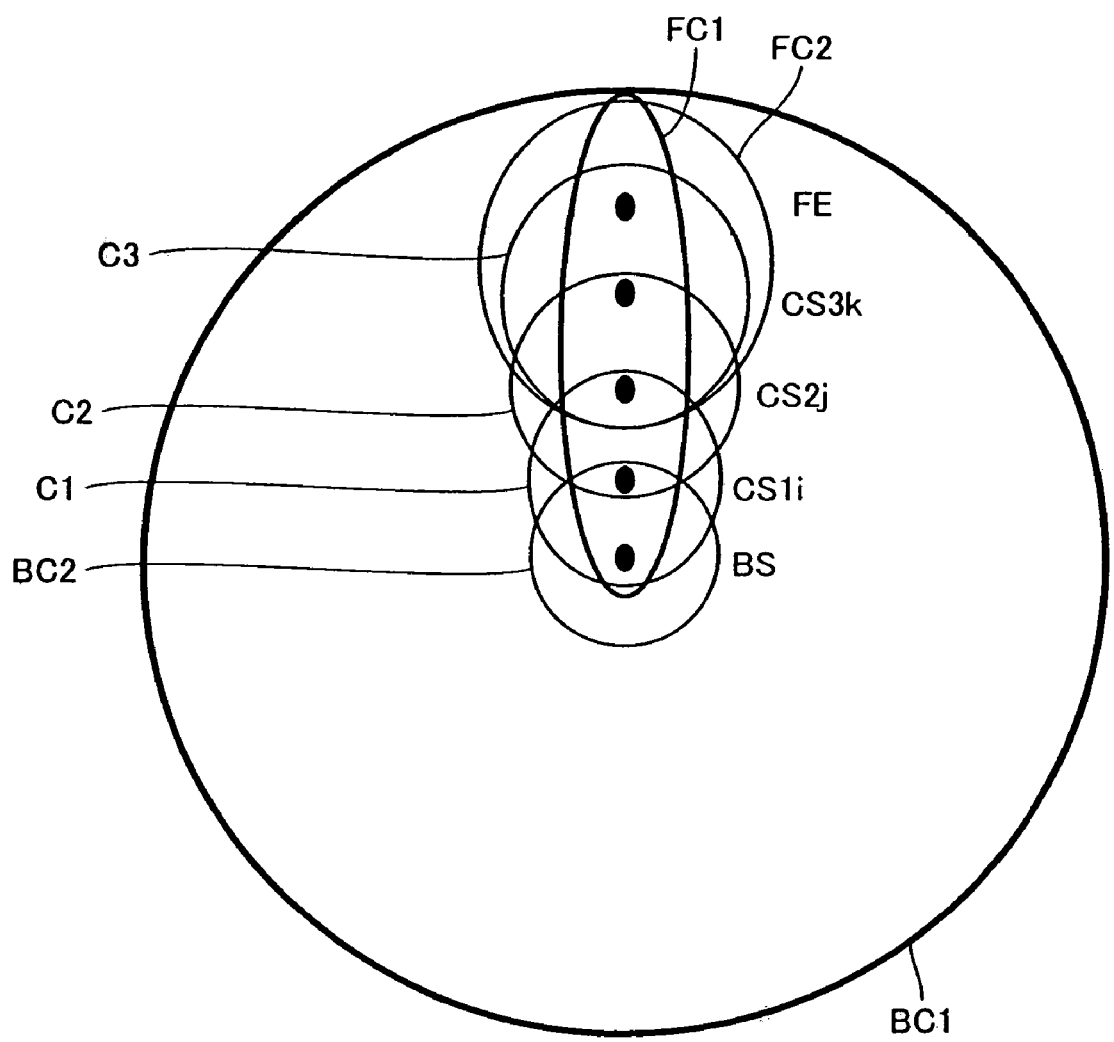
FIG. 13 is an illustration of the hierarchical structure of the communication system in the group robot system in accordance with the present embodiment.

FIG. 13 represents relation between hierarchical structure and the position of pheromone robots of the group robot system in accordance with the present invention.

Sensing robot CS1$i$ governed by base station BS exists in a circle (BC2) that represents scope of communication of the base station BS, with base station BS being the center of the circle. Next, a sensing robot CS2$j$ governed by sensing robot CS1$i$ exists in a circle (C1) that represents scope of communication of sensing robot CS1$i$, with sensing robot CS1$i$ being the center of the circle.

Similarly, a sensing robot CS3$k$ governed by sensing robot CS2$j$ exists in a circle (C2) representing the scope of communication of sensing robot CS2$j$, with sensing robot CS2$j$ being the center. It follows that in the circle of communication governed by sensing robot CS2$j$, there are a plurality of sensing robots CS2$k$ governed by CS2$j$.

When it is the case that sensing robot CS3$k$ is the outermost sensing robot CS, then sensing robot CS3$k$ is also governed by a pheromone robot FE. Specifically, sensing robot CS3$k$ exists in a circle (FC2) representing scope of communication of pheromone robot FE, with the pheromone robot being the center.

Communication intensity between pheromone robot FE and base station BS is higher than for other communications. The pheromone robot FE basically exists in the outermost area of searching, when the base station BS is at the center. Pheromone robot FE exist in a circle (BC1) representing scope of communication with high intensity between base station BS and pheromone robot FE, with the base station BS being the center. The scope of communication from pheromone robot FE to base station BS is elliptical with high directivity, as it is unnecessary to cover all the directions (FC1).

The pheromone robot group FE105 will be described. Pheromone robot group FE105 is positioned outer than sensing robot group 100 with the base station BS101 at the center, and the pheromone robot is used for controlling movement of sensing robots CS and for determining the scope of searching. Specifically, sensing robot CS exists between base station BS101 and pheromone robot FE105. The robot of higher layer with respect to pheromone robot FE105 is the base station BS101, and the robot of the lower layer is the sensing robot group 104 (CS31 to CS3$k$)

positioned on the outermost one of the concentrical circles with the base station BS101 being the center.

In the present example, that means the sensing robot group 104 (CS31 to CS3*k*). Communication intensity between pheromone robot FE105 and sensing robot 104 (CS31 to CS3*k*) in the down stream is the same as the communication intensity between base station BS and the sensing robot (CS11 to CS1*i*) and between each of the sensing robots CS. Communication intensity between pheromone robot FE105 and base station BS101, however, is higher than the intensity of other communications.

In the group robot system of the present embodiment, it is preferred that maximum distance of communication between pheromone robot FE and base station BS is larger than the sum of the maximum distance for communication between base station BS and the sensing robot (CS11 to CS1*i*) of the highest layer of the hierarchical structure, the maximum distance of communication between pheromone robot FE and the sensing robot (CS31 to CS3*k*) of the lowermost layer of the hierarchical structure, and the maximum distance of communication between each of the plurality of sensing robots CS. By such setting, it becomes possible to use the sensing robots CS efficiently, by making full use of the communication distance of each of the sensing robots, with the possible distance of communication from the base station BS to the sensing robot (CS31 to CS3*k*) of the lowermost layer of hierarchical structure is treated as linear distance.

Base station BS101 positions pheromone robot FE*n* on the outer diameter portion of the approximately concentrical search area with the base station BS101 being the center, so as to determine the portion for searching. Thereafter, in accordance with the number of layers in the hierarchical structure, the scope of concentrical layers is determined. Thereafter, it determines the scope of a cell (scope of searching by each of the sensor robots belonging to one layer of the hierarchical structure) in accordance with the number of fluttering sensing robots belonging to one layer, and determines spatial resolution for searching of the sensing robots. Finally, communication intensity between the base station BS and each of the sensing robots (CS11 to CS1*i*), and communication intensity between each of the sensing robots CS are determined, in accordance with the difference in radius of concentrical circles resulting from the difference in hierarchical structure, and the cell area of the cell defining the scope of searching by each of the sensing robots represented by the concentrical circles.

When the area of searching is to be changed, base station BS101 first communicates with pheromone robot FE105 to notify distance and direction of movement of base station BS101. Thereafter, base station BS101 transmits distance and direction of movement to sensing robot 102 (CS11 to CS1*i*). Thus, as base station BS101 moves in the direction of the arrow in FIG. 1, the group robot system as a whole moves in the direction of the arrow shown in FIG. 1.

More specifically, sensing robot 102 (CS11 to CS1*i*) that receives the signal indicating movement of the group robot system as a whole from base station BS transmits the distance and direction of movement to sensing robot 103 (CS21 to CS2*j*) of the lower layer, and thereafter, it moves in the direction of the arrows of FIG. 1. Pheromone robot FE105 transmits the distance and direction of movement to sensing robot 104 (CS31 to CS3*k*) of the lowermost layer, and thereafter, moves in the direction of the arrow shown in FIG. 1, similar to base station BS.

In this manner, when the space for searching is to be changed, information of movement is transmitted from base station BS to sensing robot CS and from sensing robot CS of a higher layer to a sensing robot CS of a lower layer, substantially simultaneously with transmission of the information of movement from pheromone robot FE to sensing robot CS.

Pheromone robot 105 at the outermost position of the search area directly governs sensing robot 104 (CS31 to CS3*k*) of the outermost group of the sensing robots (that is, lowermost layer of the hierarchical structure). Pheromone robot FE always keeps a sensing robot CS specified by a PN code in a communication zone.

For example, when communication intensity between pheromone robot FE105 and a fluttering sensing robot CS3*k* under its surveillance becomes lower than a predetermined level, fluttering sensing robot CS3*k* moves toward pheromone robot FE105, until the communication intensity again exceeds the predetermined level. Further, as pheromone robot 105 is under surveillance of base station BS101, it is possible to control distance from base station BS utilizing synchronous delay of communication, so as to maintain a prescribed distance from the base station BS101 constantly. As a result, it becomes possible to substantially constantly determine substantially similar search area for the whole group.

Figure 14:
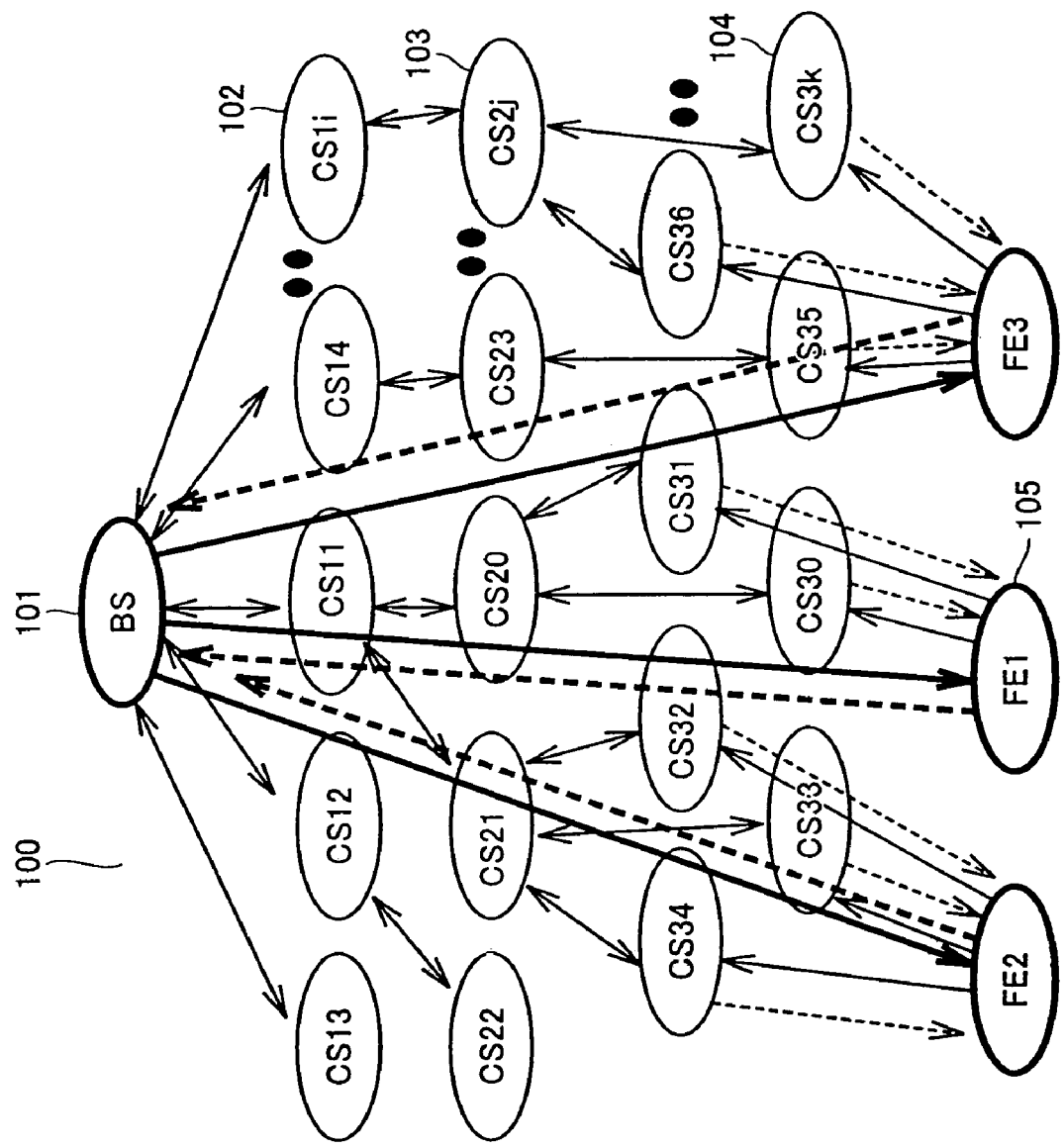
FIG. 14 is an illustration representing tree structure of the communication system of the group robot system in accordance with the present embodiment.

FIG. 14 shows signal flows in the communication system of the hierarchical structure.

In the figure, solid lines represent motion control signals (down stream) and detection signals (up stream), while dotted lines represent power signals.

Communication between a fluttering sensing robot and the base station, and communication between each of the fluttering sensing robots are bi-directional. A signal from up stream to down stream is a motion control signal of the sensing robot such as fluttering frequency or direction of the robot, or a control signal for sensor control. A signal from the down stream to the up stream is a detection signal of presence/absence of the object, position information or the like. The chain relation in communication between a robot of the up stream that controls and a robot in the down stream that is controlled is one to multiple or one to one, and as a whole, the relation establishes a communication route of a tree structure. Consequently, there is always one communication route from the base station to each sensing robot CS, and therefore, confusion in the communication system is avoided.

Communication between base station BS and pheromone robot FE is also bi-directional. The signal from base station BS to pheromone robot FE is a signal representing speed or direction of movement of the base station BS. Based on this signal, pheromone robot FE determines speed and direction of its movement, and transmits control signal of fluttering frequency, direction or the like to sensing robot CS. The signal from pheromone robot FE to base station. BS is for measuring reception power.

Base station BS receives the transmission signal from pheromone robot FE, and measures the power thereof, so as to indirectly estimate the distance between base station BS and pheromone robot FE, and in accordance with the magnitude of power, causes pheromone robot FE to move closer, or intensifies transmission signal from base station BS to pheromone robot FE. The relation of numbers between base station BS and pheromone robot FE may be one to multiple or one to one.

Communication between pheromone robot FE and fluttering sensing robot CS is also bi-directional. The signal from pheromone robot FE to the sensing robot CS is a motion control signal of sensing robot CS such as fluttering frequency or direction of the robot, or a control signal for sensor control. The signal from fluttering sensing robot CS to pheromone robot FE is a signal for measuring reception power.

Pheromone robot FE receives the transmission signal from sensing robot CS and measures the power, so as to indirectly estimate distance between pheromone robot FE and sensing robot CS, and in accordance with the magnitude of the power, it causes sensing robot CS to come closer to pheromone robot FE. The relation of numbers between pheromone robot FE and sensing robot CS may be one to multiple or one to one.

Figure 15:
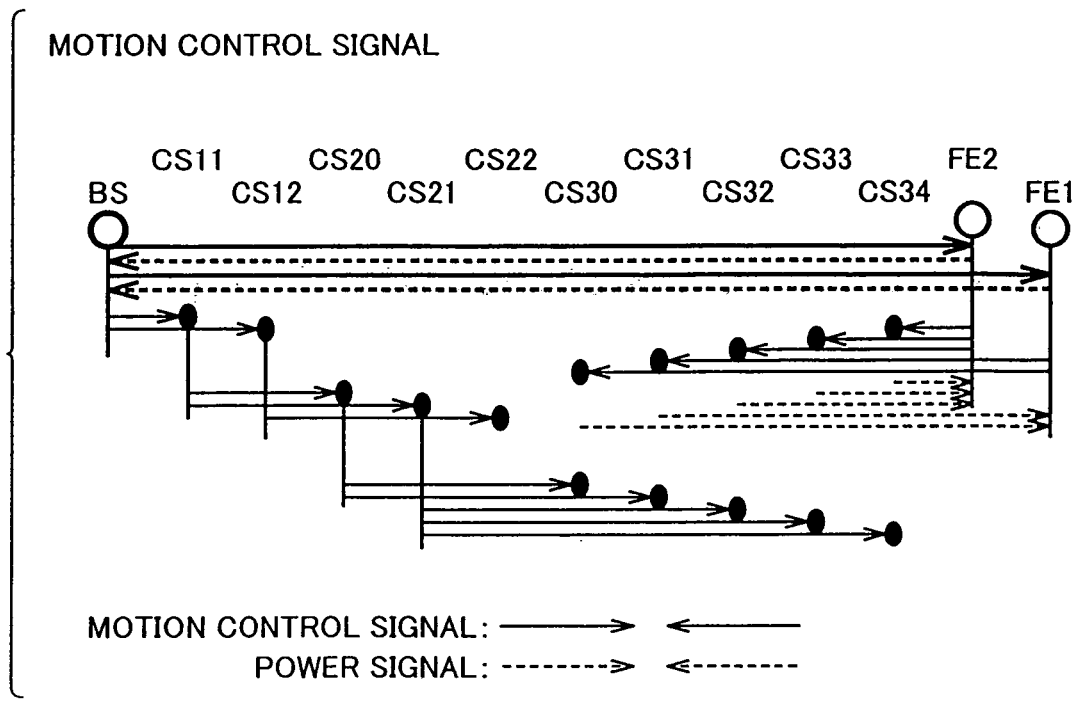
FIGS. 15 and 16 represent flow of control signals for the fluttering sensing robot of the group robot system in accordance with the present embodiment.
Figure 16:
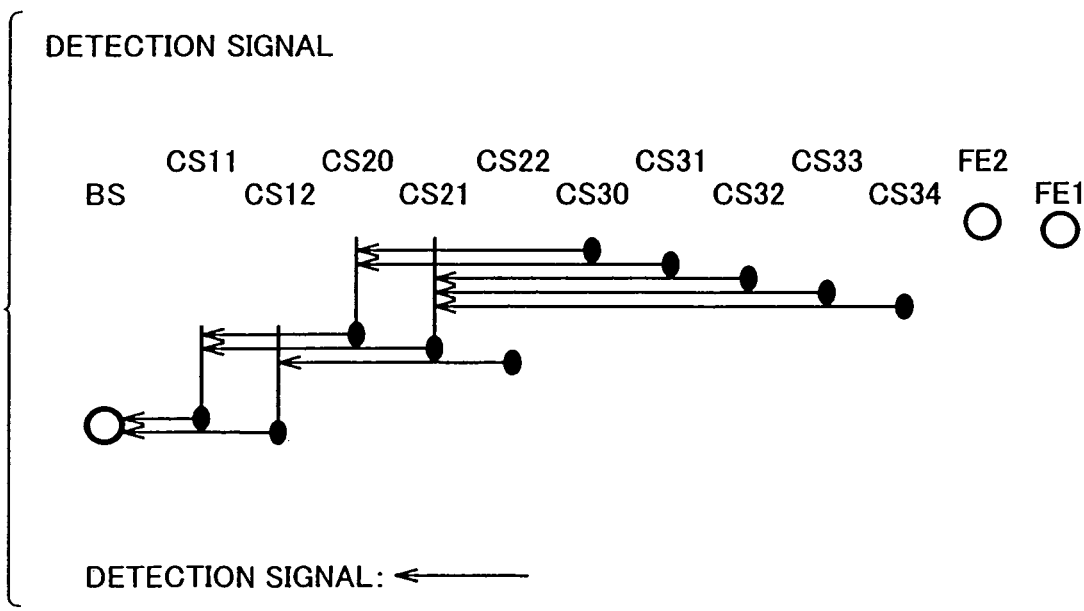

FIGS. 15 and 16 represent, as a flow, examples of the procedure of moving the group of robots, in the group robot system having hierarchical structure.

First, flow of the motion control signal will be described with reference to FIG. 15. In the figure, solid lines in the lateral direction represent flow of motion control signals, dotted lines represent flow of power signals, and vertical solid lines represent time delay.

First, from base station BS to sensing robots CS11 and CS12, a motion control signal for the sensing robot CS including fluttering frequency or direction of fluttering sensing robot, or a control signal for sensor control is transmitted. At the same time, from base station BS to pheromone robot FE, speed and direction of movement of the base station BS are transmitted. From pheromone robot FE to base station BS, a signal for measuring power, for estimating distance between base station BS and pheromone robot FE, is transmitted.

Thereafter, sensing robot CS11 transmits to sensing robots CS20 and CS21, a motion control signal for the sensing robot including fluttering frequency or direction of the fluttering sensing robot or a control signal from sensor control. Sensing robot CS12 transmits to sensing robot CS22, a motion control signal for sensing robot CS including fluttering frequency or direction of the robot, or a control signal for sensor control.

Pheromone robot FE1 transmits to sensing robots CS30 and CS31, a motion control signal for sensing robot CS including fluttering frequency or direction of fluttering sensing robot, or a control signal for sensor control.

Pheromone robot FE2 transmits to sensing robots CS32, CS33 and CS34, a motion control signal for sensing robot CS including fluttering frequency or direction of the fluttering robot, or a control signal for sensor control. Sensing robots CS30 and CS31 transmit to pheromone robot FE1, a signal for measuring power, for estimating distance between sensing robot CS30 or CS31 to pheromone robot FE1.

From sensing robots CS32, CS33 and CS34 to pheromone robot FE2, a signal for monitoring power for estimating distance between sensing robots CS32, CS33 or CS34 to pheromone robot FE2 is transmitted.

Finally, sensing robot CS20 transmits to sensing robots CS30 and CS31, a motion control signal for the sensing robot including fluttering frequency or direction of the robot, or a control signal for sensor control. Sensing robot CS21 transmits to sensing robots CS32, CS33 and CS34, motion control signal for the sensing robot CS including fluttering frequency or direction of the robot, or a control signal for sensor control.

Referring to FIG. 16, the flow of detection signals will be described. In this figure, solid lines in the lateral direction represent flow of detection signals, and vertical solid lines represent time delay.

First, from sensing robots CS30 and, CS31 to sensing robot CS20, a detection signal representing presence/absence of an object or position information is transmitted. From sensing robots CS32, CS33 and CS34, detection signal representing presence/absence of an object, position information or the like is transmitted to sensing robot CS21.

Thereafter, from sensing robot CS20 to sensing robot CS11, a detection signal representing presence/absence of an object, position information or the like is transmitted. From sensing robots CS21 and CSS22 to sensing robot CS12, a detection signal representing presence/absence of an object, position information and the like is transmitted.

Finally, from sensing robots CS11 and CS12 to base station BS, a detection signal representing presence/absence of an object, position information or the like is transmitted.

In this example, information is provided from the layer of sensing robot CS3$k$. When an object is detected by the layer of sensing robot CS2$j$ or CS1$i$, information naturally starts from that layer, and transmitted upward to base station BS.

Communication between fluttering sensing robot CS and base station BS, between each of fluttering sensing robots CS and between base station BS and pheromone robot FE is performed in accordance with spread spectrum communication, which is a method of synchronous communication. The spread spectrum communication system will be described with reference to FIG. 17 and Tables 1 to 4.

TABLE 1

|  | BS | CS1 (i-2) | CS1 (i-1) | CS1i |
|---|---|---|---|---|
| A layer (synchronous) | code 0 | code 0 | code 0 | code 0 |
| B layer (up stream) | — | code 10 | code 10 | code 10 |
| C layer (down stream) | code 10 | code 20 | code 21 | code 22 |

TABLE 2

|  | CS (j-3) | CS2 (j-2) | CS2 (j-1) | CS2j |
|---|---|---|---|---|
| A layer (synchronous) | code 0 | code 0 | code 0 | code 0 |
| B layer (up stream) | code 20 | code 20 | code 21 | code 22 |
| C layer (down stream) | code 30 | code 31 | code 32 | code 33 |

TABLE 3

|  | CS (k-3) | CS3 (k-2) | CS3 (k-1) | CS3k |
|---|---|---|---|---|
| A layer (synchronous) | code 0 | code 0 | code 0 | code 0 |
| B layer (up stream) | code 30 | code 30 | code 30 | code 31 |
| C layer (down stream) | code 40 | code 40 | code 40 | code 41 |

TABLE 4

|  | FEn |
|---|---|
| A layer (synchronous) | code 0 |
| B layer (up stream) | code 10 |
| C layer (down stream) | code 40 |

The group of robots of the group robot system in accordance with the present embodiment basically has three communication layers, including layer A for establishing synchronization, layer B for communication with robots in the up stream, and layer C for communication with robots in the down stream. In the layer A, base station 101, sensing robot CS groups 102, 103, 104 and pheromone robot FE105 all have the same PN code of 0. Here, code 0 is one of PN (Pseudorandom Noise) codes of 256 taps.

First, communication between base station BS101 and a sensing robot group 102 (CS11 to CS1*i*) in the down stream will be described. As the communication of layer A, base station BS101 communicates PN code 0 to sensing robot group 102 (CS11 to CS1*i*) by spread spectrum. Sensing robot 102 (CS11 to CS1*i*) despreads, by multiplying the same PN code of 0, by the received wave. When the PN code is despread for one period using a matched filter, for example, a point of synchronization where PN codes match can be found without fail.

Figure 17:
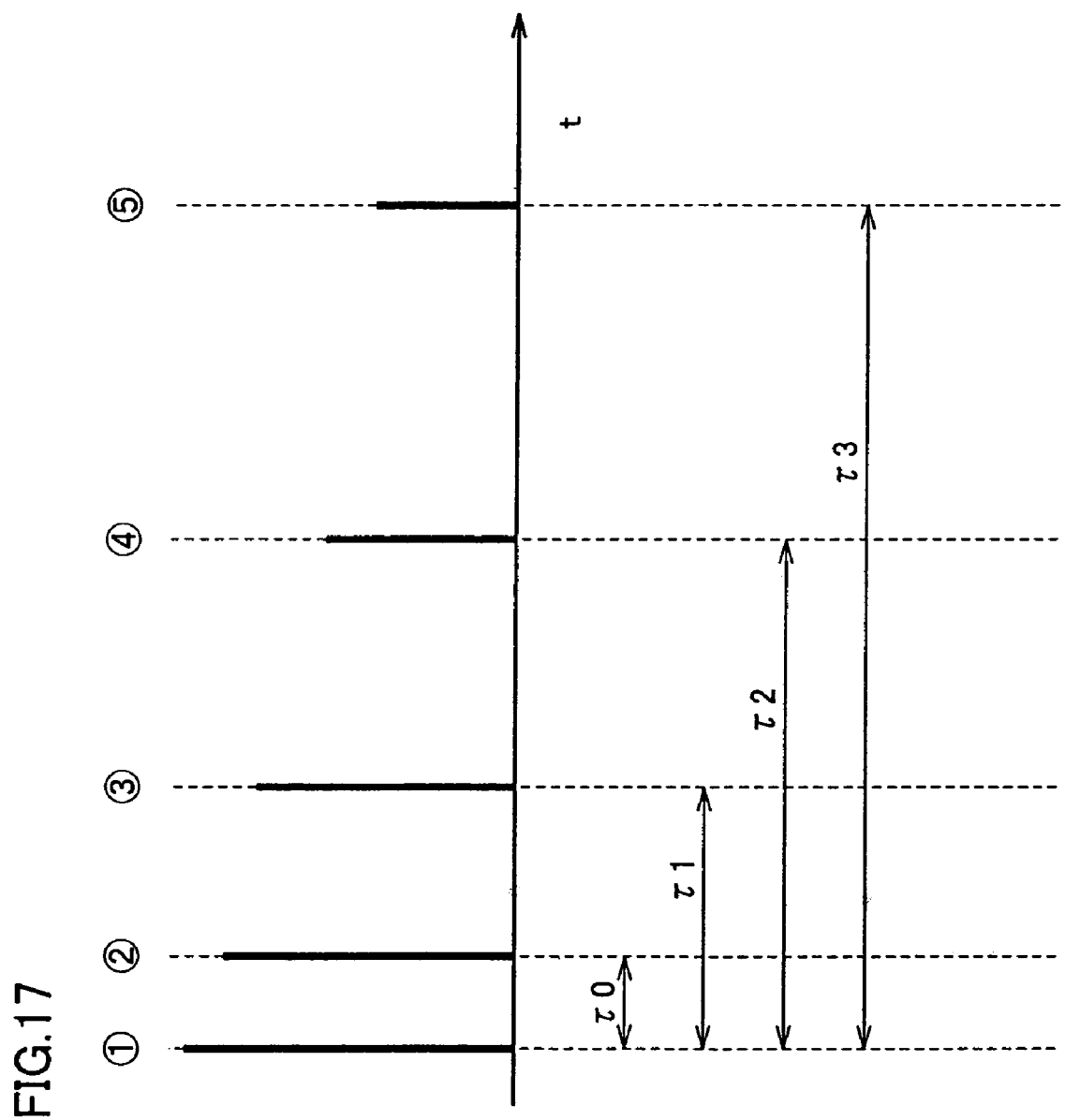
FIG. 17 shows a delay profile of the control signal in spread spectrum communication of the group robot system in accordance with the present embodiment.

Assume that the time point ① of FIG. 17 is a reference point of synchronization with base station BS101. The time of synchronization with sensing robot group 102 (CS11 to CS1*i*) is at the time point ②. Namely, a peak of the matched filter appears at a time point delayed by the distance between base station BS101 and sensing robot group 102 (CS11 to CS1*i*), where synchronization is established.

Similarly, sensing robot group 102 (CS11 to CS1*i*) transmits, as communication of layer A, the PN code 0 to sensing robot group 103 (CS21 to CS2*j*), by spread spectrum communication. The distance between base station BS101 and sensing robot group 103 (CS21 to CS2*j*) is the distance between base station BS101 and sensing robot BS102 (CS11 to CS1*i*) plus the distance between sensing robot 102 (CS11 to CS1*i*) and sensing robot 103 (CS21 to CS2*j*), and therefore, the point of synchronization of sensing robot 103 (CS21 to CS2*j*) with the base station appears is at time point ③ of FIG. 17, further delayed from sensing robot 102 (CS11 to CS1*i*).

Similarly, sensing robot group 103 (CS21 to CS2*j*) transmits as the communication of layer A, the PN code 0 to sensing robot group 104 (CS31 to CS3*k*) by spread spectrum communication. The distance between base station BS101 and sensing robot group 104 (CS31 to CS3*k*) is the distance between base station BS101 and sensing robot 103 (CS21 to CS2*j*) plus the distance between sensing robot 103 (CS21 to CS2*j*) and sensing robot 104 (CS31 to CS3*k*), and therefore, the point of synchronization of sensing robot group 104 (CS31 to CS3*k*) with the base station appears at time point ④ of FIG. 17, further delayed from sensing robot 103 (CS21 to CS2*j*).

The distance between base station BS101 and pheromone robot FE105 for controlling movement, which will be described layer, is larger than the distance between base station BS101 and sensing robot group CS104 (CS31 to CS3*k*). Therefore, the point of synchronization of pheromone robot 105 appears at time point ⑤ of FIG. 17, further delayed from sensing robot group CS104 (CS31 to CS3*k*).

The point of synchronization of each robot described above is repeatedly established intermittently, and the point of synchronization is constantly updated. The point of synchronization of sensing robot 102 (CS11 to CS1*i*) is represented by the time point ② of FIG. 17.

For establishing communication with base station BS101 in the up stream, sensing robot 102 (CS11 to CS1*i*) performs despreading and demodulation, using PN code 10 of layer B. The point of synchronization of the PN code of layer B is the time point ② of FIG. 17 that is established by the code 0 of layer A. Further, PN code 10 of layer B of sensing robot 102 (CS11 to CS1*i*) is the same as the PN code 10 of layer C for establishing communication with the sensing robot of the down stream of base station BS101. Specifically, only the sensing robot group 102 (CS11 to CS1*i*) that uses in layer B the same PN code 10 of the layer C of base station BS101 can communicate with base station BS.

In the example shown in Tables 1 to 4, the layer B of CS1 (i-2), CS1 (i-1) and CS1*i* have the code 10, and therefore, these can communicate with base station BS. However, sensing robot CS of which PN code of layer B is not the code 10 cannot communicate with base station BS, as the correlation peak with code 10 cannot be detected.

To establish communication with sensing robot 103 (CS21 to CS2*j*) of the down stream, sensing robot 102 (CS11 to CS1*i*) performs despreading and demodulation using PN codes 20, 21 and 22 of layer C. Point of synchronization of the PN code of layer C is the time point ② of FIG. 17 established by code 0 of layer A. The PN codes 20, 21 and 22 of layer C of sensing robot 102 (CS11 to CS1*i*) are the same as PN codes 20, 21 and 22 of the layer B for establishing communication with sensing robot of the up stream of sensing robot 103 (CS21 to CS2*j*).

Specifically, only that sensing robot 102 (CS11 to CS1*i*) that uses in the layer C, the same PN code as the layer B of sensing robot 103 (CS21 to CS2*j*) can communication with the sensing robot 103 (CS21 to CS2*j*) of the downstream. For example, CS1 (i-2) can communication with CS2 (j-3) and CS2 (j-2), CS1 (i-1) can communicate with CS2 (j-1), and CS1*i* can communicate with CS2*j*.

The point of synchronization of sensing robot 103 (CS21 to CS2*j*) is the time point ③ of FIG. 17. To establish communication with sensing robot 102 (CS11 to CS1*i*) of the up stream, sensing robot 103. (CS21 to CS2*j*) performs despreading and demodulation using PN codes 20, 21 and 22 of layer B. The point of synchronization of the PN code of layer B is the time point ③ of FIG. 17, established by the code 0 of layer A. As the communication between sensing robot 103 (CS21 to CS2*j*) and sensing robot 102 (CS11 to CS1*i*) has been already described above, details will not be repeated here.

To establish communication with sensing robot 104 (CS31 to CS3*k*) of the down stream, sensing robot 103 (CS21 to CS2*j*) performs despreading and demodulation using PN codes 31, 32 and 33 of layer C. The point of synchronization of the PN code of layer C is the time point ③ of FIG. 17 established by code 0 of layer A. The PN codes 30, 31, 32 and 33 of layer C of sensing robot 103 (CS21 to CS2*j*) are the same as PN codes 30 and 31 of layer B for establishing communication of sensing robot CS in the up stream of sensing robot 104 (CS31 to CS3*k*).

Specifically, only that sensing robot 103 (CS21 to CS2*j*) which uses in layer C, the same PN code as the layer B of sensing robot 104 (CS31 to CS3*k*) can communicate with sensing robot 104 (CS31 to CS3*k*) of the down stream. For example, CS2 (j-3) can communicate with CS3 (k-3), CS3 (k-2) and CS3 (k-1), and CS2 (j-2) can communicate with CS3*k*.

The point of synchronization of sensing robot 104 (CS31 to CS3*k*) is the point ④ of FIG. 17. To establish communication with sensing robot 103 (CS21 to CS2*j*) of the up stream, sensing robot 104 (CS31 to CS3*k*) performs despreading and demodulation using PN codes 30 and 31 of layer B. The point of synchronization of the PN code of layer B is the time point ④ of FIG. 17 established by code 0 of layer A. As the communication between sensing robot 104 (CS31 to CS*k*) and sensing robot 103 (CS21 to CS2*j*) has already been described above, details thereof will not be repeated here.

To establish communication with base station BS101 in the up stream, pheromone robot FE105 performs despreading and demodulation using PN code 10 of the layer B. Point of synchronization of the PN code of layer B is the time point ⑤ of FIG. 17 established by code 0 of layer A. The PN code for synchronization of layer A is the same code 0 as other sensing robots CS. The PN code 10 of layer B is the same as PN code 10 of layer C for establishing communication of base station BS with sensing robot CS of the down stream. When the PN code of layer B is not code 10, pheromone robot FE cannot communicate with base state BS, as correlation peak with code 10 of base station BS cannot be detected.

To establish communication with sensing robot 104 (CS31 to CS$k$) of the down stream, pheromone robot FEn performs despreading and demodulation, using PN code 40 of layer C. The point of synchronization of the PN code of layer C is the time point ⑤ of FIG. 17 established by code 0 of layer A. The PN code 40 of layer C of pheromone robot FEn is the same as PN code 40 of layer C of sensing robot 104 (CS31 to CS3$k$) at the outermost position, for establishing communication with pheromone robot FE.

Specifically, only that pheromone robot FEn that uses in layer C, the same PN code as the C layer of sensing robot 104 (CS31 to CS3$k$) can communicate with sensing robot 104 (CS31 to CS3$k$) of the down stream. In the example shown in Tables 1 to 4, pheromone robot FEn can communicate with sensing robots CS3 (k-3), CS3 (k-2) and CS3 (k-1) while it cannot communicate with CS3$k$, as the spread code is different.

As to the details of spread spectrum communication, see Yukiji Yamauchi, Spread Spectrum Communication, published by Tokyo Denki Daigaku Shuppan Kyoku. In the spread spectrum communication of the present embodiment, by way of example, a spread spectrum communication apparatus described in Japanese Patent Laying-Open No. 11-168407 is applied, which is proposed by the inventors of the present invention.

Next, a control system for controlling one fluttering sensing robot used for the group robot system described above (relation between the base station and one fluttering sensing robot) will be discussed. Here, as an example of the control of sensing robot CS by the base station BS, direct control of sensing robot CS by base station BS will be described. When base station BS controls a sensing robot CS of a lower layer through a sensing robot CS of a higher layer of the hierarchical structure, control signal related to fluttering operation and the like is transmitted from sensing robot CS of a higher layer to a sensing robot CS of a lower layer, and signals obtained by the sensor are transmitted from sensing robot CS of a lower layer to a sensing robot CS of a higher layer, using control signals which will be discussed below.

(System Configuration)

First, system configuration of one fluttering sensing robot in accordance with the present embodiment will be described with reference to FIG. 18.

Figure 18:
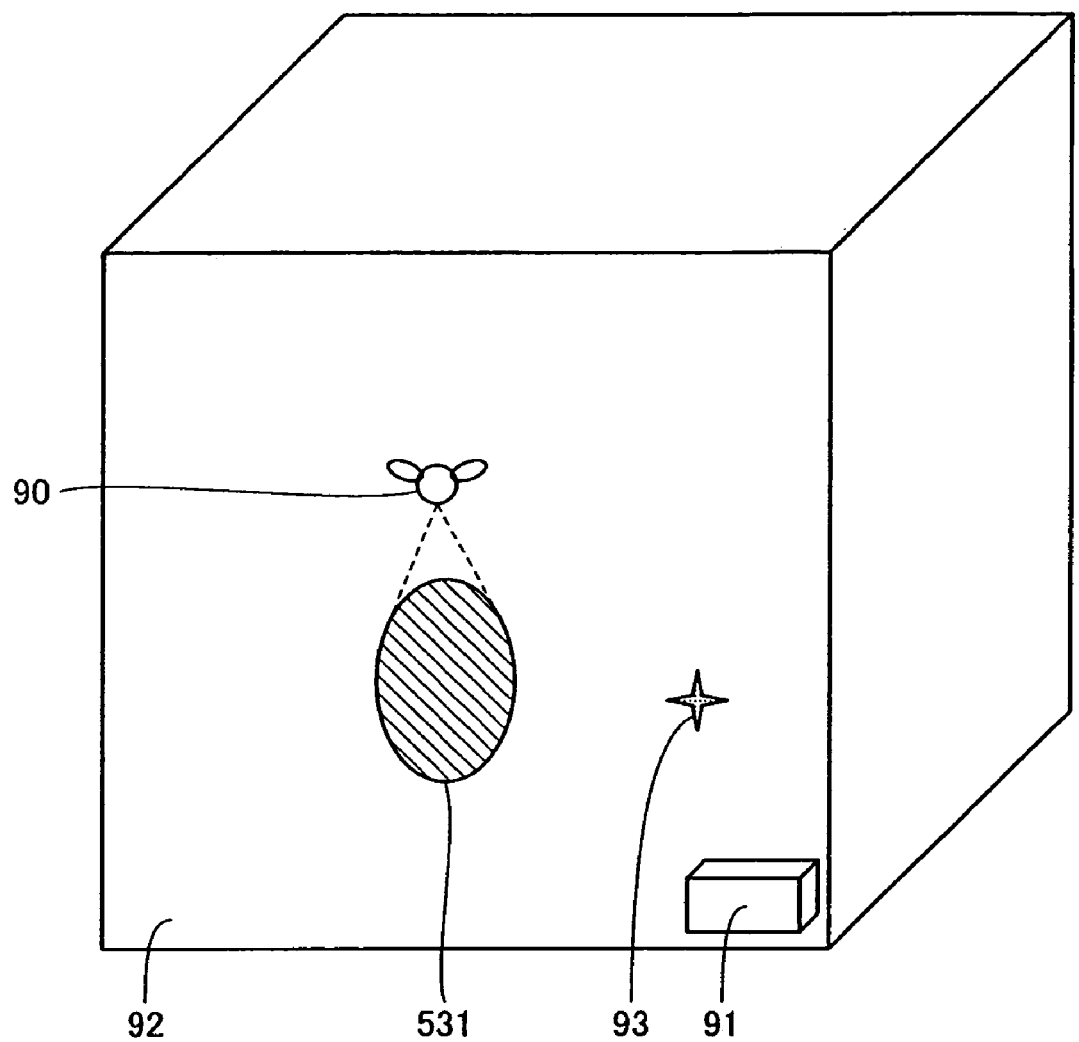
FIG. 18 is an illustration schematically representing an example of communication relation between the fluttering sensing robot and the base station in accordance with an embodiment of the invention.

The control system of the fluttering sensing robot in accordance with the present embodiment includes a work space 92 as an example of the search area C shown in FIG. 18, a robot 90 as an example of a fluttering sensing robot CS positioned in work space 92 and capable of flying and moving within the space and capable of obtaining or changing physical amount in the space, and a base station 91 as an example of the base station BS that can exchange information with robot 90.

In the following, an object of searching of the invention will be described, as an example, as a human.

Robot 90 as an example of the fluttering sensing robot CS of the present embodiment obtains an amount of infrared ray, by an infrared sensor mounted on itself, to detect a person 93 as the object of searching, and directs a visible light to detected person 93 by using a light emitting diode 8, so as to give some information to person 93.

(Detailed Description of Fluttering Sensing Robot of the Present Embodiment)

(Description of Robot 90)

(Main Configuration and Main Function)

First, main configuration of robot 90 as an example of the sensing robot in accordance with the present invention will be described with reference to FIG. 19.

As shown in FIG. 19, robot 90 has a support structure 1 as a main structure, on which various components are arranged. A right actuator 21 and a left actuator 22 are fixed on an upper portion of support structure 1. A right wing 31 is attached to right actuator 21, and a left wing 32 is attached to left actuator 22. An electrode 61 is arranged at a lower portion.

Actuators 21 and 22 allow wings 31 and 32 respectively attached thereto to rotate with three degrees of freedom, approximately about the fulcrum of the actuators. Rotation of each of the actuators 21 and 22 is controlled by a control circuit 4 mounted on support structure 1. Detailed structure of each actuator will be described later.

The center of gravity O of robot 90 in the state shown in FIG. 19 is vertically lower than the middle point A0 between centers of rotation of left and right actuators 21 and 22. Further, an acceleration sensor 51, an angular acceleration sensor 52 and a pyroelectric infrared sensor 53 are mounted on support structure 1. Further, a communication apparatus 7 is arranged on support structure 1. Communication apparatus 7 transmits/receives information to and from the base station 91.

Control apparatus 4 detects the state of flight of robot 90 as the fluttering sensing robot, based on the information transmitted from acceleration sensor 51 and angular acceleration sensor 52, and obtains information of a heat source within the area 531 of detection by the pyroelectric infrared sensor, based on the information transmitted from pyroelectric infrared sensor 53. These pieces of information are transmitted through communication apparatus 7 to base station 91.

Further, control apparatus 4 controls ON/OFF of light emitting diode 8 arranged on support structure 1. Communication apparatus 7 receives an instruction signal from the base station. In response to the instruction signal, control apparatus 4 calculates operations of respective actuators 21, 22 and light emitting diode 8, and determines driving of these elements. The left and right actuators 21, 22, control apparatus 4, sensors 51 to 53, communication apparatus 7 and light emitting diode 8 are driven by a current supplied from a power source 6.

Power source 6 is a secondary battery, and is charged by power fed through electrode 61. Electrode 61 also serves as a positioning pin, and it can be placed in a fixed attitude, in a positioning hole of base station 91.

Though electrode 61 consists of two pins, that is, positive and negative electrodes in FIG. 18, it may have three or more pins, including a pin for detecting state of charge.

(Support Structure)

Support structure 1 will be described in greater detail with reference to FIG. 19.

Desirably, the support structure 1 is sufficiently light weight, while assuring mechanical strength. For the support structure 1 of robot 90 as the fluttering sensing robot, polyethylene terephthalate (PET) mold to an approximately spherical shell is used. Support legs 11 are arranged at the lower portion of support structure 1, so that the robot does not fall at the time of landing. Support legs 11 may be omitted when stability at the time of landing is ensured, or stability at the time of landing is not a problem functionally.

The material and the shape of support structure 1 are not limited to those described with reference to FIG. 19, provided that flight performance is not degraded. Particularly, the material of support structure 1 should be light weight and have high rigidity.

For example, a composite material provided by hybridization at molecular level of an organic substance such as chitosan observed in crabs or shrimps and inorganic substance such as silica gel may be used, to realize light weight and robust characteristics observed in exoskeletons of crabs and shrimps as well as high susceptibility to shape-processing, directly utilizing optimal composition values of living organism. Such material is also environmentally friendly.

Further, calcium carbonate as the material of shells may be used in place of chitosan mentioned above, to form the highly rigid support structure.

The arrangement and shape of the actuators and the wings are not limited to those of the present embodiment.

Particularly, in the present embodiment, the center of gravity is positioned lower than the mechanical point of application of the wing so that the apparatus naturally assumes the attitude shown in FIG. 19, putting higher priority on stability of flight. However, the difference in fluid force between the left and right wings necessary for attitude control becomes smaller when the position of the center of gravity matches the position of the mechanical point of application, and hence the attitude of robot 90 can be changed more easily. Therefore, dependent on application, such a design with higher priority on readiness of attitude control may be possible.

(Mechanism of Flight)

(Wing and its Operation)

Next, the wing and its operation will be described with reference to FIGS. 20 to 22.

For simplicity of description, a coordinate system is defined for FIG. 19. First, approximately the center of support structure 1 is regarded as the origin. The direction of gravitational acceleration is regarded as the downward direction, and the opposite is regarded as the upward direction. The z axis is defined as extending from the origin to the upward direction. Next, the direction coupling the center of the shape of right actuator 21 and the center of the shape of left actuator 22 is regarded as the left/right direction. The y axis is defined as extending from the origin to the left wing. Further, the x axis is defined as extending in the direction of vector product, in the right hand system of the y and z axes from the origin. The positive direction along this axis will be referred to as forward, and the opposite direction will be referred to as backward.

In robot 90 as an example of the fluttering sensing robot shown in FIG. 19, the center of gravity O is positioned on a line extending downward along the direction of gravitational acceleration from a midpoint A0 between the point of application A1 of right actuator 21 of right wing 31 and point of application A2 of left actuator 22 of left wing 32. In the present embodiment, a rotor 229 of the left actuator is approximately spherical, and left wing 32 is arranged such that the center of the sphere of the rotor 229 is positioned on a line extended from main shaft 321. The point of application A2 of left actuator 22 and the fulcrum of rotating motion of main shaft 321 correspond to the spherical center. The same applies to right actuator 21.

In the following, it is assumed that the x, y and z axes described above constitute a unique coordinate system of robot 90 fixed on support structure 1 in the state shown in FIG. 19.

Relative to the coordinate system fixed for robot 90, x', y' and z' axes are defined as space coordinates fixed in the space and having an arbitrary point as the origin. Thus, the coordinates of the space in which the robot 90 moves can be represented by the coordinates of x', y' and z' axes, respectively, while the coordinates unique to the robot 90 can be represented by the coordinates of x, y and z axes, respectively.

The wing structure will be described in the following. Left wing 32, for example, is formed by spreading a film 323 over a support member having a main shaft 321 and branches 322. Main shaft 321 is arranged at a position closer to the front of left wing 32. Branches 322 are bent downward near the tip end portions.

Left wing 32 has a convex cross sectional shape. Thus, high stiffness is obtained against the force exerted by the fluid especially in a down stroke. In order to reduce weight, main shaft 321 and branches 322 have hollow structure, and are formed of carbon graphite. Film 323 has initial stress in a direction of contraction in its plane, so as to enhance stiffness of the entire wing.

The diameter of main shaft 321 of the wing used for the experiment by the inventors was 100 μm at the root supported by support structure 1 and 50 μm at the tip end, and the main shaft 321 is tapered, made thinner from the root to the tip end portion. Film 323 is of polyimide, of which size is about 1 cm in the forward/backward direction, about 4 cm in the left/right direction, and the thickness was about 2 μm.

Figure 20:
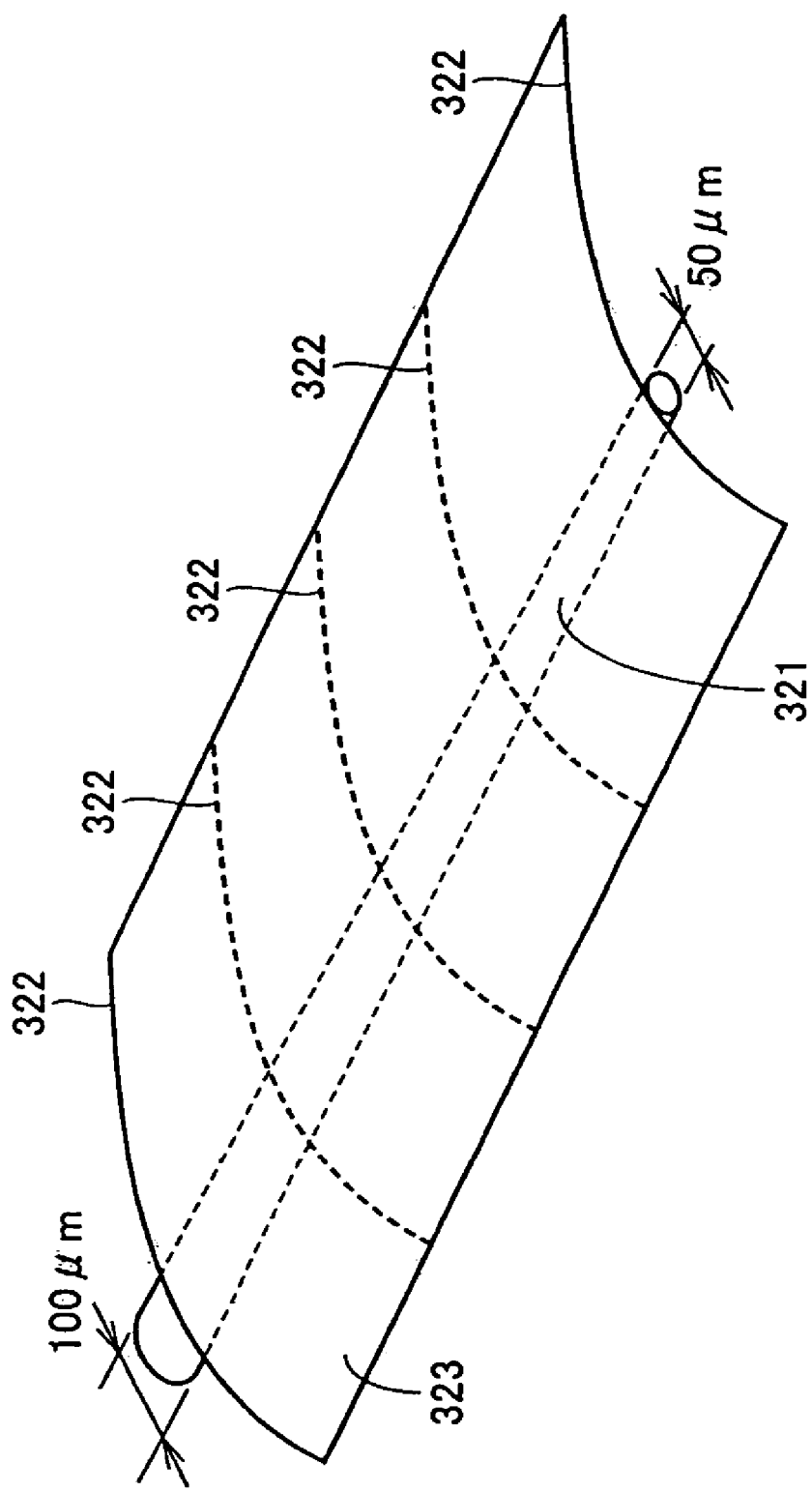
FIG. 20 is an enlarged perspective view showing the wing of the fluttering sensing robot in accordance with an embodiment.

In left wing 32 shown in FIG. 20, main shaft 321 is enlarged in its thickness, for easier description. The right wing 31, not shown, is attached to the support structure to be mirror-symmetry with the left wing 32, with the xz plane at the center.

The operation of the wing will be described with reference to the left wing 32 as an example.

Left actuator 22 is capable of rotating left wing 32 with three degrees of freedom. Namely, the state of driving of left wing 32 can be represented as the attitude of left wing 32. For the simplicity of description, in the following, the attitude of left wing 32 will be defined as follows, based on the state shown in FIG. 19.

Figure 21:
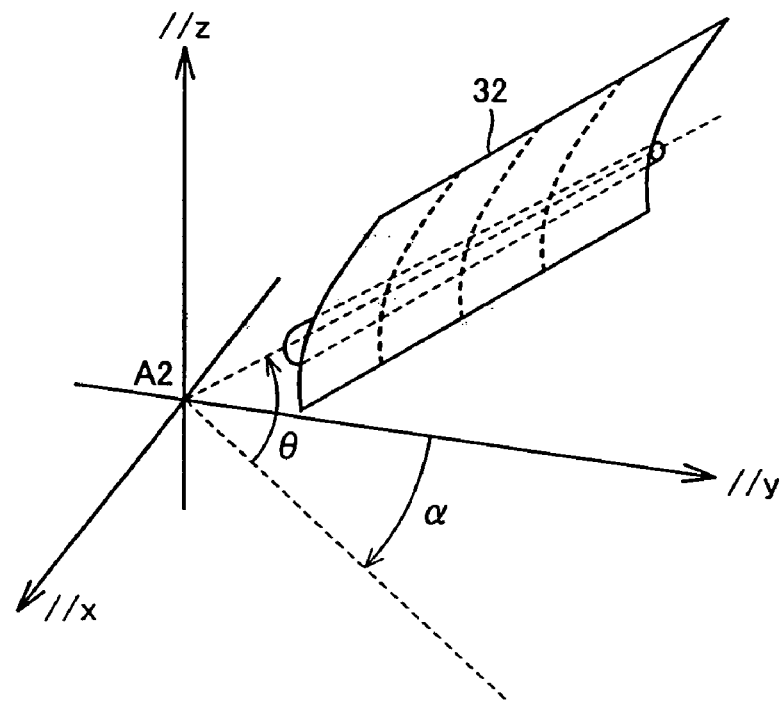
FIG. 21 represents a stroke angle θ and a declination α of the wing of the fluttering sensing robot in accordance with an embodiment.

First, referring to FIG. 21, using a plane parallel to the xy plane and including a fulcrum of rotational motion of the main shaft (mechanical point of application A2) and axes (//x, //y) parallel to the x and y axes, respectively, as a reference, an angle formed by a line connecting the point A2 and the root of main shaft 321 of left wing 32 with that plane is referred to as a stroke angle θ of fluttering. Further, using a plane parallel to the yz plane and including a fulcrum of the rotational motion of the main shaft (mechanical point of application A2) and axes (//y, //z) parallel to the y and z axes, respectively, as a reference, an angle formed by a line connecting the point A2 and the root of main shaft 321 of the left wing 32 and that plane is referred to as declination α.

At this time, the stroke angle θ is considered positive when it is above the plane parallel to the xy plane, and negative when it is below that plane. The declination α is considered positive when it is in front of the plane parallel to the yz plane and negative when it is behind.

Figure 22:
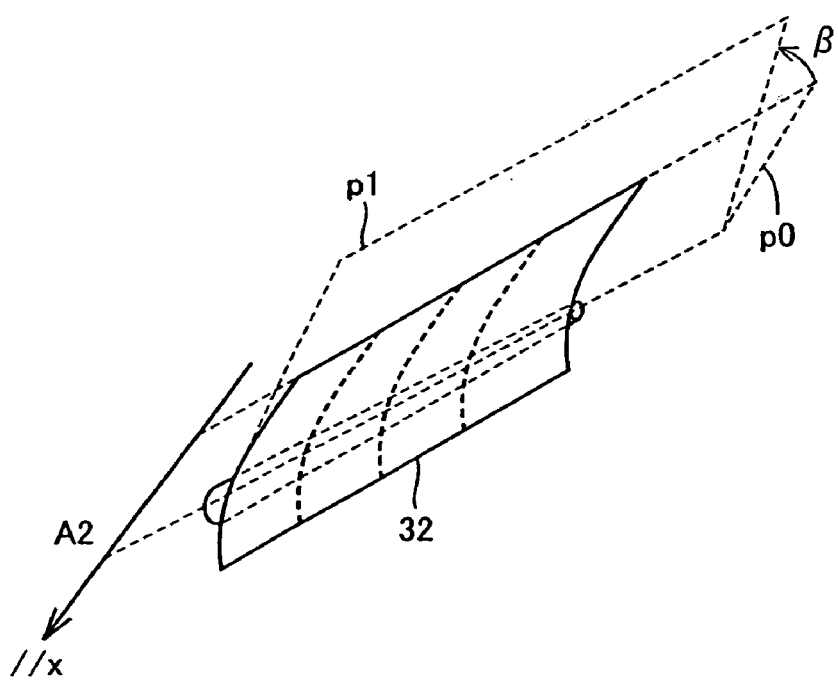
FIG. 22 represents a torsion angle β of the wing of the fluttering sensing robot in accordance with an embodiment.

Referring to FIG. 22, an angle formed by a tangential plane p1 of film 323 at the root of main shaft 321 of left wing 32 with a plane p0 passing through the point A2 and including the axis (//x) parallel to the x axis and the main shaft 321 is referred to as torsion angle β. Here, the torsion angle β in the clockwise direction when viewed from the root to the tip end of main shaft 321 is considered positive.

(Actuator)

Actuators will be described with reference to FIGS. 23 to 27.

The actuator for operating the wing of robot 90 in accordance with the present embodiment is driven by progressive waves generated by a piezo-electric element (piezo element), as it has large torque, ensures reciprocating operation and has a simple structure. Generally, an actuator referred to as an ultrasonic motor is used.

Figure 23:
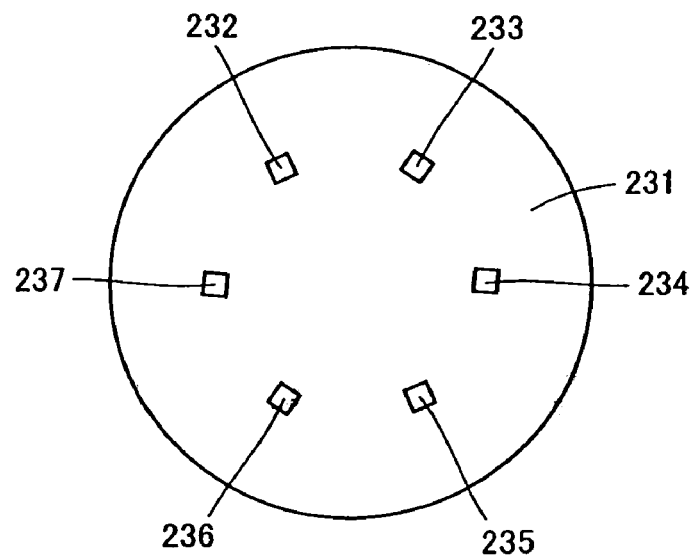
FIGS. 23 to 25 are illustrations of a stator portion of an actuator used for fluttering of the fluttering sensing robot in accordance with an embodiment.
Figure 24:
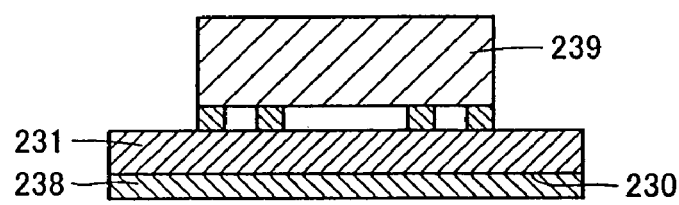
Figure 25:
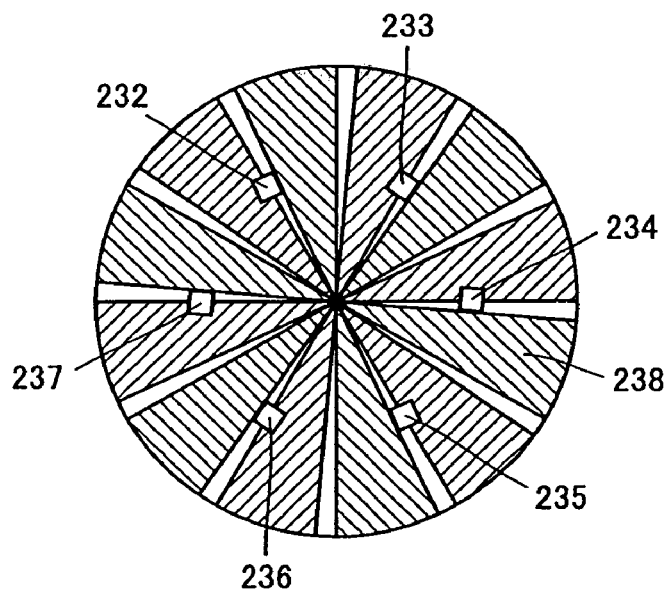

FIGS. 23 to 25 represent a commercially available ultrasonic motor 23. Referring to FIG. 23, a piezo-electric element 230 is adhered on a lower surface of an aluminum disc 231, and projections 232 to 237 are provided at six positions, so as to form a regular hexagon, with the center of the disc being the center of gravity. Further, electrodes 238 divided into 12 along the circumferential direction are arranged on the lower surface of piezo-electric element 230. FIG. 24 schematically shows this structure. Every other electrode is electrically short-circuited. A voltage is applied, with the disc 231 being the reference, to each electrode.

Specifically, voltages of different phases are applied to the piezo-electric element 230, as represented by hatched and non-hatched portions of FIG. 25. By changing with time the voltage to be applied to each electrode, a progressive wave is generated on disc 231, so that tip end portions of projections 232 to 237 perform elliptic motion, constituting a stator. The stator is capable of a rotor 239 arranged in contact with the stator such that the rotor is rotated along the circumferential direction, by the elliptic motion of the tip ends of projections 232 to 237.

The ultrasonic motor 23 has the torque of 1.0 gf·cm, rotation speed with no-load of 800 rpm and maximum current consumption of 20 mA. The diameter of disc 231 is 8 mm. Projections 232 to 237 are arranged at an interval of 2 mm. The thickness of the disc 232 is 0.4 mm. The height of projections 232 to 237 is about 0.4 mm. Driving frequency of piezo-electric element 230 is 341 kHz.

In the present embodiment, an actuator utilizing this stator portion is used. Right actuator 31 has such a structure that has the spherical rotor 219 pinched between a bearing 211 and a stator 210 similar to the stator described above, as shown in FIG. 27.

The portion of stator 210 which is in contact with rotor 219 is processed to conform to the surface of rotor 219. Rotor 219 is of a spherical shape having an outer diameter of 3.1 mm and an inner diameter of 2.9 mm, and right wing main shaft 311 is attached to the surface thereof. When an operation is performed to convey rotor 219 clockwise to that surface of stator 210 which has the projections thereof (hereinafter the rotation will be referred to as forward rotation, and rotation in the opposite direction will be referred to as backward rotation), the main shaft 311 of the right wing moves in the direction θ of FIG. 27.

Figure 26:
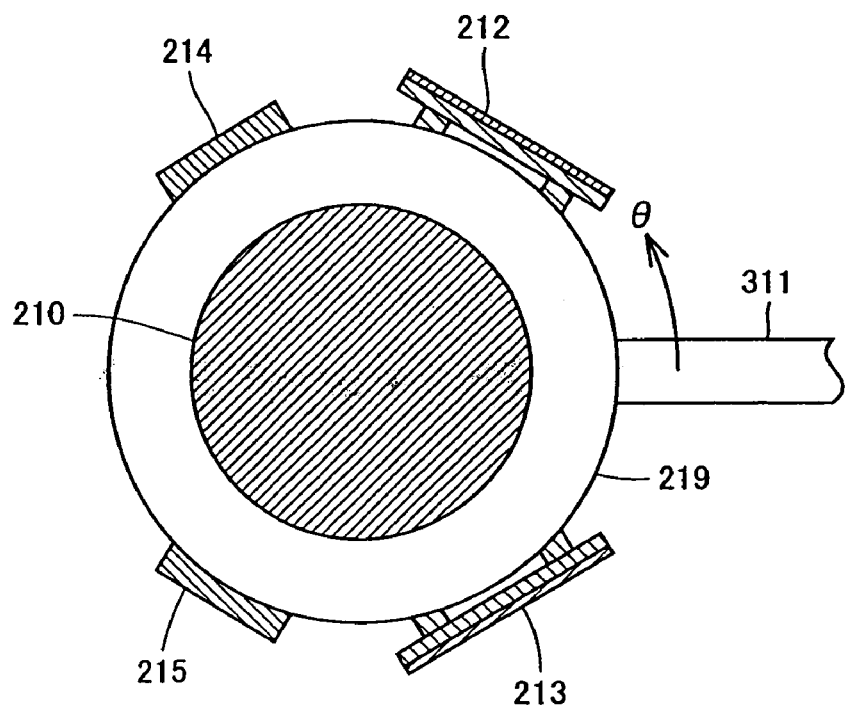
FIGS. 26 and 27 are illustrations of the actuator formed by using the stator for fluttering of the fluttering sensing robot in accordance with an embodiment.
Figure 27:
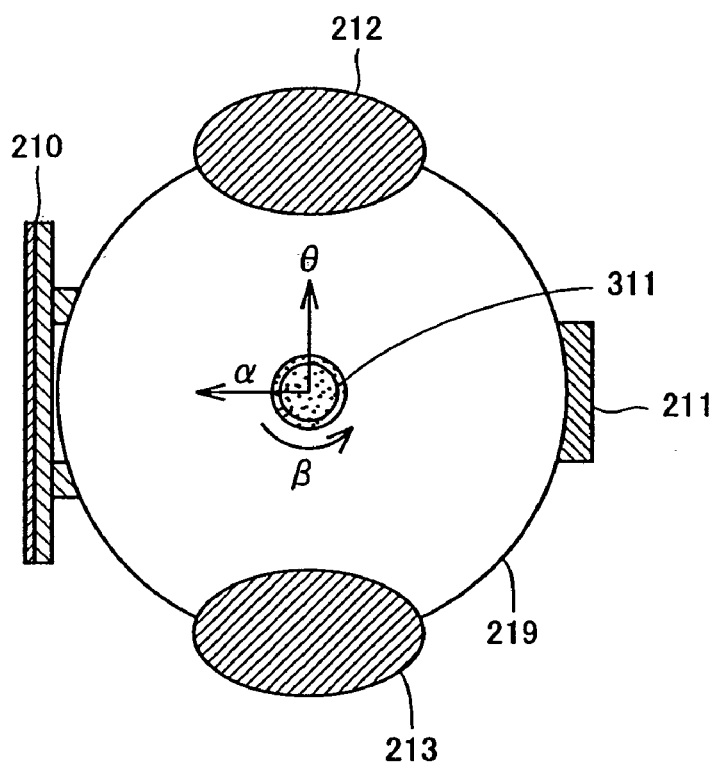

In order to drive rotor 219 with three degrees of freedom, an upper auxiliary stator 212, a lower auxiliary stator 213 and bearings 214 and 215 are further arranged as shown in FIG. 26. The size of each auxiliary stator is about 0.7 times that of stator 210.

Though directions of driving respective stators are not necessarily orthogonal, mutually independent rotations can be realized in these elements. Therefore, by the combination of these motions, it is possible to drive rotor 219 with three degrees of freedom.

For example, by causing forward rotation of rotor 219 by upper auxiliary stator 212 and generating forward rotation by lower auxiliary stator 212, it is possible to rotate rotor 219 in the direction β. By causing backward rotation of rotor 219 by upper auxiliary stator 212 and forward rotation by lower auxiliary stator 212, it is possible to rotate rotor 219 in the direction α.

In actual driving, combining two rotations of different centers of rotation will lower efficiency, because of friction. Therefore, it is desirable to adopt such a method of driving that the upper auxiliary stator 212 and the lower auxiliary stator 213 are operated alternately in a very short period, while the projection of the stator which is not in operation is prevented from contacting rotor 219. This can readily be attained without the necessity of adding any element, by applying a voltage to every electrode of the stator, in the direction of contraction of the piezo-electric element.

The frequency of piezo-electric element is at least 300 kHz, which is sufficiently higher than the fluttering frequency which is, at most, about 100 Hz. Therefore, even when actuators are operated alternately, substantially smooth motion can be generated through the main shaft 311 of the right wing. Therefore, an actuator with three degrees of freedom is provided, which has characteristics comparable to a conventional ultrasonic motor used for study by the inventors.

As the amplitude of the progressive wave generated by the stator is in the order of submicrons, it is necessary that the rotor has the sphericity of this order. Processing accuracy of a paraboloidal mirror used in civil optical products is about several tens nm, and processing accuracy of optical components used for optical interferometer is about several nm. Therefore, it is possible to form such a rotor by existing processing method.

It should be understood that this is only an example of an actuator realizing motion with three degrees of freedom of the wing implemented by an ultrasonic motor. Arrangement, size, material and the method of driving various components are not limited to those described above, provided that physical functions such as torque required for fluttering flight can be realized.

Further, it should be understood that the wing driving mechanism and the type of actuator used therefor are not limited to those described in the present embodiment. For example, fluttering flight using a combination of exoskeleton structure and a linear actuator such as proposed in Japanese Patent Laying-Open No. 5-169567 may be possible, as wing operation equivalent to that provided by the actuator of the present embodiment is realized.

Though electric power is used as driving energy, an internal combustion engine may be used. An actuator utilizing physiological oxidation-reduction reaction for converting chemical energy to kinetic energy, as can be seen in the muscle of insects, may be used. For example, muscle obtained from insects may be used as a linear actuator, or artificial muscle of composite material by combining, at a molecular level, amino acid of protein of the muscle of an insect with an inorganic substance may be used as a linear actuator.

It is also possible to provide an actuator with high energy efficiency such as the internal combustion engine mentioned above for basic driving power, and an actuator driving with electric power may be used for controlling the same or as an assistant.

(Method of Flight)

The method of flight will be described next, with reference to FIGS. 28 to 34.

Here, the force received by the wing from the fluid will be referred to as fluid force. For simplicity of description, it is assumed that air flow occurs only by the fluttering, that is, the apparatus is in a perfectly calm state.

For simplicity of description, it is also assumed that external force acting on robot 90 is only the fluid force received by the wing from the fluid and the gravity.

For the robot 90 to fly constantly, it is necessary that the following relation is satisfied in average of one fluttering operation.

(Sum of Vertically Upward Fluid Forces Acting on the Wing)>(Gravity Acting on Robot 90).

Here, a method by which the fluid force in a down stroke is made large than the fluid force in an up stroke will be described, which method corresponds to a simplified manner of fluttering of an insect. For simplicity of description, the behavior of the fluid or the force of the fluid on wing will be described with reference to main components thereof The magnitude of the buoyancy force obtained by the fluttering and the gravity acting on robot 90 will be described later.

On the wing, fluid force in the direction opposite to the direction of motion of the wing acts. Therefore, in a down stroke of the wing, fluid force acts upward on the wing, and in an up stroke, fluid force acts downward on the wing. Therefore, an upward fluid force can be obtained by time average in one fluttering operation (down stroke and up stroke), when fluid force for the down stroke is made larger and the fluid force for the up stroke is made smaller.

For this purpose, the down stroke should be such that the volume of a space in which the wing moves is maximized, so that almost maximum fluid force acts on the wing. This corresponds to down stroke of the wing approximately vertical to the tangential plane of the wing.

For the up stroke, the wing should be moved upward such that the volume of the space in which the wing moves is minimized, so that the fluid force acting on the wing is almost minimized. This corresponds to up stroke of the wing approximately along the curve of wing cross section.

Figure 28:
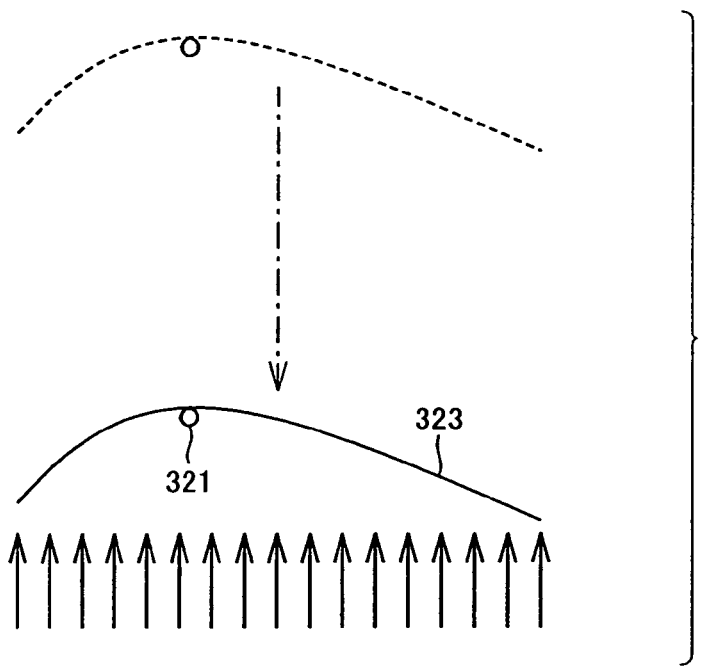
FIG. 28 represents a down stroke of the fluttering operation of the fluttering sensing robot of an embodiment.

Such operation of the wing will be described with reference to a cross section vertical to the main shaft 321 of the wing. FIG. 28 shows a down stroke made to maximize the volume of the space in which the wing moves and FIG. 29 shows an up stroke made to minimize the volume of the space in which the wing moves.

Figure 29:
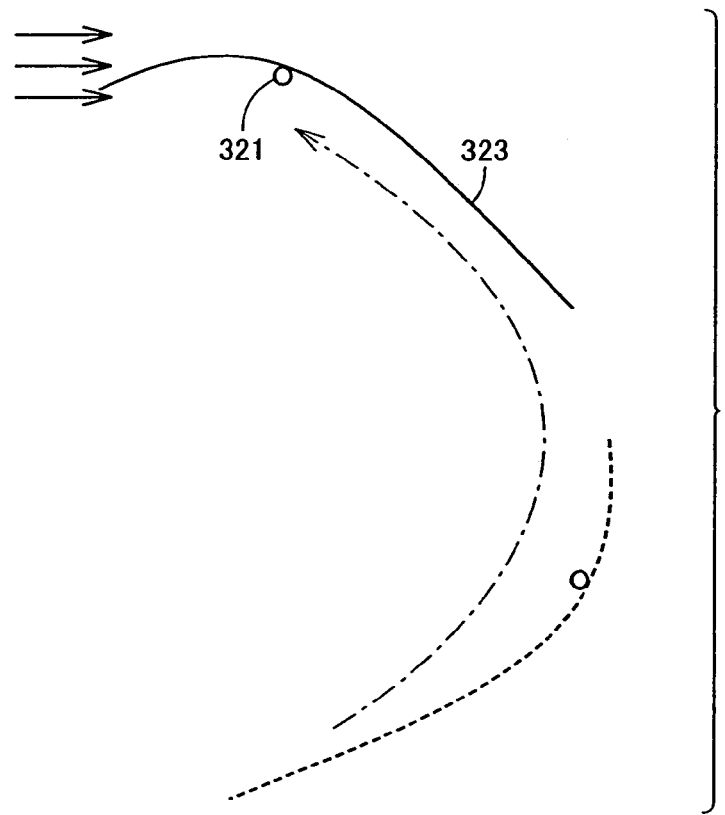
FIG. 29 represents an up stroke of the fluttering operation of the fluttering sensing robot in accordance with an embodiment.

In FIGS. 28 and 29, the position of the wing before movement is represented by a dotted line, and the position of the wing after movement is represented by the solid line. Further, the direction of movement of the wing is represented by a chain dotted arrow. Further, the direction of the fluid force acting on the wing is represented by solid arrows. As can be seen in the figures, the fluid force acts on the wing in the direction opposite to the direction of movement of the wing.

In this manner, the attitude of the wing is changed relative to the direction of movement of the wing such that the volume of the space in which the wing moves in the up stroke is made larger than the volume of the space in which the wing moves in the down stroke, whereby the upward fluid force acting on the wing can be made larger than the gravity acting on the robot 90 as the sensing robot, in time average of one fluttering operation.

In the present embodiment, torsion angle $\beta$ can be controlled, and the above described wing motion is realized by changing with time the torsion angle.

Figure 30:
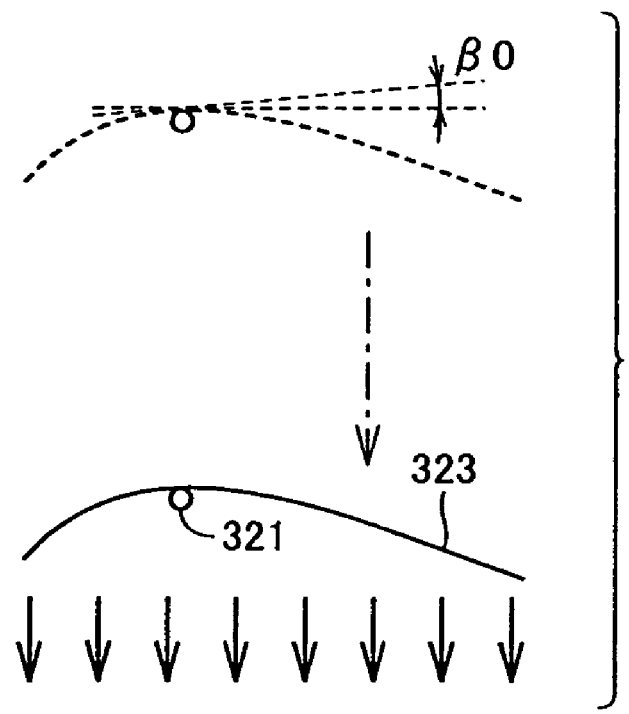
FIGS. 30 to 33 show the first to fourth states of the fluttering operation of the fluttering sensing robot in accordance with an embodiment.
Figure 31:
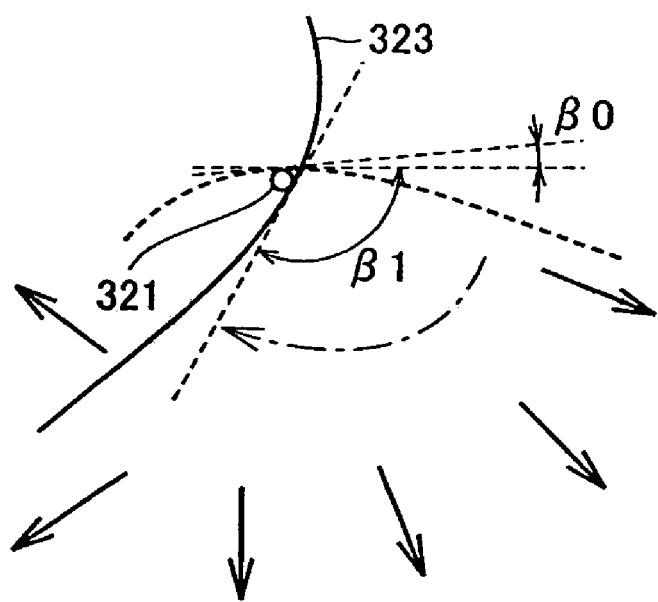
Figure 32:
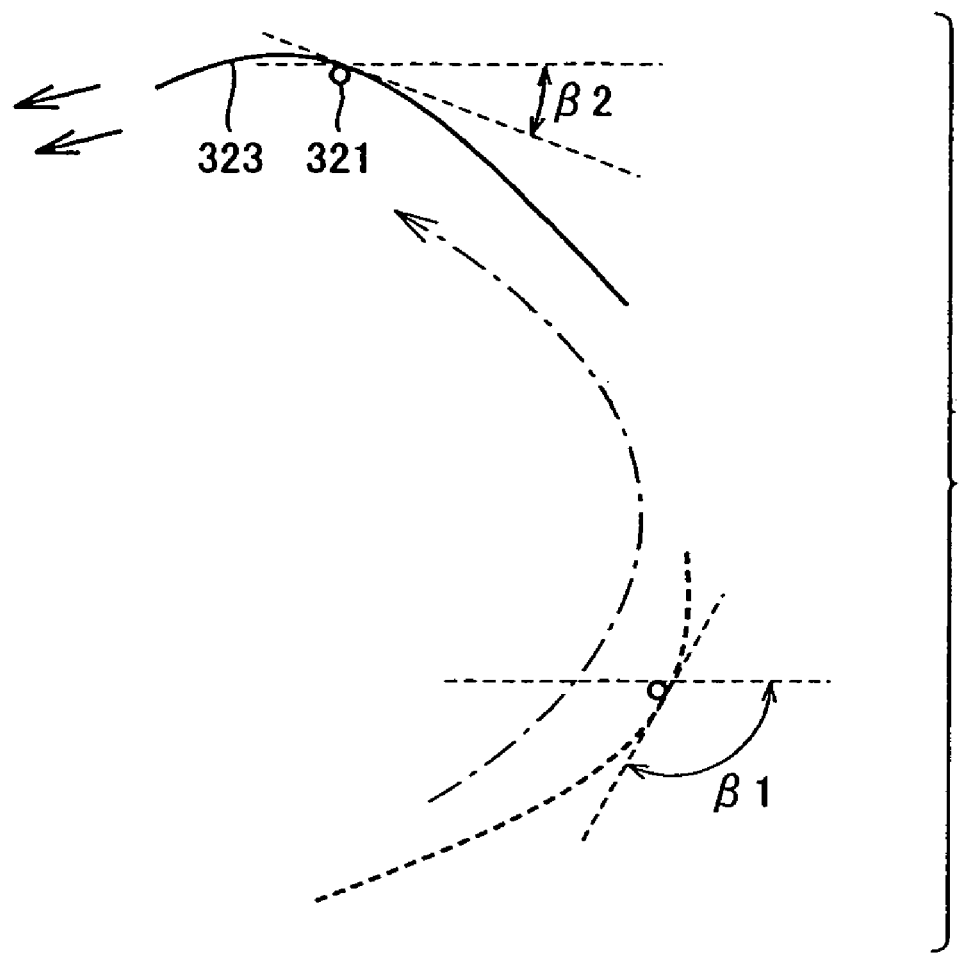

More specifically, the following steps S1 to S4 are repeated. First, in step S1, the wing is moved downward as shown in FIG. 30 (stroke angle $\theta = +\theta_0 \rightarrow -\theta_0$). In step S2, the wing rotation 1 operation (torsion angle $\beta$ of the wing=$\beta_0 \rightarrow \beta_1$) is performed as shown in FIG. 31. Instep S3, the wing is moved upward as shown in FIG. 32 (stroke angle $\theta = -\theta_0 \rightarrow +\theta_0$, torsion angle $\beta = \beta_1 \rightarrow \beta_2$ (a motion along the curve of the wing cross section so as to maintain the fluid force minimum)). In step S4, wing rotation 2 operation (torsion angle $\beta$ of the wing=$\beta_2 \rightarrow \beta_0$) is performed as shown in FIG. 33.

When the fluid forces acting on the wing in steps S1 and S3 are time-averaged upward fluid force, because of the difference in space in which the wing moves, as described above. Relation of magnitude between the vertical component of the upward fluid force and gravity will be described later.

Naturally, it is desired that time-average of the fluid forces acting on the wing in steps S2 and S4 results in upward fluid force.

Figure 33:
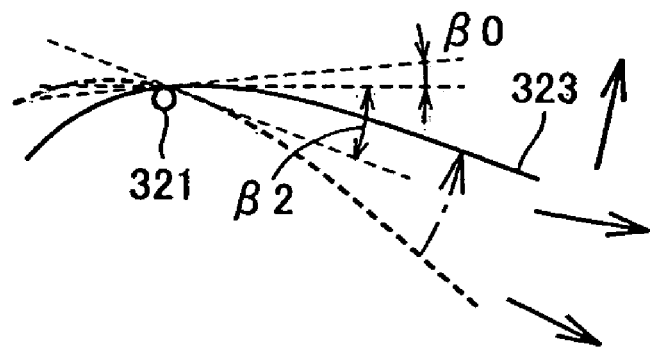

In the fluttering apparatus, the center of rotation of the wing (the portion of main shaft 321) is positioned near a front edge of the wing, as shown in FIGS. 30 to 33. More specifically, the length from main shaft 321 to the rear edge of the wing is longer than the length from main shaft 321 to the front edge of the wing. Therefore, as shown in FIGS. 31 to 33, in the rotating operation of the wing, in addition to the flow of the fluid generated along the direction of rotation of the wing, a flow of the fluid is generated along the direction from the main shaft 321 to the rear edge of the wing.

As a reaction of such flows of the fluid, forces opposite in direction to these flows act on the wing as a result, therefore in step S2 shown in FIG. 31, substantially upward fluid force is applied to the wing, and in step S4 shown in FIG. 33, mainly downward fluid force is applied to the wing.

In step S3 shown in FIG. 32, an up stroke is made with the torsion angle $\beta$ changed from $\beta_1$ to $\beta_2$ along the curve of the wing cross section. The angle of rotation of the wing in step S2 shown in FIG. 31 is larger than the angle of rotation of the wing in step S4 shown in FIG. 33. Therefore, in steps S2 and S4 also, the fluid force acting upward on the wing becomes stronger than the fluid force acting downward, and by time average, an upward fluid force acts on the wing.

In FIGS. 30 to 33, the attitude of the wing before movement in respective steps 1 to S4 is represented by the dotted line and the attitude after movement is represented by the solid line. The direction of movement of the wing in respective steps S1 to S4 is represented by the chain dotted arrow. The flow of fluid mainly generated in steps S1 to S4 is represented by solid arrows.

Figure 34:
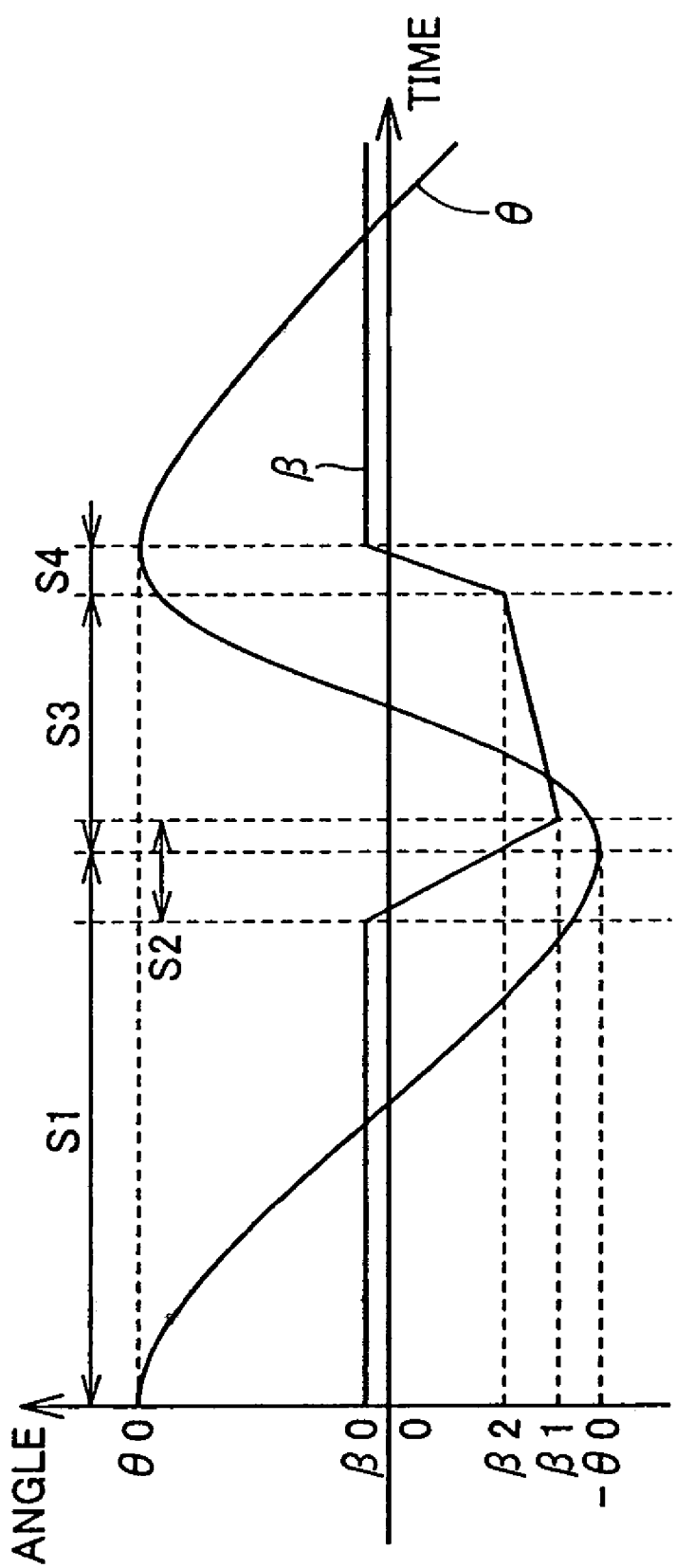
FIG. 34 is a first graph showing time dependency of the wing drive in the fluttering operation of the fluttering sensing robot in accordance with an embodiment.

FIG. 34 is a graph representing the values of stroke angle $\theta$ and torsion angle $\beta$ as functions of time. In FIG. 34, it is noted that the ratios of the ordinates for the stroke angle $\theta$ and torsion angle $\beta$ are different.

In the experiment performed by the inventors, $\theta_0$ is, for example, 60°. The value $\beta_0$ is, for example, 0°, $\beta_1$ is −120° and $\beta_2$ is −70°.

In the description, steps S1 to S4 are described as independent operations, for simplicity of description. An operation, however, is also possible in which the torsion angle of the wing is enlarged while the wing is moved downward in step S1.

Further, the example described above comes from primary approximation, and the method of fluttering that actually enables rising is not limited thereto.

Though description has been made with respect to the left wing, the same applies to the right wing, by defining the stroke angle $\theta$, declination $\alpha$ and torsion angle $\beta$ for the left hand system, which is in mirror-symmetry with respect to the xz plane. In the following, the upward fluid force acting on the wing will be referred to as buoyancy force, and a forward fluid force acting on the wing will be referred to as propulsion.

(Method of Control)

The method of control enabling arbitrary motion of robot 90 will be described next. Here, the stroke angle θ, declination α and torsion angle β based on the right hand system will be used for the left wing and the stroke angle θ, declination α and torsion angle β based on the left hand system in mirror symmetry with respect to the xz plane are used for the right wing, to represent the attitude of the wings.

(Control Flow)

The flying movement by fluttering is realized by the fluid force exerted on the wing. Therefore, what is directly controlled by the wing motion is acceleration and angular acceleration applied to the robot 90.

Figure 59:
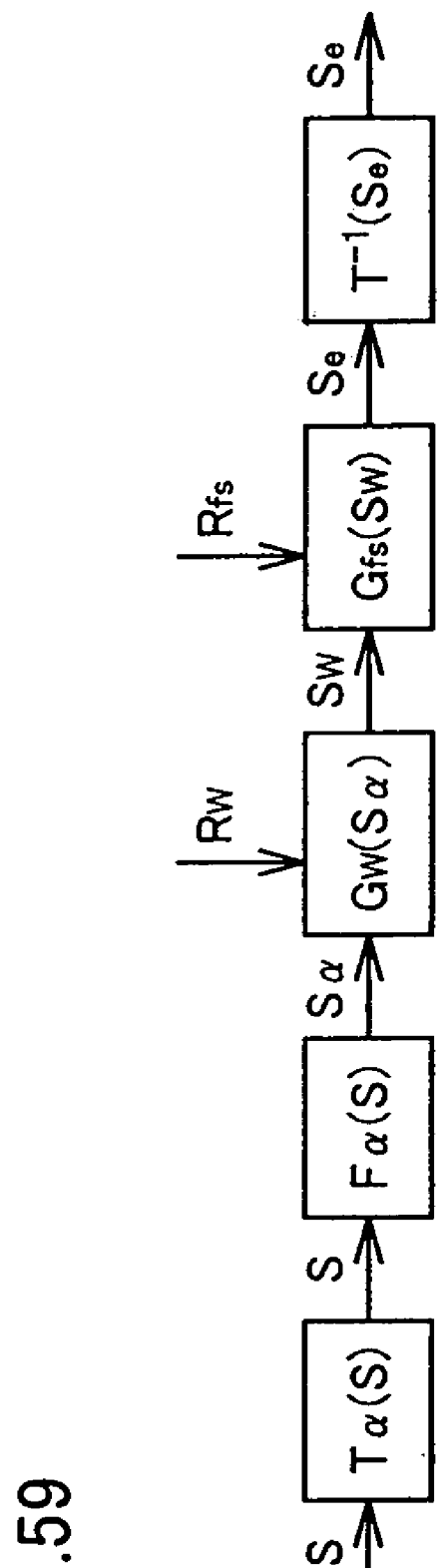
FIG. 59 is an illustration representing control functions for fluttering flight control.
Figure 62:
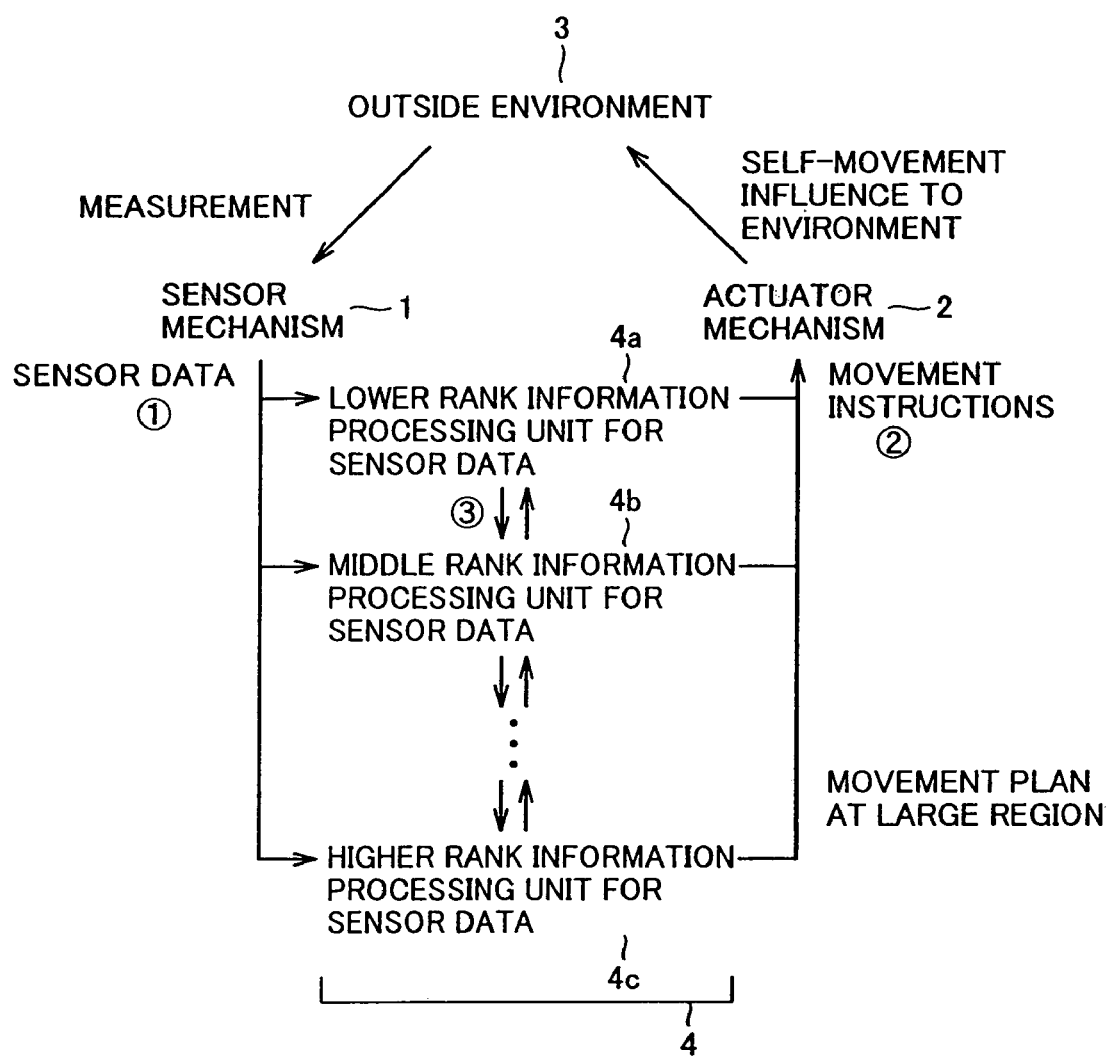
FIG. 62 represents a conventional system for recognizing environment, having a plurality of sensors with the information processing mechanism of the sensors being hierarchical.

First, the process through which an output Se is obtained from an input S is as shown in FIG. 59, where S represents difference between the target state of flight and the present state of flight, T(S) is a function representing conversion from the state of flight to acceleration and angular acceleration, s represents acceleration, angular acceleration Fα (s) represents a function of a control algorithm including sensor response of acceleration sensor 51 and angular acceleration sensor 53, sα represents actuator control amount, Gw (sα) is a function representing response of actuator and the wing, $s_w$ represents wing motion, $G_{fs}$ (sw) is a function representing acceleration or angular acceleration $s_e$ exerted on the robot 90 by the wing motion, and Se represents change in the state of flight attained by the series of processes.

Actually, by the inertial force of the wing and the fluid, influences Rw and $R_{fs}$ that depend on time history of the wing motion and the fluid motion sa far are added to Gw and $G_{fs}$.

(Division of Operation)

There is naturally a method of accurately calculating all functions other than Fα to calculate control algorithm Fα which realizes S=Se. For this method, time history of the fluid flow around the fluttering apparatus and the wing motion is necessary, which means that a formidable amount of data and high speed of arithmetic operation are necessary. The behavior resulting from the link between the fluid and the structure is so complicated that in most cases, the response would be chaotic, and hence such a method is impractical.

Therefore, a method in which basic operation patterns are prepared in advance, the target state of flight is divided and realized by time-sequentially combining the basic operation patterns is desired, as it is simple.

A motion of an object includes three translational degrees of freedom in x, y and z directions, and three rotational degrees of freedom in $\theta_x$, $\theta_y$ and $\theta_z$ directions, that is, 6 degrees of freedom. Namely, freedom in forward/backward directions, left/right directions and upward/downward directions as well as rotations in these directions.

Among these, the movement in left/right direction can be realized by combining rotation in the $\theta_z$ direction and movement in the forward/backward direction. Therefore, here, the method of realizing translational movement in the forward/backward direction, that is, along the x axis, translational operation in the upward/downward direction, that is, along the z direction and rotational operations about the x, y and z axes will be described.

(Operation)

(1) Operation in the Upward/Downward Direction (Along the z Axis)

As the wing moves, the force exerted by the fluid on the wing depends on the speed of movement of the wing, and therefore, in order to increase (decrease) the upward fluid force acting on the wing, possible options include A: to increase (decrease) amplitude of stroke angle θ, and
B: to increase (decrease) fluttering frequency.

By such operation, the robot 90 may move upward (downward). Here, it is noted that the fluid force includes a negative value.

According to such approaches, the fluid force itself from the fluid to the wing increases. When there is any force exerted from a direction other than the upward/downward direction from the wing to the mechanical fulcrum of the wing as the fluid force is received by the wing from a direction other than the upward/downward direction, as the apparatus moves upward, the force acting on the fulcrum also increases in that direction. For example, when the apparatus is making a substantially uniform, forward linear motion and the fluttering frequency is increased, the fluttering apparatus moves upward with the velocity increased. In this manner, such a secondary motion occurs depending on the manner of fluttering at that time point. In the following, control from the hovering state will be described, unless noticed otherwise.

Further, the buoyancy force changes when the volume of the space in which the wing moves is changed by changing the torsion angle β of the wing. For example, by setting an angle β such that the volume of the space in which the wing moves in an up stroke is larger or the volume of the space in which the wing moves in a down stroke is smaller, the time average of the upward fluid force acting on the wing becomes smaller.

Actually, the wing is not a rigid body and it deforms. Therefore, the volume of the space in which the wing moves differ even when the angle β is the same. According to the primary principle, the angle β which is vertical to the direction of movement of the wing provides the largest volume of the space in which the wing moves. Further, the angle β which is parallel to the direction of movement of the wing provides the smallest volume of the space in which the wing moves.

Here, secondary, the fluid force also acts in the direction vertical to the fluttering. If this action is of such a level that causes any problem in control, it becomes necessary to add wing motion that cancels such an action. It is realized, in the simplest manner, by changing the declination α.

It is also possible to perform the operation along the z axis by changing the rotational angular speed of the wing in the above described step S2 or S4. For example, when the rotational angular speed (−dβ/dt) of the wing is increased in step S2, downward flow rate of the fluid generated by the rotation increases, and by the reaction thereof, the upward fluid force acting on the wing increases.

Here, the torque of which axis of rotation is the main shaft of the wing, which acts on the robot 90, changes as a secondary result. Therefore, the change of the rotational angular speed should desirably be performed within such a range in that the change of the torque does not affect control.

Further, here the force in the forward/backward direction acting on the robot 90 also changes as a secondary result. Therefore, if the change affects controlled flight, control of the force in the forward/backward direction should desirably be performed simultaneously, which will be discussed in item (2) below.

(2) Operation in the Forward/Backward Direction (Along the x Axis)

In the above described method of fluttering, the fluid force in the x direction acts on the wing mainly in steps S2 and S4. Therefore, by such an operation of the wing, the apparatus rises while moving forward.

When the declination a is increased in a down stroke and the wing is moved forward, a backward fluid force will act on the wing. Therefore, when the backward fluid force acting on the wing in step S1 is made larger than the forward fluid force mainly in the steps S2 and S4, the apparatus moves backward, and when the backward fluid force is made smaller, the apparatus moves forward, by controlling declination cc in step S1, that is, in the down stroke. When these two forces are substantially balanced, the apparatus can stand still in the forward/backward direction.

Especially, when the robot 90 stands still in the forward/backward direction, the left and right wings perform substantially symmetrical motions and the gravity is balanced with the buoyancy force of the fluttering apparatus, hovering is possible.

As the vertical component of the fluid force acting on the wing changes as a secondary result of the change in declination $\alpha$, it becomes necessary to add wing motion that cancels this component, if the component is of such a level that affects control. This is mainly performed, in a simple manner, by the operation in the upward/downward direction described in item (1) above.

Further, when the angular velocity of rotational operation of the wing is increased in steps S2 and S4 described above, forward fluid force increases, and when it is decreased, the fluid force decreases. Thus, operation in the forward/backward direction can be changed.

Further, it is possible to utilize the component in the x direction of the secondary fluid force associated with the change in torsion angle $\beta$ of the wing described in item (1). More specifically, when $\beta>0$ in a down stroke, there is a forward force and when $\beta<0$, there is a backward force, on the apparatus.

Though the relation between each of $\beta$, $\alpha$ and $\theta$ in an up stroke is limited to some extent, the above described fluid force control is also possible in step S3.

(3) Rotational Operation with z Axis being the Axis of Rotation

By performing the control in the forward/backward direction described in item (2) separately for the left wing and the right wing to be different from each other, a torque can be applied to the fluttering apparatus.

More specifically, when the forward fluid force on the right wing is made higher than that of the left wing, the robot 90 turns to the left with respect to the positive direction along the x axis, and when it is made lower, the apparatus turns to the right.

(4) Rotational Operation with x Axis being the Axis of Rotation

Similar to (3), when the upward fluid force of the right wing is increased to be larger than that of the left wing, the right side is lifted and when it is made smaller, the left side is lifted. Thus, rotational operation about the x axis as the axis of rotation is possible.

(5) Rotational Operation with y Axis being an Axis of Rotation

By changing the angular velocity of torsion angle $\beta$ of the wing described in (2), the torque about the y axis acting on the robot 90 can be changed. Thus, rotational operation about the y axis as the axis of rotation is possible. For example, when the rotational angular velocity of torsion angle $\beta$ in step S1 is increased, the nose of the fluttering apparatus moves downward, and when it is decreased, the nose moves upward.

(6) Hovering

Figure 35:
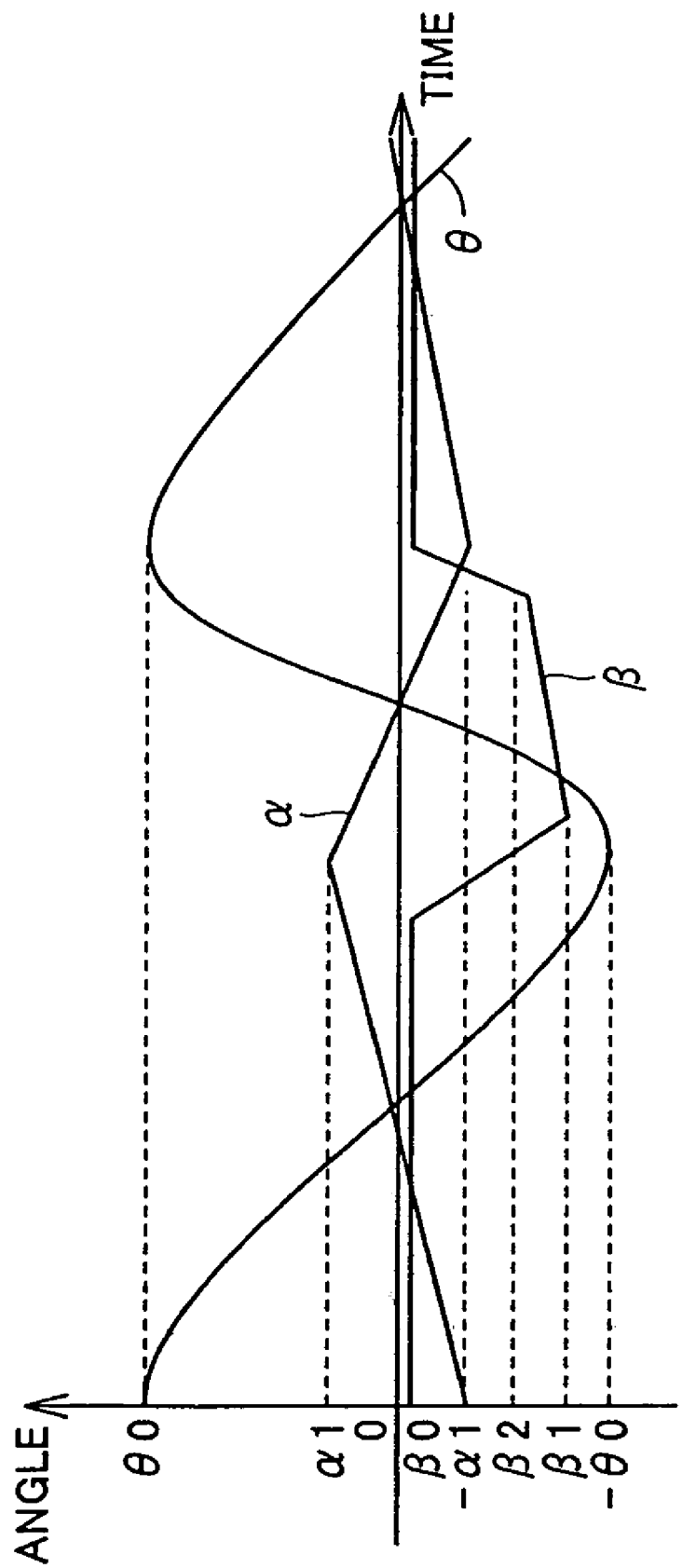
FIG. 35 is a second graph representing time dependency of wing drive of the fluttering operation of the fluttering sensing robot in accordance with an embodiment.

FIG. 35 is a graph representing the values of the stroke angle $\theta$, declination $\alpha$ and torsion angle $\beta$ when the fluttering apparatus is hovering, as functions of time. In FIG. 35, the ratio of the angles are different from that of the coordinate.

In the experiment performed by the inventors, by way of example, $\theta_0$ is 60°, $\beta_0$ is −10°, $\alpha_1$ is 30°, $\beta_1$ is −100° and $\beta_2$ is −60°.

FIG. 60 represents motions of the left wing in respective steps and acceleration and angular acceleration generated by the motions at the mechanical fulcrum A2 of the left wing. It is noted, however, that rotational operation about the x and z axes as axes of rotation discussed in (3) and (4) above are not shown. These operations are attained by asymmetrical motions of the left and right wings, as already described.

(Manner of Determining Control Method)

The present status of flight is found by using values that are provided by appropriately changing the values obtained by acceleration sensor 51 or angular acceleration sensor 52 mounted on the robot 90. For example, the velocity can be calculated by applying an initial value of velocity to a value obtained by time-integration of acceleration. The position can be calculated by applying an initial value of position to the value obtained by time-integration of velocity. Further, it is also possible to use a method which includes time history of flying status, to find the status of flight.

Control apparatus 4 determines operation of the robot 90 based on the current status of flight obtained from acceleration sensor 51 and angular acceleration sensor 52 and the target status of flight. Conventional control method is applicable to this control, except that the present control is in three dimensions.

The operation of the robot 90 is converted by control apparatus 4 to driving of the actuators. This conversion may be realized at high speed when table reference or complementation thereof is used. For example, basic operations and combinations of actuator drivings realizing the operations are prepared in advance, as shown in FIG. 61. In FIG. 61, the leftmost column represents target operation. Fluttering patterns A and B represent the pattern of fluttering for forward movement and for hovering, respectively, which are, more specifically, time-discrete time histories of $\alpha$, $\beta$ and $\theta$ represented in the graphs of FIGS. 34 and 35. Control apparatus 4 calculates the drive or the complemented drive from the table, based on the operation of robot 90.

Here, a method in which the operation of the fluttering apparatus is calculated and converted to actuator drive is used for convenience of description. It is also possible, however, to select driving of actuator directly from the status of flight.

For static control, for example, a method is possible in which of the actuator drives described above or complementation thereof may directly be calculated.

It is needless to say that physical amount representing the status of flight of the fluttering apparatus is not limited to the position, velocity, acceleration and the like mentioned above.

Further, the method of determining actuator drive is not limited to those described above.

(Weight that can be Lifted)

Next, the condition that enables lift of the configuration of robot 90 in accordance with the present embodiment will be described with reference to FIG. 36 in the experimental environment of the inventors, a progressive wave actuator is used as the actuator. When the progressive actuator is used, stator 210 is comparable to ultrasonic motor 23. Therefore, the torque with respect to the motion in $\theta$ direction is 1.0 gf·cm. Therefore, the inventors calculated the fluid force when the robot flutters with this torque, through simulation.

The wing is a rectangular having longer side of 4 cm and shorter side of 1 cm with the longer side in the direction away from the actuator, and deformation of the wing is neglected. As the mass of wing of a dragon fly having the width of 8 mm and the length of 33 mm was about 2 mg, the mass of the wing was made 3 mg, based on the values.

The ultrasonic motor 23 drives the rotor by accumulation of small elliptical motions at the tip end portion of the projections. Therefore, rise and fall of the actual driving torque is in the periodic order of elliptical motion, that is, in the order of $10^5$ Hertz. However, because of limitation from calculation stability, it was set to ±250 gf·c/sec. Namely, the torque increases by 1 gf·cm per every 0.004 sec.

Figure 36:
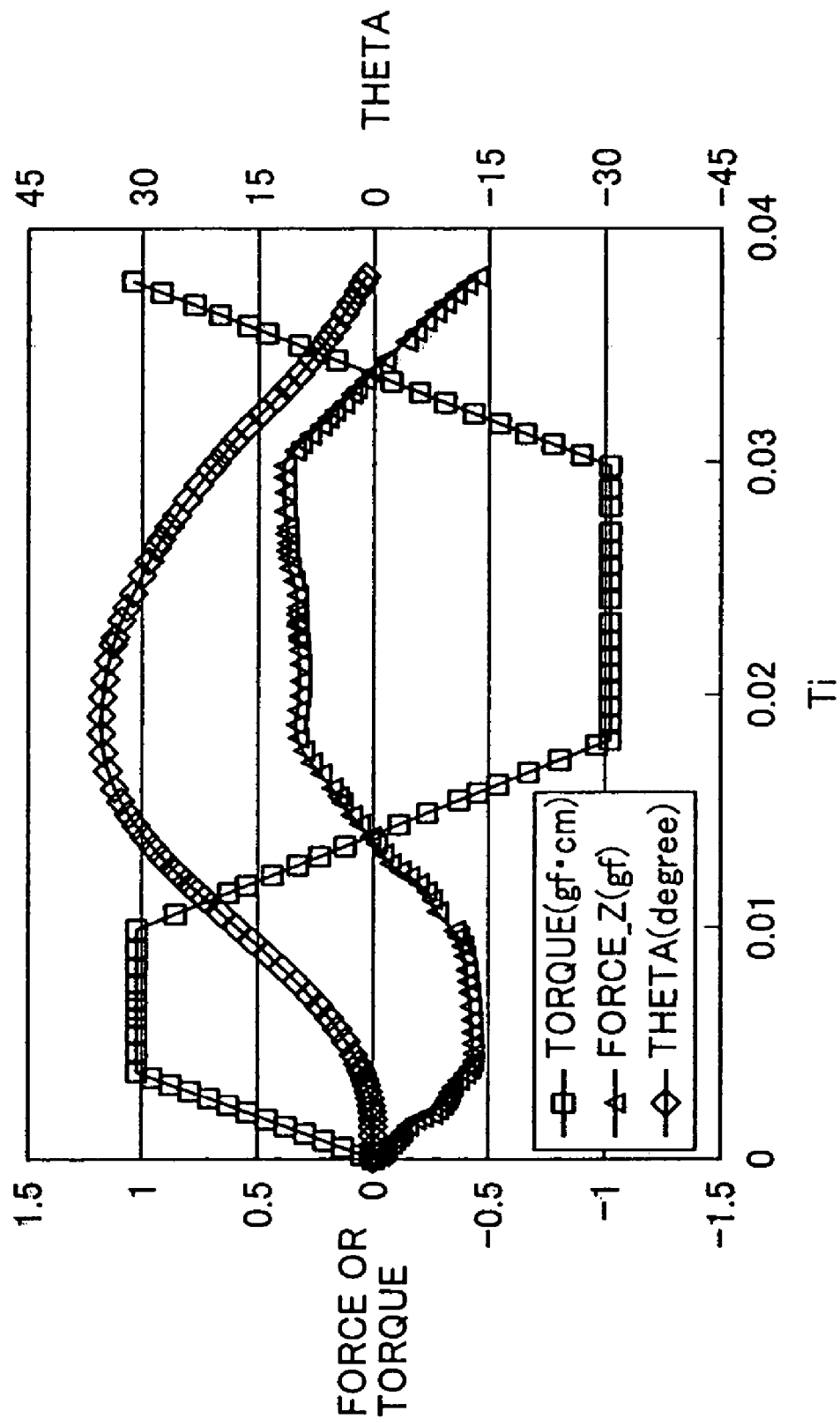
FIG. 36 is a graph showing result of simulation of actuator torque and supporting reaction when the wing of the fluttering sensing robot of the embodiment is driven.

One shorter side of the wing is fixed, leaving on the rotational degree of freedom with this side being the access of rotation, the torque is applied to the rotational degree of freedom, and reaction on the axis of rotation was calculated, with the result being shown in FIG. 36. Here, as defined above, declination $\alpha=0°$, and secondary angle $\beta=0°$.

At time 0, the wing is horizontal (stroke angle $\theta=0°$). The torque value is substantially linearly increased to 1 gf·cm from time 0 to 0.004 sec. From the time point 0.004 sec to 0.01 sec, the torque value is kept at 1 gf·cm. From 0.01 sec to 0.018 sec, the torque value is substantially linearly changed from 1 gf·cm to −1 gf·cm. From time point 0.018 sec to 0.03 sec, the torque value is kept at −1 gf cm. From time 0.03 sec to 0.038 sec, the torque value is substantially linearly changed from −1 gf·cm to 1 gf·cm.

The time-average of the fulcrum reaction during a down stroke, that is, from time 0.014 sec to 0.034 sec where the torque is negative, was about 0.29 gf.

As the simulation provides the result of fluttering operation with one degree of freedom, the action of the fluid force in an up stroke is unknown. The resistance of the fluid, however, decreases as compared with the cross section, and therefore, considering the fact that the downward fulcrum reaction acting in the up stroke is small and that up stroke with the same torque as for the down stroke is possible, the time necessary for the up stroke is considerably shorter than the time necessary for the down stroke.

The time of action of the force is relatively short in the up stroke and buoyancy force can also be obtained by wing rotation or the like in addition to that down stroke. Therefore, it is considered possible to lift an object having the mass of about 0.29 g, by using an actuator having the torque of 1 gf·cm. More specifically, when the mass of the entire fluttering sensing robot of the present embodiment is made at most 0.58 g, the fluttering robot can be lifted. The weight of the fluttering robot will be considered in the following.

First, stator 210 has the mass of 0.054 g, as it is comparable to a disc having the specific gravity of 2.7, thickness of 0.4 mm and the radius of 4 mm, as the electrode and the piezo-electric elements are thin.

The weight of the auxiliary stator is 0.019 g, as the diameter of the stator is 0.7 times the diameter of stator 210.

Three bearings are each a doughnut shaped ball bearing having the outer diameter of 4.2 mm, inner diameter of 3.8 mm and the thickness of 0.4 mm. The material of the bearing is titanium having the specific gravity of 4.8. As the bearing has an opening of about 30%, the mass of the bearing is about 0.013 g. The rotor is formed of aluminum and has wall center radius of 3 mm and the thickness of 0.2 mm. Thus, it is about 0.061 g. The mass of the actuator as the total sum of these is 0.192 g. Further, the wing is 0.003 g. as mentioned above. As there are right and left two such structures, the total is 0.390 g.

The support structure 1 employed by the inventors shown in FIG. 19 is a sphere having the diameter of 1 cm, specific gravity of 0.9 and the thickness of 0.1 mm. Therefore, the mass is about 0.028 g. Control apparatus 4, communication apparatus 7, acceleration sensor 51, angular acceleration sensor 52 and pyroelectric infrared sensor 53 employed by the inventors are each of a semiconductor bare chip of 5 mm×4 mm, each having the weight of about 0.008 g. Thus, total mass of these is 0.04 g.

The power source 6 employed by the inventors has the weight of 0.13 g.

Therefore, the total weight of all the components is 0.579 g. As the buoyancy force obtained by one pair of wings is 0.58 gf, the structure can be lifted.

(Communication Apparatus)

The communication apparatus 7 will be described in the following.

Communication apparatus 7 has the function of transmission, and transmits measurements of various sensors. Thus, base station 91 can obtain information from robot 90.

The information obtained by base station 91 includes physical amounts of robot 90 or environment therearound. Specifically, examples of the former include acceleration information of robot 90 obtained from the acceleration sensor and angular acceleration information of robot 92 obtained by angular acceleration sensor 52, and an example of the latter is infrared amount information obtained by pyroeletric infrared sensor 53.

Further, communication apparatus 7 has a function of reception, and receives control signals. Consequently, base station 91 can control robot 90.

Control signals transmitted from base station 91 include control signals related to the state of flight of robot 90, and control signals for changing physical amounts of the environment around robot 90.

Specifically, examples of the former include signals for designating acceleration and angular acceleration to be applied to robot 90, and an example of the latter includes a signal designating intensity of light emitting diode 8.

The present embodiment will be described assuming that information as mentioned above is transmitted/received.

It is needless to say that information to be transmitted/received is not limited thereto. For example, an acknowledge signal for confirming whether the control signal issued from based station 91 is correctly received by robot 90 or not may also be transmitted/received.

(Control Apparatus)

Control apparatus 4 will be described in the following, with reference to FIGS. 19 and 38.

Referring to FIG. 19, control apparatus 4 includes an operating apparatus 41 and a memory 42. Operating apparatus 41 has a function of transmitting information obtained by various sensors of robot 90 through communication apparatus 7. Operating apparatus 41 also has a function of controlling operation of each component, based on a control signal obtained through communication apparatus 7. Memory 42 has a function of holding these transmitted/received data.

In the present embodiment, specifically, operating apparatus 41 calculates acceleration and angular acceleration of robot 90 based on the information from acceleration sensor 51 and angular acceleration sensor 52, and transmits the information to base station 91, through communication apparatus 7. Further, from base station 91, information of acceleration and information of angular acceleration to be applied to robot 90 at present are transmitted. This pieces of information are received through communication apparatus 7, and operating apparatus 41 has a function of determining operation parameter of each actuator, based on the received acceleration and angular acceleration.

More specifically, operating apparatus 41 has time-sequential values of α, β and θ corresponding to representative combinations of acceleration and angular acceleration to be applied to robot 90, in the form of a table, and these values or interpolated values thereof are used as the parameters for operation of each actuator. The time-sequential values of α, β and θ represent discrete values, of the values shown in the graph of FIG. 34 which shows a case of hovering, where acceleration and angular acceleration are both 0.

It is understood that α, β and θ are examples of the control parameters, and for simplicity of description, it is assumed that the actuator is driven by designating these parameters. It is efficient to use parameters converted to driving voltage or control voltage to each actuators that implements this in more linear manner. As these are not particularly different from the existing method of actuator control, α, β and θ are listed simply as representative parameters, and parameters are not limited to this.

As a specific example of another function, operating apparatus 41 has a function of transmitting information provided from pyroelectric infrared sensor 53 through communication apparatus 7.

Accordingly, it becomes possible for base station 91 to obtain infrared information of the infrared information detecting area 531 by the pyroelectric infrared sensor 53 mounted on robot 90.

Further, operating apparatus 41 has a function of receiving a light emission control signal of light emitting diode 8 transmitted from base station 91 through communication apparatus 7, and controlling current flowing through light emitting diode 8 in accordance with the control signal. Thus, it becomes possible for base station 91 to control light emission of light emitting diode 8. Functions of control apparatus 5 are not limited to those described here.

As flight control is linked to time, it may be possible to store operation time-history of the wing in memory 42 of control apparatus 4, and means may be provided to correct control signals from base station 91 in accordance with the time-history information.

When flight and movement of robot 90 are given priority, it may be possible that there is generated a data that cannot be transmitted from the communication band. Further, disruption of communication is also possible. In view of these, it is effective to mount a memory 42, provided that increase in weight does not hinder flight movement.

On the other hand, except for the registers of operating apparatus 41, these are not explicitly essential to the function of robot 90.

(Driving Energy Source)

The driving energy source, that is, power source 6 will be described.

The left and right actuators 21, 22, control apparatus 4, sensors 51 to 53 are driven by power supplied from power source 6.

Power source 6 uses lithium ion polymer has an electrolyte, and therefore, it may be sealed within support structure 1. Thus, extra structure for preventing leakage of liquid becomes unnecessary, and sufficient energy density can be increased.

A commercially available lithium ion polymer secondary battery generally has mass energy density of 150 Wh/kg, and current consumption by the actuator in the present embodiment is at most 40 mA. Therefore, when the weight of electrolyte of power source 6 is about 0.1 g, flight for about 7.5 min is possible in the present embodiment. Further, the maximum current consumption of actuators of the present embodiment is, as a total of left and right actuators, 40 mA.

Further, the power supply voltage is 3V. As the weight of electrolyte is 0.1 g, the power source 6 must have weight power density of 0.12 W/g, that is, 1200 W/kg. A commercially available lithium ion polymer secondary battery has weight power density of about 600 W/kg, which is for a product having the weight of 10 g or heavier, used in an information equipment such as a portable telephone.

Generally, the ratio of electrode area with respect to the mass of electrolyte is in inverse proportion to the size of the power source. The power source 6 of the present embodiment has the ratio of electrode area larger by ten times or more than the secondary battery used in an information equipment mentioned above. Therefore, the power source can attain the mass power density of about ten-times higher, and hence, the output power density mentioned above can sufficiently be attained.

It is also possible to externally supply the energy for driving the actuators. For example, temperature difference, electromagnetic wave or the like may be used as medium supplying power energy from the outside, and a thermionic element or a coil may be used as the mechanism for inverting each of these two driving energy.

It is also possible to mount energy sources of different types. When an energy source other than electric power is used, basically, it is controlled by using an electric signal from control apparatus 4.

(Sensors (Physical Amount Input Portion))

The sensors will be described in the following.

Acceleration sensor 51 detects translational acceleration with three degrees of freedom of support structure 1, angular acceleration sensor 52 detects rotational acceleration with three degrees of freedom of support structure 1, and pyroelectric infrared sensor 53 detects the amount of infrared rays in pyroelectric infrared sensor detecting area 531. Results of detection by sensors 51 to 53 are transmitted to control apparatus 4.

The acceleration sensor used by the inventors has the band of 40 Hz. The higher the band, acceleration sensor 51 or angular acceleration sensor 52 is capable of performing control more precise in time. The change in the state of flight of robot 90 is considered as a result of one or more fluttering, and therefore, a commercially available sensor having the band of about several ten Hz may be used practically.

In the present embodiment, position and attitude of robot 90 are detected by the acceleration sensor and the angular acceleration sensor. Sensors are not limited to those and any mean may be used provided that position and attitude of robot 90 can be measured. For example, at least two angular sensors capable of measuring accelerations in three axial directions orthogonal to each other may be arranged at different positions of support structure 1, and the attitude of robot 90 may be calculated based on the acceleration information provided from each acceleration sensor.

Further, a method may be possible in which ground wave is explicitly incorporated in work space 92, which wave is detected by robot 90 to calculate position and attitude. For example, a magnetic field distribution may be provided in work space 92, and a magnetic sensor may detect the magnetic field distribution, to calculate position and attitude of robot 90. Further, a method may also be possible that uses a GPS sensor.

Further, a method is also possible in which position and attitude of robot 90 are directly detected outside robot 90, for example, by base station 91. For example, base station 91 may have a camera, and the position of robot 90 may be calculated by image processing. In that case, naturally, acceleration sensor 51 or the like is not essential in robot 90.

Though sensors including acceleration sensor 51 and angular acceleration sensor 52 are expressed as components separate from control apparatus 4, in view of achieving light weight, these may be formed on one silicon substrate integral with control apparatus 4, by micro machining technique.

The sensors of the present embodiment are minimum requirements for achieving the object of application, that is, security, and types, numbers and configurations of the sensors are not limited to those described above.

For example, wings of robot 90 are driven under control without any feedback. A wing angle sensor may be provided at the root of the wing, and the wing can be driven more accurately by feeding back angular information obtained from the sensor.

On the other hand, when air flow in the area of flight is known and it is possible to reach target position simply through a predetermined manner of flight, it becomes unnecessary to detect the state of flight of robot 90. Therefore, in that case, acceleration sensor 51 and angular acceleration sensor 52 are not essential. For detecting a human, a method employed in a conventional robot can be utilized, by using pyroelectric infrared sensor 53.

The human 93 as an object of searching described as an example of the present embodiment is also an obstacle of movement for robot 90. When pyroelectric infrared sensor detecting area 531 is arranged below robot 90, it becomes possible for robot 90 to detect human 93 while flying, and hence human 93 does not become an obstacle but can be detected.

Though a pyroelectric infrared sensor which is inexpensive and widely used at present has been described as an example of a sensor for detecting a human, possible sensor is not limited thereto, and any sensor may be used provided that the function of detecting a human is attained.

(Light Emitting Diode (Physical Amount Output Portion))

Light emitting diode 8 will be described in the following.

Light emitting diode 8 has a visible light illumination area that generally covers the pyroelectric infrared sensor detection area 531 of pyroelectric infrared sensor 53. The operation of light emitting diode 8 is controlled by control apparatus 4.

The above described configuration, when control apparatus 4 determines that a source of infrared radiation detected in pyroelectric infrared sensor detection area 531 is a human 93, it is possible to perform an operation of directing visible light thereto. Though light emitting diode 8 is described as an example of the physical amount output portion in the present embodiment, it is not limiting.

In order not to degrade mobility of robot 90 in determining the components described above, the component should desirably be light weight, while functions of the components are not degraded.

(Description of Base Station)
(Main Configuration and Main Function)

Main configuration and function of base station 91 will be described with reference to FIG. 37. As the main object of the base station is to obtain information from robot 90 and to control robot 90 based thereon, FIG. 37 simply shows a specific example, and appearance, shape and presence/absence of accessories are not limited to those described here, provided that the object is attained.

Figure 37:
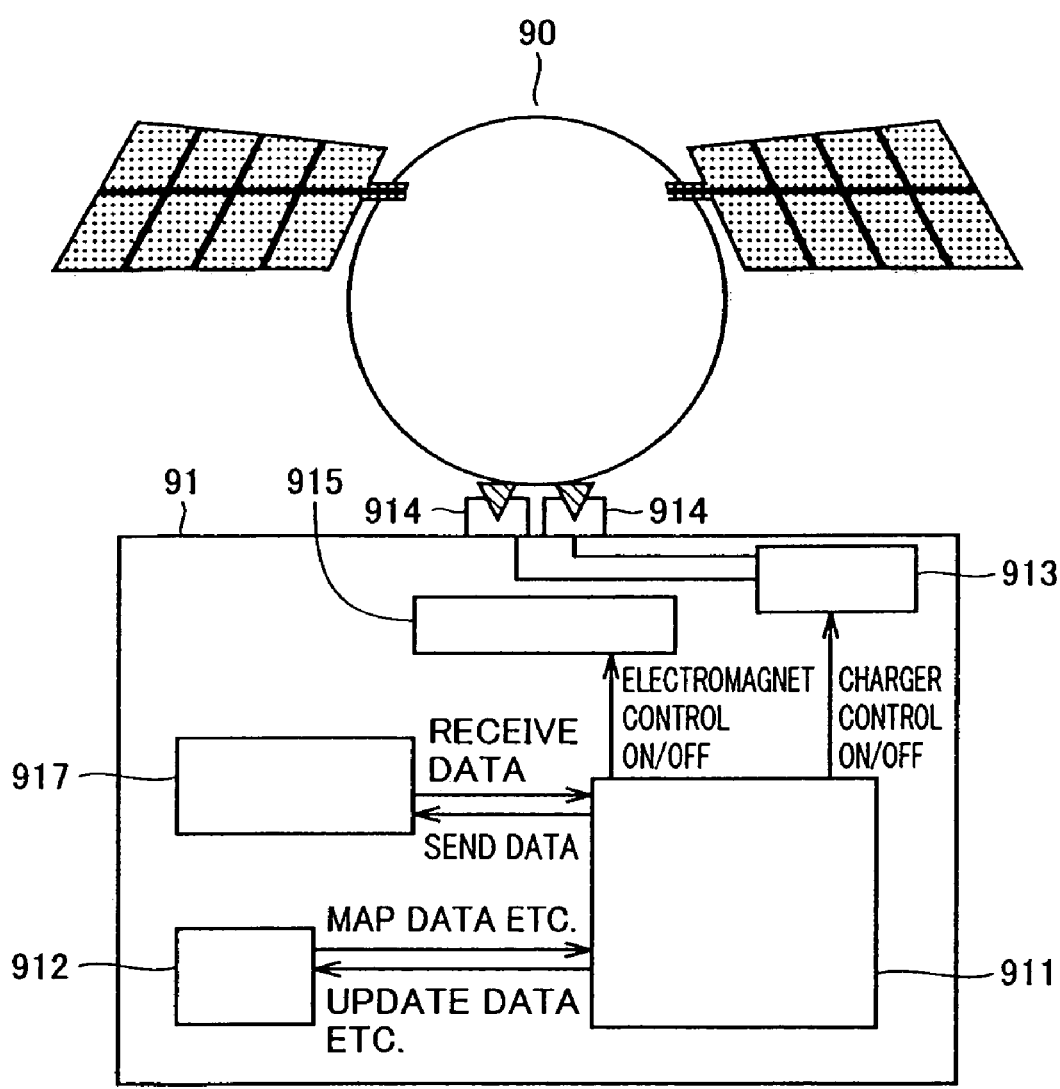
FIG. 37 is an illustration of the base station controlling the fluttering sensing robot in accordance with an embodiment.

Referring to FIG. 37, base station 91 includes an operating apparatus 911, a memory 912 and a communication apparatus 917. Communication apparatus 917 has a function of receiving a signal transmitted from robot 90. Further, it has a function of transmitting a signal to robot 90.

Base station 91 has a function of determining activity of robot 90, based on various pieces of information including map data of work space 92 stored in memory 912 and acceleration information of robot 90 received from robot 90 through communication apparatus 917. Further, it has a function of transmitting the activity through communication apparatus 917 to robot 90.

By the above described reception function, activity determining function and transmission function, base station 91 can control robot 90 through communication function, based on the information of robot 90 itself or information of environment around the robot.

An upper surface of base station 91 is used as a take off/landing base of robot 90. Specifically, a charger 913 is provided on the upper surface of base station 91, and electrodes 61 of robot 90 are coupled to charging holes 914, so that the robot is electrically connected to power source 6, to be ready for charging. In order to save power, charger 913 is controlled by operating apparatus 911, and operates even while robot 90 is coupled with base station 91 to charge, in the present embodiment.

The charging holes 914 also serve as positioning holes. Further, an electromagnet 915 is provided on base station 91, to attract robot 90 as needed. More specifically, relative position of robot 90 with respect to base station 91 before take off is fixed by the operation of electromagnet 915, and relative speed is 0.

(Operation Instruction)

In the present embodiment, base station 91 includes operating apparatus 911, memory 912 and communication apparatus 917, and it has a function of transmitting to robot 90 through communication apparatus 917, acceleration and angular acceleration to be applied to robot 90, based on various pieces of information including acceleration information of robot 90 received from robot 90, in accordance with the map data of work space 92 stored in memory 912 and predetermined path of robot 90 in work space 92 to attain a pre-set object. For example, attitude of robot 90 can be calculated by integrating twice the information of angular acceleration of robot 90.

By twice integrating this and acceleration information in absolute coordinate system obtained by rotation transformation of acceleration information of robot 90 with attitude of modes, the position of robot 90 can be calculated. As for the constants of these integration operations, velocity and angular velocity before take off are both 0, and as the robot is fixed in charging holes 914 of base station 91, position and attitude are always known. Thus, operating apparatus 911 can calculate position and attitude of robot 90 and provide control instruction to robot 90.

Through the above described functions, it is possible for base station 91 to control robot 90 such that robot 90 patrols work space 92. These functions can naturally be correlated with each other. For example, from the acceleration information and angular acceleration information of robot 90, it is possible to calculate the position of infrared detection area 531 for pyroelectric infrared sensor 53 in work space 92.

By mapping the position and the amount of infrared ray, position, shape and operation of infrared radiation source can be calculated, and the diode may be operated to direct light to the vicinity of center of gravity of the infrared radiation source. Wide variation is possible and optimum design is selected for each application. Therefore, the examples described above are not limiting.

(Method of Patrol)

The method of patrol by robot 90 can be implemented by adding degree of freedom in the height direction, to the conventional method of patrol used for a robot moving over the floor by wheels and the like.

For example, a method of patrolling a three-dimensional space can be realized by adding degree of freedom in the height direction to the patrol on a two-dimensional plane, by once performing patrol at a prescribed height and thereafter, height of robot 90 is changed and patrol is again performed at a different height.

Dependent on the detection distance of pyroelectric infrared sensor 53, it may substantially be possible to detect a human from the whole work space 92 when the robot patrols at a certain height. In that case, patrol is possible simply by the algorithm for patrol on a two-dimensional plane proposed conventionally.

As to the route of patrol, a certain path may be prepared in advance in memory 912, or, alternatively, operating apparatus 911 may calculate, using information from map data in memory 912 as a reference. For example, a method may be possible in which importance in patrol of portions in work space 92 may be designated, and frequency of patrol may be set higher in accordance with the importance. The path may be changed during patrol. For example, when a human is detected, the robot may be kept hovering at the position of detection.

The foregoing describes a simple example of the method of patrol of work space 92 by robot 92, and not limiting. The mass of base station 91 has no influence on the flight of robot 90, and therefore, highly complicated path or method of patrol can readily be determined.

(Assistance in Take off and Landing)

At the time of start or end of fluttering, that is, at the time of take off and landing of robot 90, air flow caused by fluttering abruptly increases or decreases and is unstable. Therefore, it is difficult to control position and attitude of robot 90. In the present embodiment, electromagnet 915 provided on base station 91 attracts robot 90 in the stage before take off. At the time of take off, until air flow caused by fluttering becomes stable, electromagnet 915 is operated, and attraction by electromagnet 915 may be stopped when air flow becomes stable. By such a method, stable take off becomes possible.

At the time of landing, robot 90 is moved such that electrodes 61 are roughly positioned above charging holes 914, electromagnet 915 is activated in this state, and robot 90 is attracted to base station 91. When fluttering is stopped thereafter, position and attitude at the time of landing with unstable air flow, can be stabilized. In order to facilitate positioning, either one or both of electrodes 61 and charging holes 914 should be tapered.

If weight permits, robot 90 may have electromagnet 915. When such configuration is taken, it becomes possible to robot 90 to perform stable take off/landing to and from every substance formed of ferromagnetic or soft magnetic material, in addition to base station 91. In order to enable take off with smaller acceleration, it is possible to provide an inner force sensor in electromagnet 915, and attraction force of electromagnet 915 may be controlled in accordance with the force sensed by the inner force sensor.

The foregoing merely represents an example of the method to prevent unstable flight of robot 90 resulting from unstable air flow at the time of take off and landing. Any means may be used provided that robot 90 is temporarily held at the time of take off and landing. For example, suction by air in place of electromagnet 915 may be possible.

Further, take off and landing along a guide mechanism such as a rail is also possible.

(System Operation)

Robot 90 patrols work space 92 in accordance with an instruction from base station 91 to detect a human. A specific example will be described with reference to FIGS. 38 and 39. The following description is by way of example only and not intended to limit the scope of protection.

(Stationary State)

Before the start of operation of robot 90, robot 90 is fixed on base station 91 with the electrodes 61 connected to charging holes 914. Power source 6 is charged as needed. It is assumed that operating apparatus 911 and memory 912 are already in operation in base station 91. Further, it is assumed that the route of patrol by robot 90 has already been calculated by operating apparatus 911. It is also assumed that light emitting operation of the diode of robot 90 upon detection of a human has already being calculated by operating apparatus 911. It is desirable that the route of patrol and diode light emitting operation are stored in memory 912.

(Take Off, Elevation)

Electromagnet 915 of base station 91 operates, and robot 90 is attracted to base station 91. In this state, robot 90 starts fluttering operation to rise in the vertical direction. Acceleration sensor 51, angular acceleration sensor 52, control apparatus 4 and communication apparatus 7 of robot 90 have started operation by the time attraction by electromagnet 915 is stopped, at the latest. At this time, communication apparatus 917 of base station 91 also has started its operation, and it is necessary that operating apparatus 911 is in a state ready to detect the state of flight of robot 90.

When air flow caused by fluttering becomes stable, electromagnet 915 stops attraction of robot 90. When attraction of electromagnet 915 becomes weaker than the point of balance where attraction force of electromagnet 915 is equal to the lift force of robot 90, robot 90 starts rising.

By the time robot 90 starts rising, operating apparatus 911 of base station 91 must have started operation to find position and attitude of robot 90, at the latest.

Robot 90 rises while transmitting acceleration information and angular acceleration information to base station 91. Based on these pieces of information and position and attitude of robot 90 calculated in accordance with the target route, base station 91 calculates acceleration to be applied at present to robot 90, and provides an instruction to robot 90. When robot 90 reaches the position designated in advance, robot 90 starts patrol at this height, in accordance with the instruction from base station 91.

(Patrol)

Before the start of patrol, pyroelectric infrared sensor 53 is activated. Infrared information thereof is transmitted by communication, to operating apparatus 911. Patrol is performed such that base station 91 provides instruction of movement to robot 90, monitors infrared information, and determines presence/absence of heat source, that is, the source of infrared emission. In order to avoid obstacles, the robot generally patrols at the height of about 2 m, that is, higher than the average height of an intruder. Robot 90 patrols work area 92 thoroughly, for example, by reciprocating in the work area shifted little by little by the width of about 60% of the width of infrared information detection area 531.

(Landing)

After the end of patrol, the pyroelectric infrared sensor 53 of robot 90 stops its operation. At the end of patrol, base station 91 controls robot 90 such that robot 90 lowers while maintaining its position and attitude so that electrodes 61 of robot 90 are positioned vertically above the charging holes 914 of base station 91. When it is determined that robot 90 is at a position where attraction by electromagnet 915 is possible, electromagnet 915 is activated, and robot 90 is fixed on base station 91.

After robot 90 is fixed on base station 91, operations of acceleration sensor 51 and angular acceleration sensor 52 of robot 90 are stopped. After the robot 90 is fixed on base station 91, base station 91 instructs robot 90 to stop fluttering. Communication apparatus 7, control apparatus 4 and the like may be stopped thereafter.

(Flow Chart)

Figure 38:
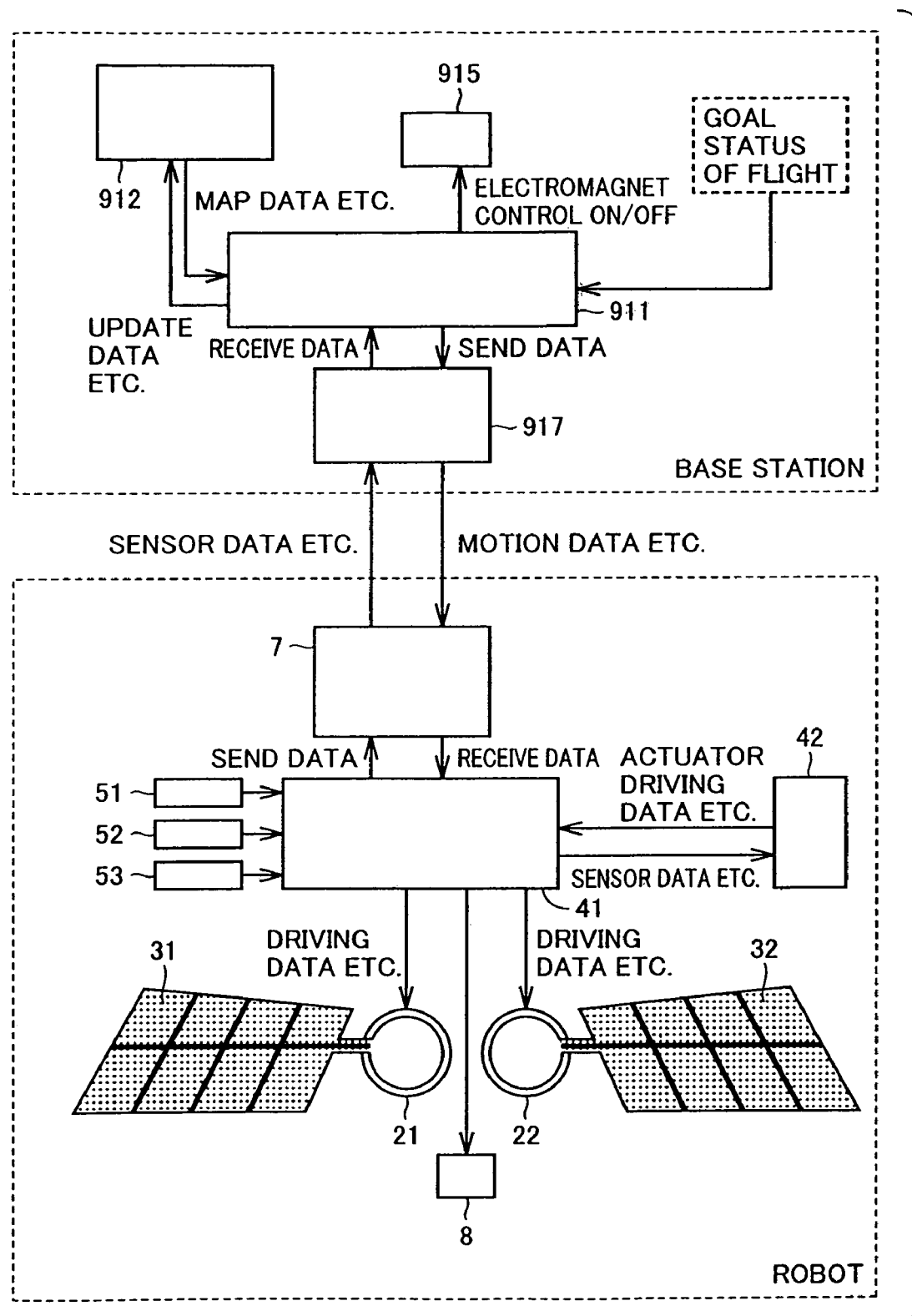
FIG. 38 is an illustration representing relation between the fluttering sensing robot and the base station in accordance with an embodiment.
Figure 39:
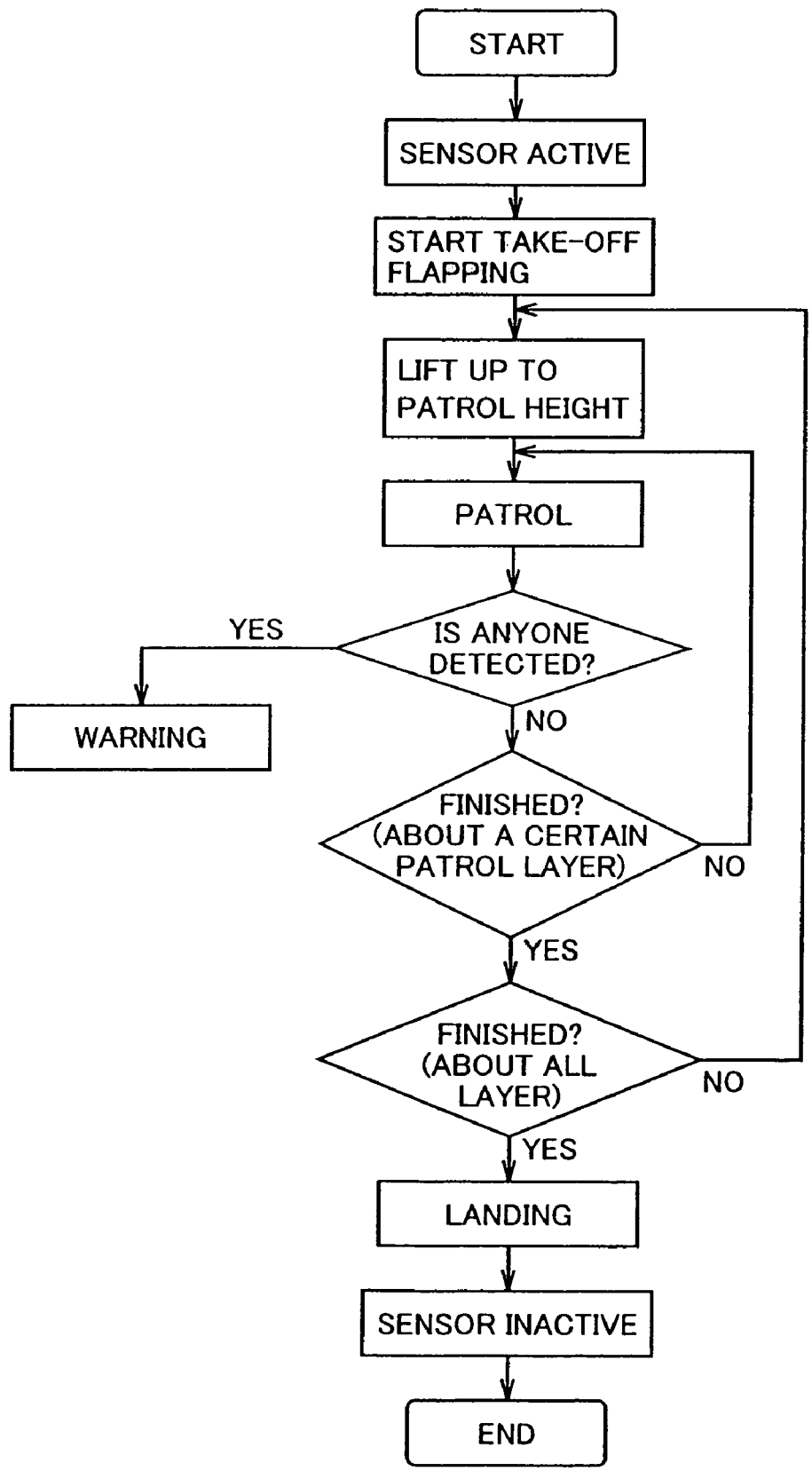
FIG. 39 is a flow chart representing an example of operation of the fluttering sensing robot system in accordance with an embodiment.

FIG. 38 shows flow of various pieces of information in the present embodiment. FIG. 39 is a flow chart of the operation described above. These are examples only, and operation of robot 90 satisfying the application as a sensing robot searching for an object of the present embodiment is not limited thereto. The operation may differ in different applications.

(Communication)

Figure 40:
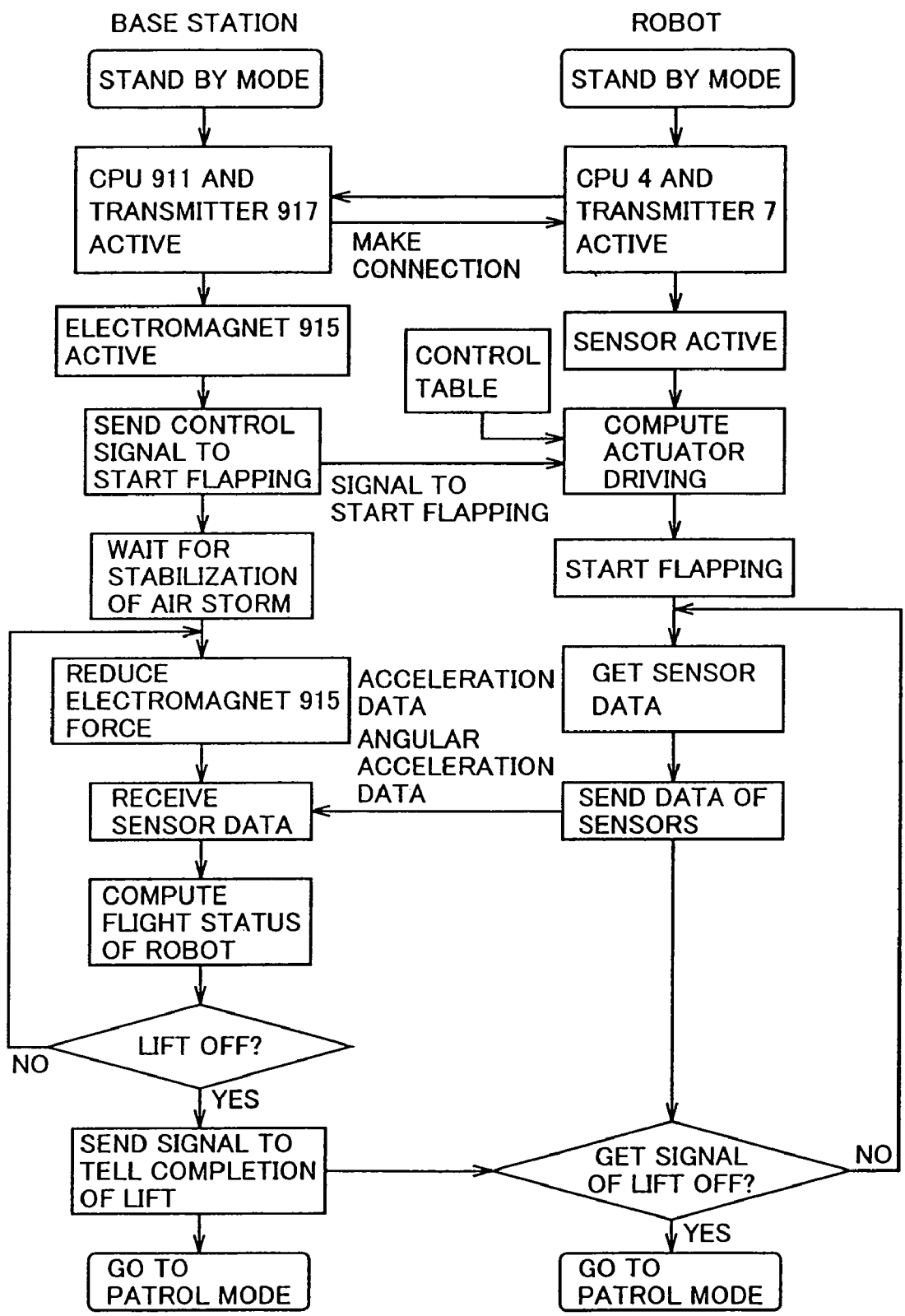
FIG. 40 is a flow chart representing information processing in the process of take off of the fluttering sensing robot in accordance with an embodiment.
Figure 41:
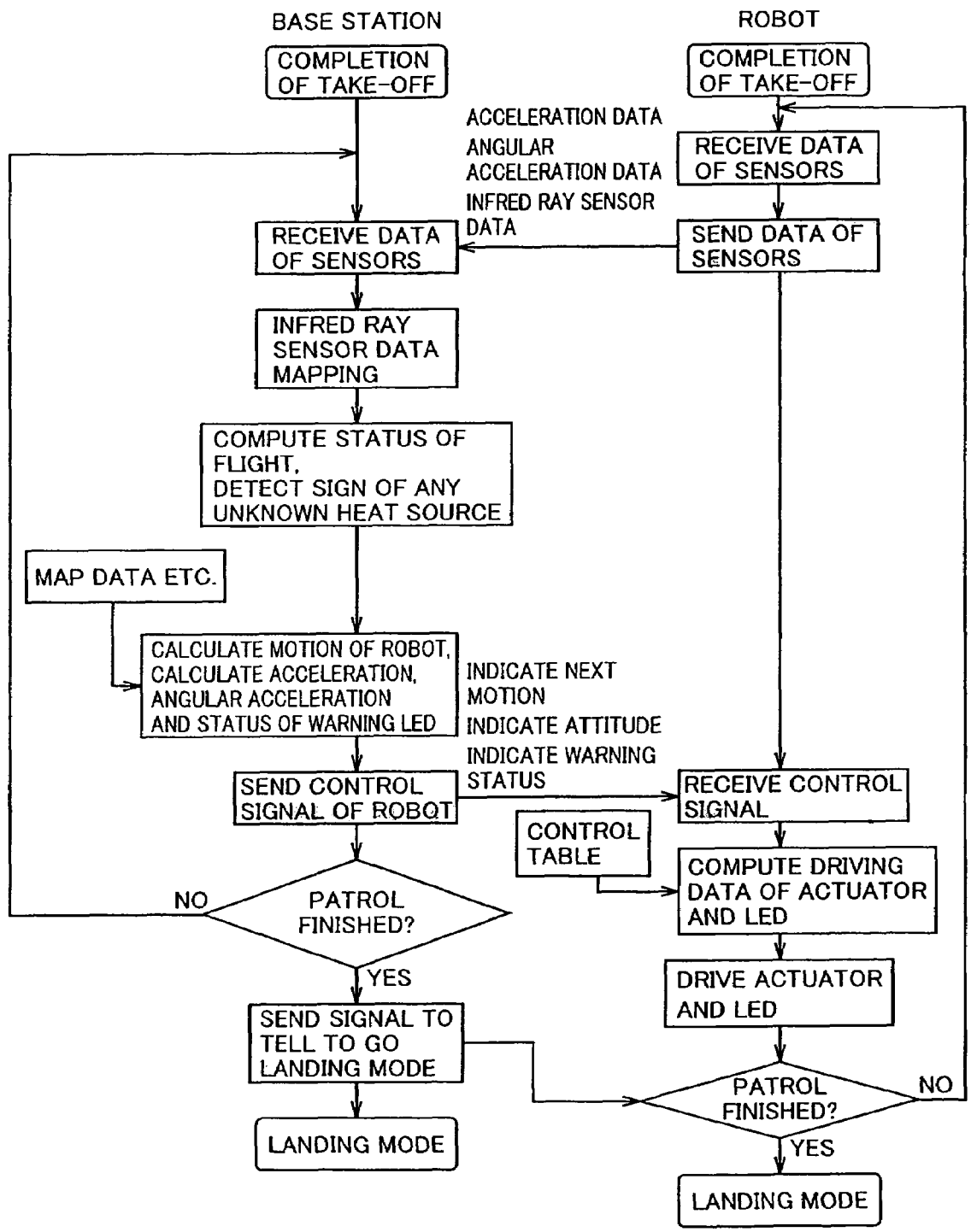
FIG. 41 is a flow chart representing information processing in the patrol process of the fluttering sensing robot in accordance with an embodiment.
Figure 42:
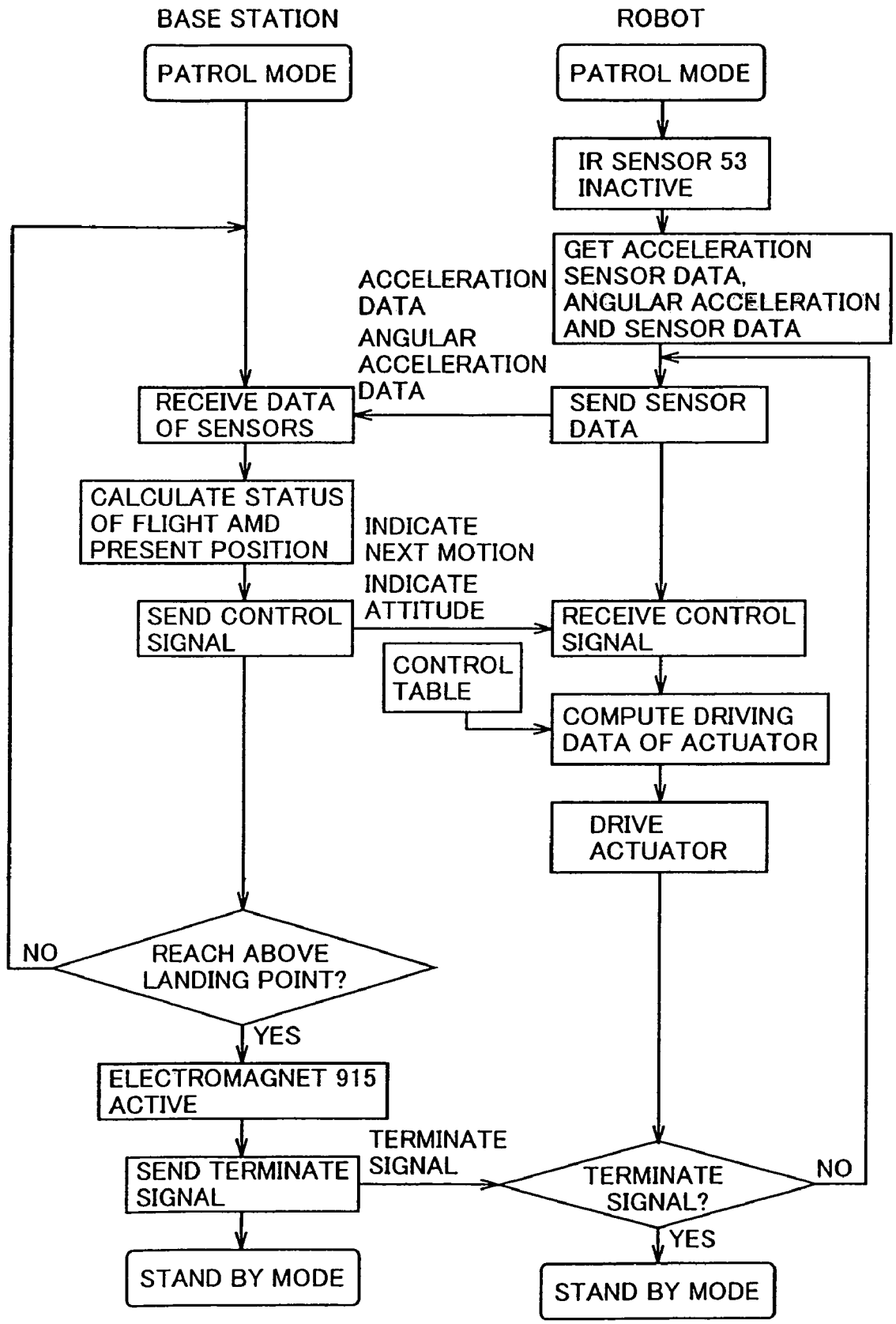
FIG. 42 is a flow chart representing information processing in the landing process of the fluttering sensing robot in accordance with an embodiment.

Method of communication in the present embodiment will be described with reference to FIGS. 40 to 42.

Here, data to be communicated will be discussed mainly. Though there are various methods as to the detailed manner of communication including communication protocol and hand shake timing, any method may be used, provided that data described herein can be exchanged.

(Stationary State, Take Off)

First, communication operation in the stationary state to take off will be described with reference to FIG. 40.

First, operating apparatus 911 and communication apparatus 917 of base station 91, as well as control apparatus 4 and communication apparatus 7 of robot 90 are activated, so as to establish connection between robot 90 and base station 91. Then, electromagnet 915 of base station 91 is activated to attract robot 90, so as to prevent fall of robot 90 caused by unstable air flow at the time of take off.

Acceleration sensor 51 and angular acceleration sensor 52 of robot 90 must be active before the robot starts rising, that is, before acceleration or angular acceleration changes from 0, in order to accurately grasp position and attitude of robot 90. Therefore, sensing must be started before the start of fluttering.

Base station 91 provides an instruction of fluttering to rise, to robot 90. In the present embodiment, instruction of acceleration and angular acceleration is provided to robot 90, so that the robot flutters to rise vertically upward.

In robot 90, a time-sequential pattern of α, β and θ is selected to enable vertically upward lift, from a control table prepared in advance, and in order to start fluttering in accordance with the pattern, left and right actuators are driven.

Base station 91 waits until air flow caused by the fluttering of the robot is stabilized using, for example, a timer to detect lapse of a prescribed time period, and thereafter, lowers attraction force of electromagnet 915.

During this period, robot 90 transmits acceleration information and angular acceleration information of itself to base station 91 by communication. When attraction force of electromagnet 915 becomes lower than the lift force, robot starts rising. This is detected as the speed of robot is no longer 0. When lift is completed, lift completion signal is transmitted from base station 91 to robot 90, and patrol mode starts.

(Patrol)

Communication operation during patrol will be described with reference to FIG. 41.

Before the start of patrol mode, the infrared sensor of robot 90 is activated (not shown).

Thereafter, robot 90 obtains information from various sensors. The obtained sensor information is transmitted by communication, to base station.

Of the received sensor information from robot 90, base station 91 maps infrared information, and calculates infrared radiation distribution in work space 92. From acceleration information and angular acceleration information, position and attitude of robot 90 are calculated. It is assumed that the process for calculating position and attitude and the process for infrared mapping are continuously performed during the patrol.

Based on the result of infrared mapping, when there is recognized an infrared radiation source that does not exist in the map data of memory 912, the source may be regarded as a human and alarming operation using the light emitting diode may be possible. Otherwise, patrol is continued. Such an operation to be taken next is determined by base station 91, and acceleration and angular acceleration for robot 90 are transmitted as instruction information, to robot 90.

Based on the acceleration instruction and the angular acceleration instruction among the received instruction information, robot 90 calculates driving state of left and right actuators referring to a control table prepared in advance, and controls the actuators. When there is an instruction of alarming operation, robot drives LED accordingly. In the alarming operation also, the manner of communication is the same as in the patrol operation, except for the driving of LED.

When base station 91 determines that robot 90 has completed patrol, the base station transmits a patrol end signal to robot 90, and landing mode starts.

(Landing)

Communication at the time of landing will be described with reference to FIG. 42.

After the end of patrol, robot 90 stops operation of pyroelectric infrared sensor 53.

Base station 91 guides robot 90 directly above the landing position, specifically, an area where robot 90 can be attracted to the initial position by means of electromagnet 915. Similar to the control at the time of patrol, the robot is guided by using the position and attitude of robot 90 calculated based on the acceleration information and angular acceleration information received from robot 90. Namely, it is performed through the same manner of communication as in the patrol operation.

When robot 90 reaches directly above the landing position, electromagnet 915 is activated, so to as attract robot 90 to the base station. When it is unnecessary to operate continuously thereafter, base station 91 instructs end of operation to robot 90. Thus, fluttering operation, communication operation and sensing of robot 90 are terminated.

The manner of communication is not limited to the one described above, provided that it is a single system and that the base station provides instruction of action to robot 90 based on the sensor information from robot 90.

Though sensors are described as operating continuously in the present embodiment, a method is also possible in which sensor operates intermittently, in accordance with an instruction from base station 91, such that the sensor operates only when a sensor information request signal is received from base station 91.

(Function Sharing)

Function sharing related to information processing by control apparatus 4 of robot 90 and base station 91 will be described in the following.

Robot 90 and base station 91 can exchange information through communication path, and therefore, functions of each of these can be shared in various ways. For example, as in the embodiment above, robot 90 may have all the functions of base station 91 and base station 91 may be eliminated, that is, a so-called stand alone type robot is also possible. However, when excessive mass is mounted on robot 90, flight becomes difficult.

Quick movement is possible when robot 90 is light weight, and efficiency of system operation can be increased. Therefore, generally, it is desired that most of information processing is performed by base station 91 and robot 90 is designed to be light weight. Particularly, map data of work space 92 becomes larger dependent on the size of the work space and the number of obstacles.

Therefore, it is desired that a memory 912 that does not lead to increased weight to be mounted on robot 90, is prepared. When specification of the position of infrared radiation source mentioned above is performed by operating apparatus 911 of base station 91, it becomes possible to use a simple device as the control apparatus 4 of robot 90. Therefore, weight of the robot can be reduced.

In addition to the discussion above, in considering sharing of functions related to information processing by control apparatus 4 of robot 90 and base station 91, it must be kept in mind that improve in communication speed leads to increased weight.

For example, consider communication using radio waves. When the speed of communication increases, it becomes necessary to use radio wave of high frequency having higher energy, as a, carrier. This leads to larger power consumption. As a result, the weight of power source 6 increases. In addition, signal quality must be improved by using a compensation circuit, for example. This means increase in number of components, and hence the weight increases for the communication function. It is necessary to design actual sharing of functions, generally considering such trade off.

Consider, for example, that details of fluttering, that is, wing angles $\alpha$, $\beta$ and $\theta$ are also designated by base station 91. Generally, frequency of fluttering flight is several ten Hz or higher, and therefore, control frequency band of $\alpha$, $\beta$ and $\theta$ is in the order of kHz. Here, assume that each data of $\alpha$, $\beta$ and $\theta$ consist of 8 bits, communication rate of 8 (bit)×1 (kHz)×3×2 (number of actuators)=48 (kbps) for a single communication path is necessary, in order to control each angle with 1 kHz. This is the rate for transmission only, and actually, a band for reception is also necessary. Further, communication overhead and data from sensors including pyroelectric infrared sensor 53 are added, and therefore, a communication method having the communication rate of about 100 kbps becomes necessary.

Basic operations such as forward movement, rearward movement and turn to the left or right of robot 90 can be attained by preparing prescribed patterns of fluttering, corresponding to each of such operations. Therefore, it may be possible that basic operations and fluttering patterns to attain the same are contained in robot 90, base station 91 calculates basic operation suitable for the scheduled path and gives an instruction to robot 90, and robot 90 selects fluttering pattern contained therein, in accordance with designated basic operation, whereby robot 90 can fly through a desired path.

This manner of control, in which robot 90 controls high frequency range represented by the control of manner of fluttering itself and base station 91 controls low frequency band represented by path control is desirable in view of reduction of amount of calculation by the control apparatus and reduction in traffics of communication path. The basic operations and the fluttering patterns to attain the same should desirably be prepared as a table in control apparatus 4, in view of processing speed and reduction in amount of calculation by control apparatus 4.

It is naturally expected that capability of operation of the operating apparatus represented by control apparatus 4 and communication rate will significantly be improved in the future. Therefore, the manner of information processing by robot 90 and base station 91 are simple examples of the basic idea at present, and specific sharing of functions is not limited to the manner described above.

(Height Control)

According to the present embodiment, the robot can move easily to a different floor, by height control. Specifically, when height information is included in the map data, simply by adding control in height direction to the conventional method of controlling robot moving on a floor, patrol path can be changed in height. Specifically, when the robot moves flying with its height changed in accordance with an algorithm in accordance with the map data of stairs, for example, by keeping constant a vertical distance from the vertically lower surface of the stairs, the robot can easily move upward/downward over the stairs.

Use of stairs to a different floor described above is merely an example of a method to move to a different floor, and not limiting. For example, a ventilating hole or a blow-by may be utilized.

(Plurality of Patrols)

Though an example of single patrol has been described, the manner of patrol is not limiting. For example, the patrol operation described in the present embodiment may be repeated.

Further, patrol may be performed newly, by the above described methods of patrol. Though an operation in which the robot returns to the base station after the end of patrol has been described in the embodiment above, it is merely an example and not limiting. For example, a plurality of base stations may be arranged in work space 92, and the robot may patrol between the base stations.

(Energy Replenishing Mechanism)

It is naturally understood that the method or manner of charging power source 6 described above is simply an example of energy replenishment generally used for attaining both light weight and continuous operation. Any power source 6 and charging mechanism therefor may be used provided that the function of a power source can be satisfied.

For example, a coil may be formed on the wing by sputtering a metal, radio wave may be externally applied and the radio wave is converted to power and rectified by the coil, to charge power source 6.

Alternatively, a charging station may be provided simply for the purpose of charging, in addition to base station 91, and the robot may be charged there.

When energy other than electric power is to be used, appropriate method of energy replenishment becomes necessary. The shapes of electrode 61 and charging hole 914 are not limited to those described in the embodiment above. Further, it is not essential that the function of positioning is also attained by these as described in the embodiment above.

(Communication)

In the present embodiment, it is assumed that base station 91 always obtains information from robot 90 and controls robot 90 accordingly. It is not always necessary that base station 91 controls robot 90, for example, when autonomous operation is possible by robot 90.

Further, by temporarily holding information in memory 42, frequency of communication between base station 91 and robot 90 may be decreased. This approach is effective when it is necessary to reduce traffic over communication path, for example, when there are a plurality of robots or a plurality of base stations, as will be described later.

It is desirable that connection between robot 90 and base station 91 is designed considering possibility of disruption. By incorporating in advance a method of operation when communication path is disrupted in robot 90, undesirable influence of communication disruption can be minimized, when connection is resumed.

As an example, robot 90 may have a function of maintaining constant state of flight, that is, hovering, when communication path is disrupted. In that case, possibility of collision against an obstacle can be reduced than when the robot continues to move without hovering.

By buffering some operation model ahead in memory 42, robot 90 can continue flying even when communication path is disrupted. Conversely, when information detected by sensors is buffered in memory 42 and base station 91 utilizes the buffered information after the resumed of communication path is resumed, base station can obtain information of the sensors while the communication path has been disrupted.

Further, utilizing such buffering approach, it becomes possible to attain the function of the group robot system with weaker radio wave in an environment containing a number of obstacles and hindrance of radio wave is a likely. Therefore, power consumption can be reduced and weight of power source 6 can be reduced. Thus, mobility of robot 90 is improved.

(Change in Environment)

In the present embodiment, for simplicity of description, it is assumed that environment in work space 92 is not changed. In actual use, however, environment changes. The main cause of change in environment includes generation of air flow and change in obstacles. When there are such changes in environment, it is necessary to prepare means for correcting accordingly.

Fluttering flight receives influence of air flow similar to a general airplane. Therefore, method used for designing path of a general airplane can directly be applied for its correction.

As to the change in environment, the method employed in a conventional remote control robot system can directly be applied. For example, means for detecting obstacles such as an optical sensor may be provided on robot 90, data base of obstacle detection may be transmitted to base station, and base station 91 may update map data based on the information.

(System Configuration (Number of Robots and Base Stations))

For simplicity of description, it has been assumed that there is one base station in the embodiment above. It is naturally possible to control robot 90 by a plurality of base stations. As an example, when work space 92 is wider than the range of communication between base station 91 and robot 90, a plurality of base stations may be provided to cover work space 92, so as to spatially share control of robot 90.

In the present embodiment, the function of controlling robot 90, functions of assisting take off/landing and function of energy replenishment, that is, function of charging are integrated in base station 91. Integration of these functions in the base station is not essential. For example, when the distance of continuous flight, that is, the distance the robot can continuously fly without supplementing driving energy from the outside is shorter as compared with the communication range, an energy replenishment station may exist in the communication range covered by one base station.

On the other hand, there may be two or more robots 90. Sufficiency of searching in work space 92 can be improved when a plurality of robots are used. For example, assume that a human is to be searched as in the present embodiment. When it takes a time period T1 (sec) for robot 90A to search the work space 92 once, frequency of searching of a certain position in work space 92 would be 2/T1 (times) when searching by robot 90B is started after T1/2 (sec) from the start of searching by robot 90A. Namely, searching with double frequency is possible. Accordingly, possibility of finding a human can be improved. Alternatively, robots that operate as a group modeling migration of fish may be used.

Naturally, when all the functions of base station 91 can be incorporated in robot 90 and the weight of the robot is light enough to enable flight, robot 90 may be used by itself, as a stand alone type robot. Alternatively, it is possible that base station 91 is responsible for mass information processing and robot 90 has actuator only, as the control portion.

In the group robot system of the present embodiment, the robot obtains lift force and moves away from the ground. Therefore, it is possible for the robot to move in a room, for example, where there are many objects such as furniture and the positions of the objects move with time, avoiding such obstacles, to perform a prescribed operations such as grasping the states of each room. Further, the robot can move freely outdoors, not hindered by obstacles at a disaster site, or geometry in a general field, for example, to easily perform an operation of information collection. Further, it can be introduced to existing work space at a low cost in a simple manner.

According to the group robot system in accordance with the present invention, including the robot having information from the robot through communication capable of controlling robot, information processing by the robot can be realized by components having no influence on lifting. Therefore, the amount of information to be processed can be increased without degrading mobility of the robot.

Another embodiment of the robot will be described in the following.

Another Embodiment

A group robot system using a fluttering sensing robot in accordance with another embodiment will be described. The group robot system of the present embodiment is approximately the same as the embodiment above, except for the structure of the fluttering sensing robot. Specifically, the fluttering sensing robot in accordance with the present invention is used in the group robot system of the form of the embodiment above, and their relation with the base station and communication control is also the same. The same applies to a situation where the fluttering sensing robot is used as a pheromone robot. Though fluttering flight of the fluttering sensing robot only will be described in the present embodiment, sensors similar to those described above are provided as sensors for detecting the object on the fluttering sensing robot, and the same communication mechanism as above is provided as a communication mechanism that enables communication with other fluttering sensing robot, pheromone robot or base station, utilizing spread spectrum communication through hierarchical structure.

Figure 43:
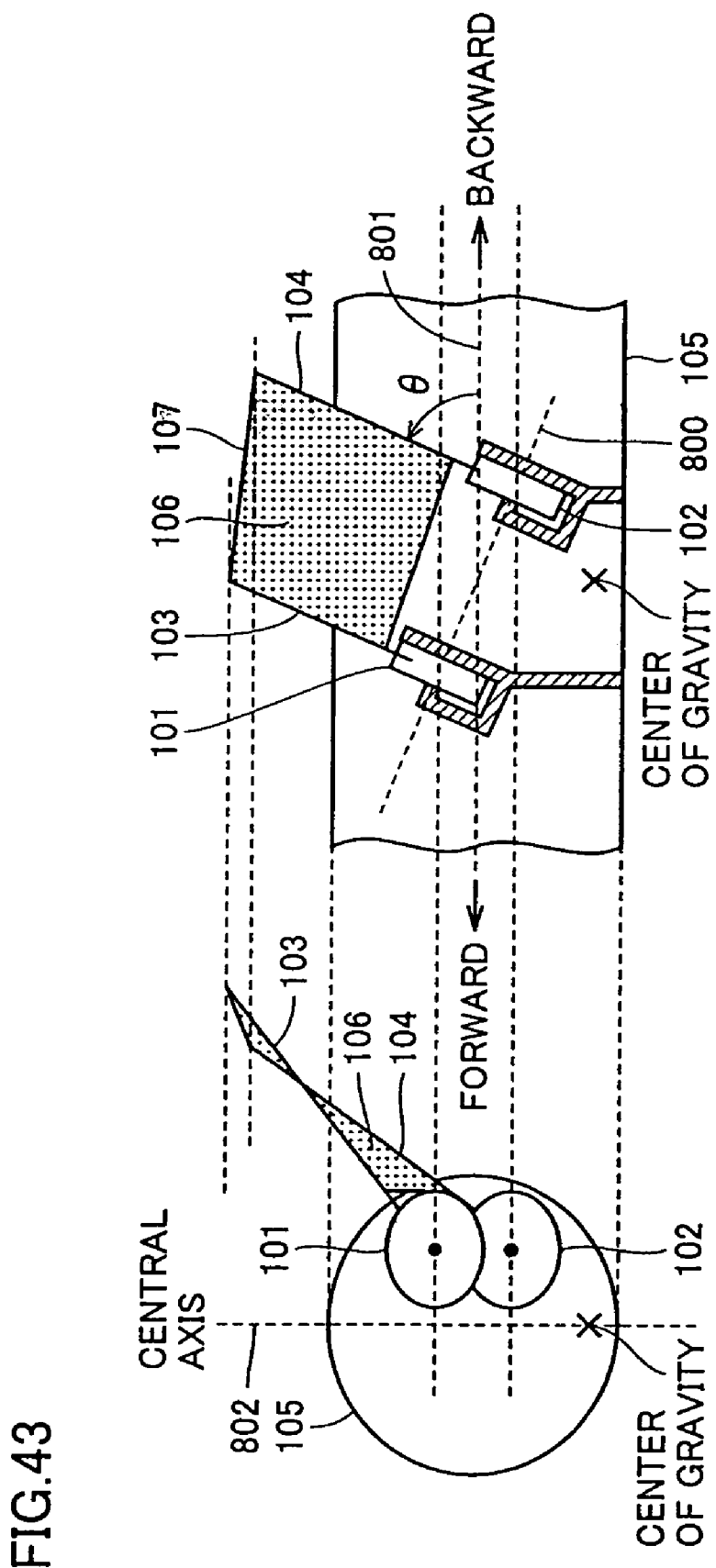
FIG. 43 is an illustration of the fluttering sensing robot in accordance with another embodiment, including a partial front view on the left side, and a partial side view on the right side.
Figure 44:
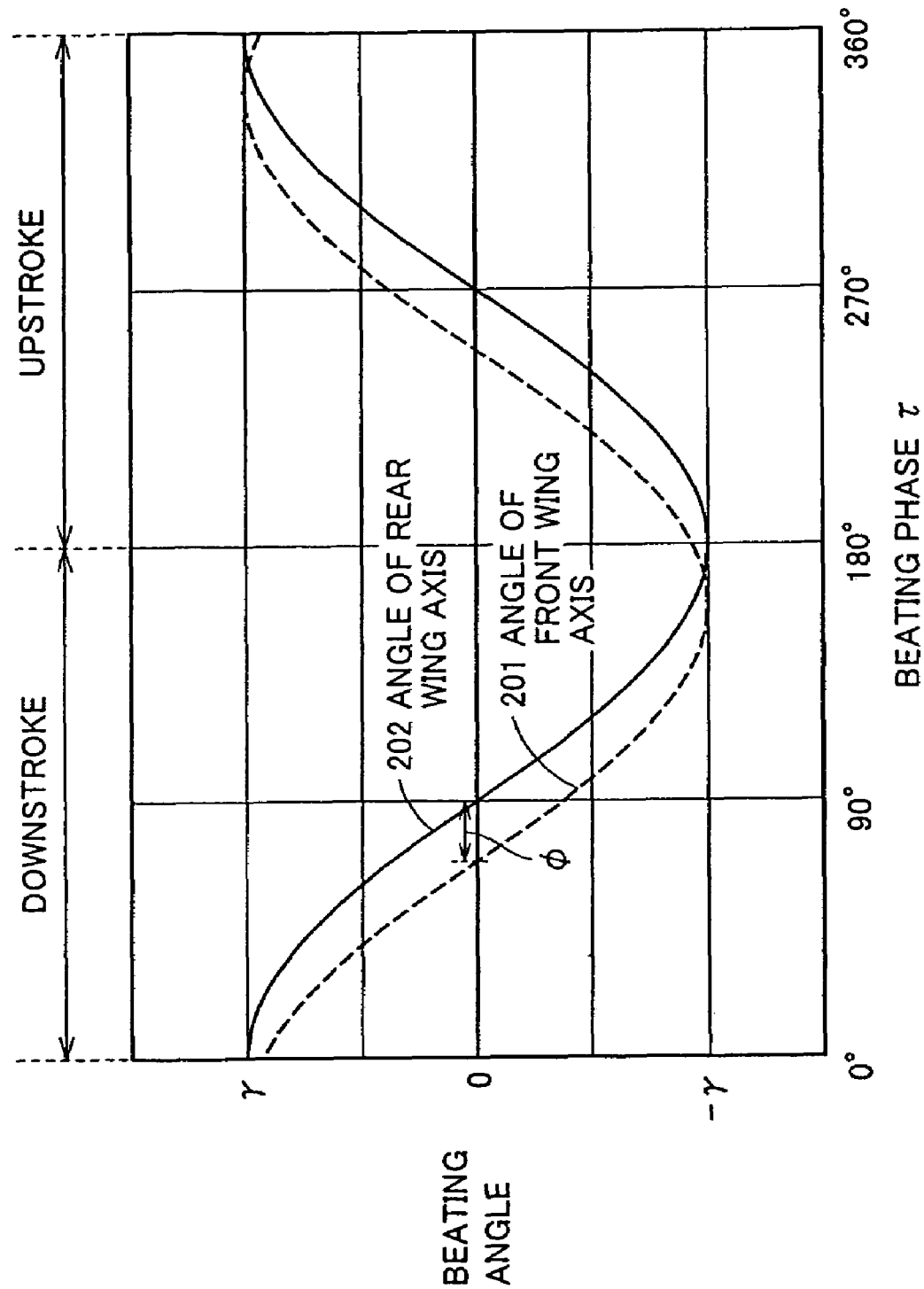
FIG. 44 is a graph representing a relation between beating motion and a phase of the beating motion, in said another embodiment.
Figure 45:
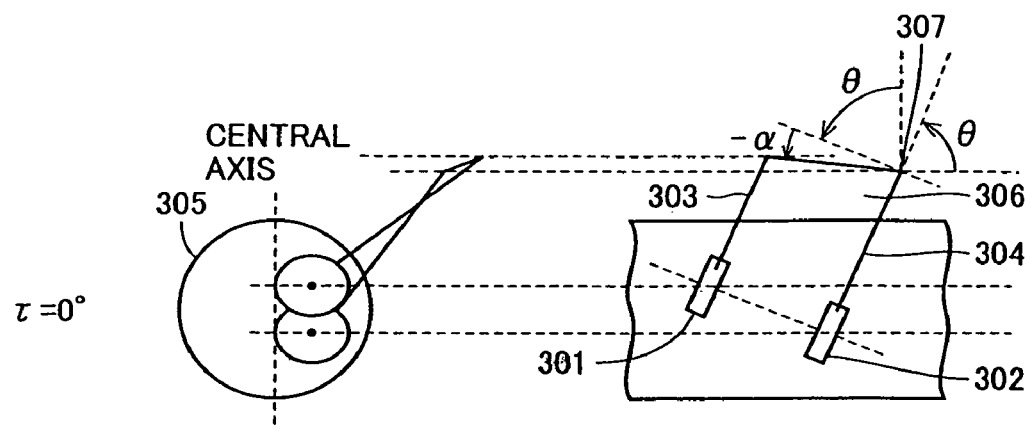
FIGS. 45 to 52 are illustrations showing the first to eighth states of fluttering operation of the fluttering sensing robot in accordance with another embodiment.
Figure 46:
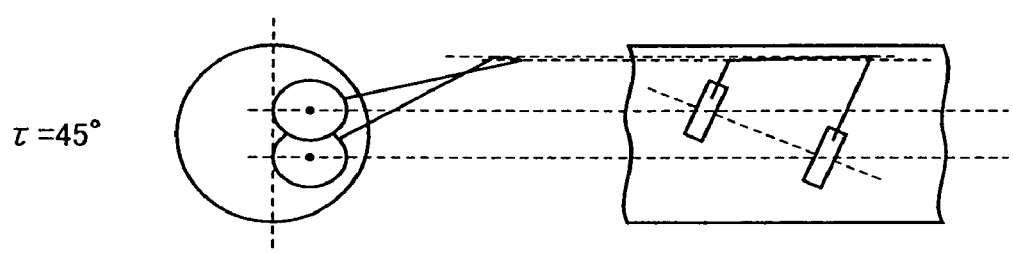
Figure 47:
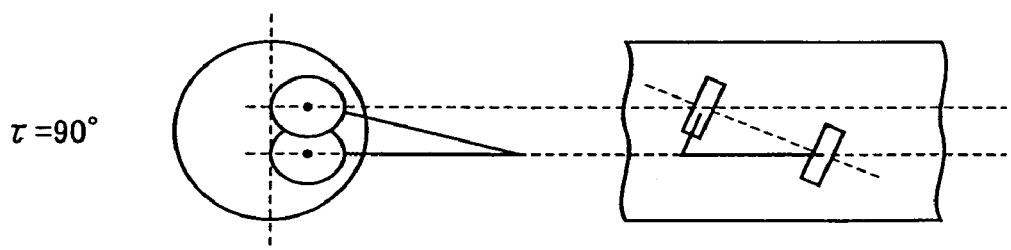
Figure 48:
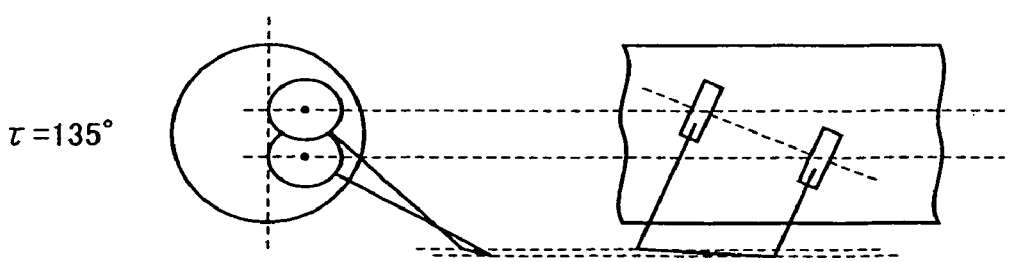
Figure 49:
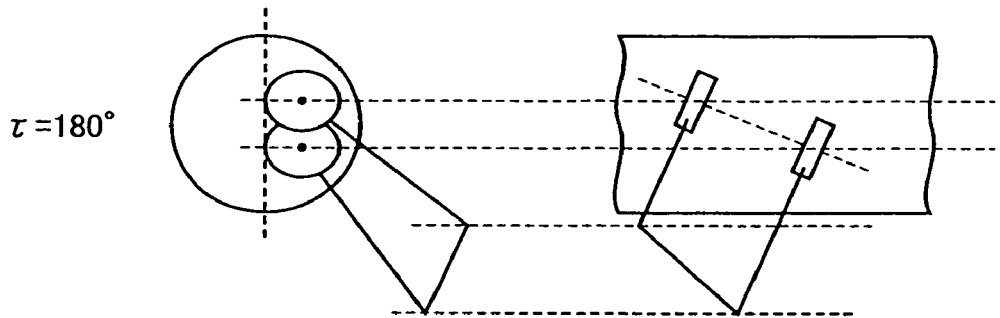
Figure 50:
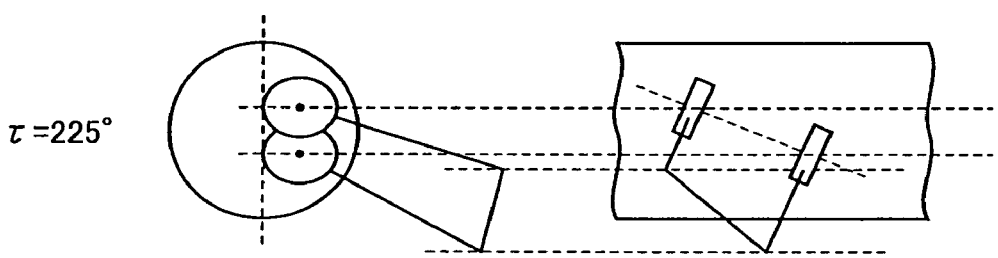
Figure 51:
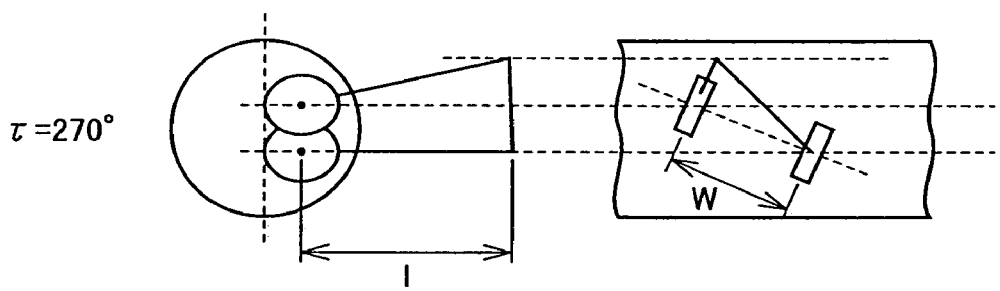
Figure 52:
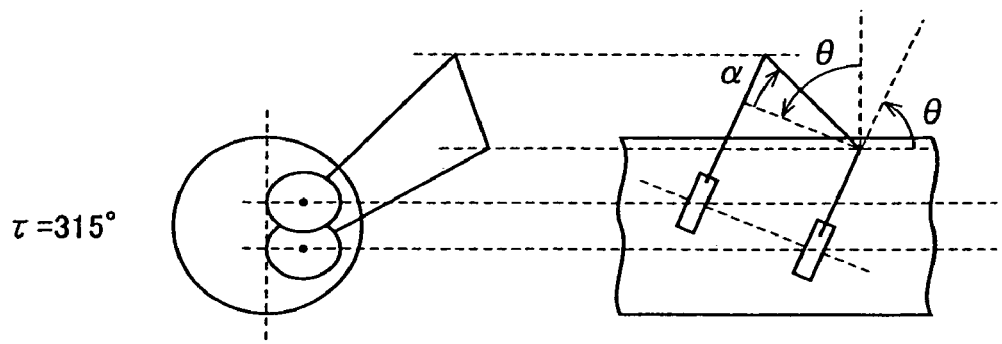

FIG. 43 shows the fluttering sensing robot having two wing shafts as the wing portion, in which the left side shows a front view of the fluttering sensing robot and the right side shows a left side view, viewed from the front face of the fluttering sensing robot.

Though only the left wing viewed from the front face of the fluttering apparatus is shown in FIG. 43, actually, a right wing is also formed in line symmetry with respect to the central axis of a main body 105. For simplicity of description, it is assumed that an axis (main body axis 801) along the direction of extension of main body 105 is in a horizontal plane, and that a central axis 802 passing through the center of gravity is kept in the vertical direction.

As can be seen from FIG. 43, on main body 105 of the fluttering apparatus, a wing (left wing) is formed, which has a front wing shaft 103 and a rear wing shaft 104 and a wing film 106 provided bridging across the front and rear wing shafts 103 and 104.

Further, a rotary actuator 101 for driving front wing shaft 103 and a rotary actuator 102 for driving rear wing shaft 104 are mounted on main body 105. Such an arrangement of actuators 101 and 102 as well as the shape of the wing including front wing shaft 103, rear wing shaft 104 and wing film 106 are not limited to those described herein, provided that the flight function is assured.

Further, in the fluttering sensing robot, when the cross sectional shape of the wing is adapted to protrude vertically upward, a reaction as well as lift are generated for the flight in the horizontal direction, resulting in larger buoyancy force.

The position of center of gravity of the fluttering sensing robot is set to be lower than the point of application of the force received by the wing from ambient fluid to the actuator, to enhance stability of the fluttering apparatus. When quick change of the attitude of the fluttering apparatus is of higher priority, it is desirable that the center of gravity and the point of application are substantially the same. In that case, difference of the force exerted by the fluid on the left and right wings necessary for attitude control becomes smaller, and hence change in attitude of the fluttering apparatus becomes easier.

Two rotary actuators 101 and 102 have a common axis of rotation 800. The axis of rotation 800 forms a prescribed angle (90°−θ) from the axis of the main body. Front (rear) wing shaft 103, 104 performs a reciprocating operation in a plane that orthogonally crosses the axis of rotation 800, with the actuator 101, 102 being a fulcrum. The angle formed by the plane orthogonally crossing the axis of rotation 800 and the axis 801 of the main body is the angle of elevation θ.

In order to ensure both mechanical strength and light weight, main body 105 should desirably be formed by polyethylene terephthalate (PET) molded to a cylindrical shape. The material and the shape, however, are not limiting.

An ultrasonic progressive wave actuator using a piezoelectric element is desirable as the actuators 101 and 102, as it has large activation torque, enables reciprocating operation in a simple manner and has a simple structure. Such an actuator is classified into two types, that is, rotary actuator and linear actuator. In the example shown in FIG. 43, rotary actuators are used.

A method of directly driving the wing by an ultrasonic element using progressive wave will be mainly discussed in the following. The mechanism for driving the wing and the type of the actuator used therefor, however, are not limited to those described with respect to the present embodiment.

Figure 53:
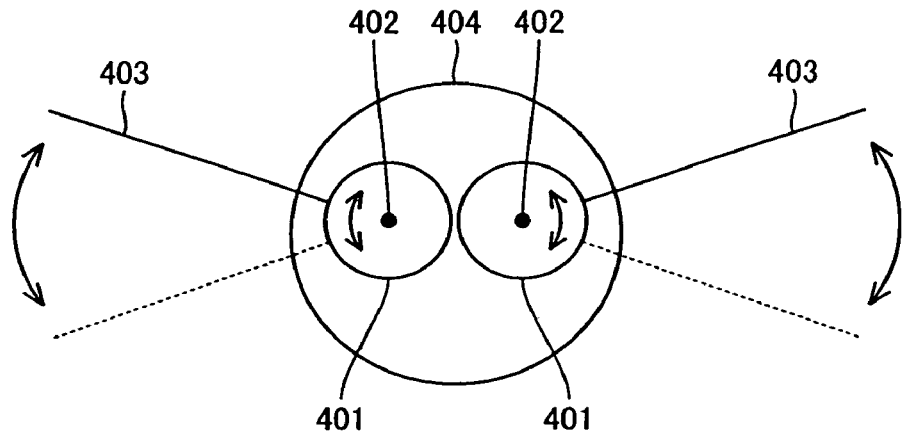
FIG. 53 is a schematic front view showing the fluttering sensing robot in accordance with a modification of said another embodiment.

As the rotary actuator, a rotary actuator 401 shown in FIG. 53, for example, may be used, other than the rotary actuators 101 and 102 shown in FIG. 43.

In the fluttering sensing robot shown in FIG. 53, a wing 403 is attached to a rotary actuator 401 mounted on main body 404. Wing 403 performs a reciprocating operation about the rotation axis 402 of rotary actuator 401.

Figure 54:
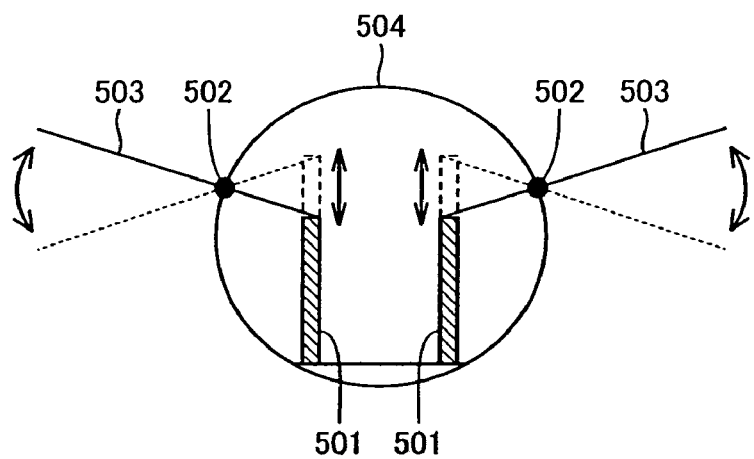
FIG. 54 is a schematic front view showing the fluttering sensing robot in accordance with another modification of said another embodiment.
Figure 55:
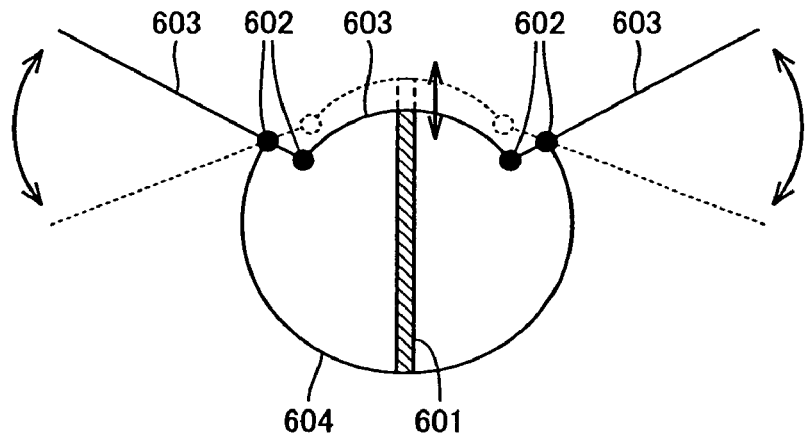
FIG. 55 is a schematic front view showing the fluttering sensing robot in accordance with a still further modification.

As a mechanism for driving the wing, a mechanism having an exoskeleton structure and a linear actuator combined, as described in Japanese Patent Laying-Open No. 5-1695675, may be applied to provide such a fluttering apparatus as shown in FIG. 54 or 55, for example.

In the fluttering sensing robot shown in FIG. 54, a front wing shaft or a rear wing shaft 503 is connected to one end of a linear actuator 501. Motion of linear actuator 501 is transmitted to the front or rear wing shaft 503 through a hinge 502 attached to main body 504, so that fluttering motion occurs. The fluttering motion is conceived from the fluttering motion of a dragonfly with the wing of which is directly driven by the muscle.

In the fluttering sensing robot shown in FIG. 55, the main body is divided into an upper main body 603 and a lower main body 604. Motion of a linear actuator fixed on lower main body 604 is transmitted to upper main body 603. The motion of upper main body 603 is transmitted to the front or rear wing shaft 603 through a hinge 602, and the fluttering motion occurs. This fluttering operation is conceived from the fluttering operation of a bee, not the dragonfly.

In the fluttering sensing robot shown in FIG. 55, the left and right wing shafts 603 are simultaneously driven by one actuator 601, and therefore, separate driving of left and right wing shafts is not possible. Therefore, delicate flight control is impossible. However, as the number of actuators can be reduced, weight and power consumption can be reduced.

In the fluttering sensing robot shown in FIG. 43, front wing shaft 103 and rear wing shaft 104 are respectively connected to rotary actuators 101 and 102. A wing film 106 is provided between the front and rear wing shafts 103 and 104. The wing film 106 has initial stress in a direction of contraction in its plane, which serves to enhance stiffness of the entire wing.

In order to reduce weight, front and rear wing shafts 103 and 104 are formed to have a hollow structure, from carbon graphite. Thus, the front and rear wing shafts 103 and 104 have elasticity, and front and rear wing shafts 103 and 104 are deformable by the tension of wing film 106.

Figure 56:
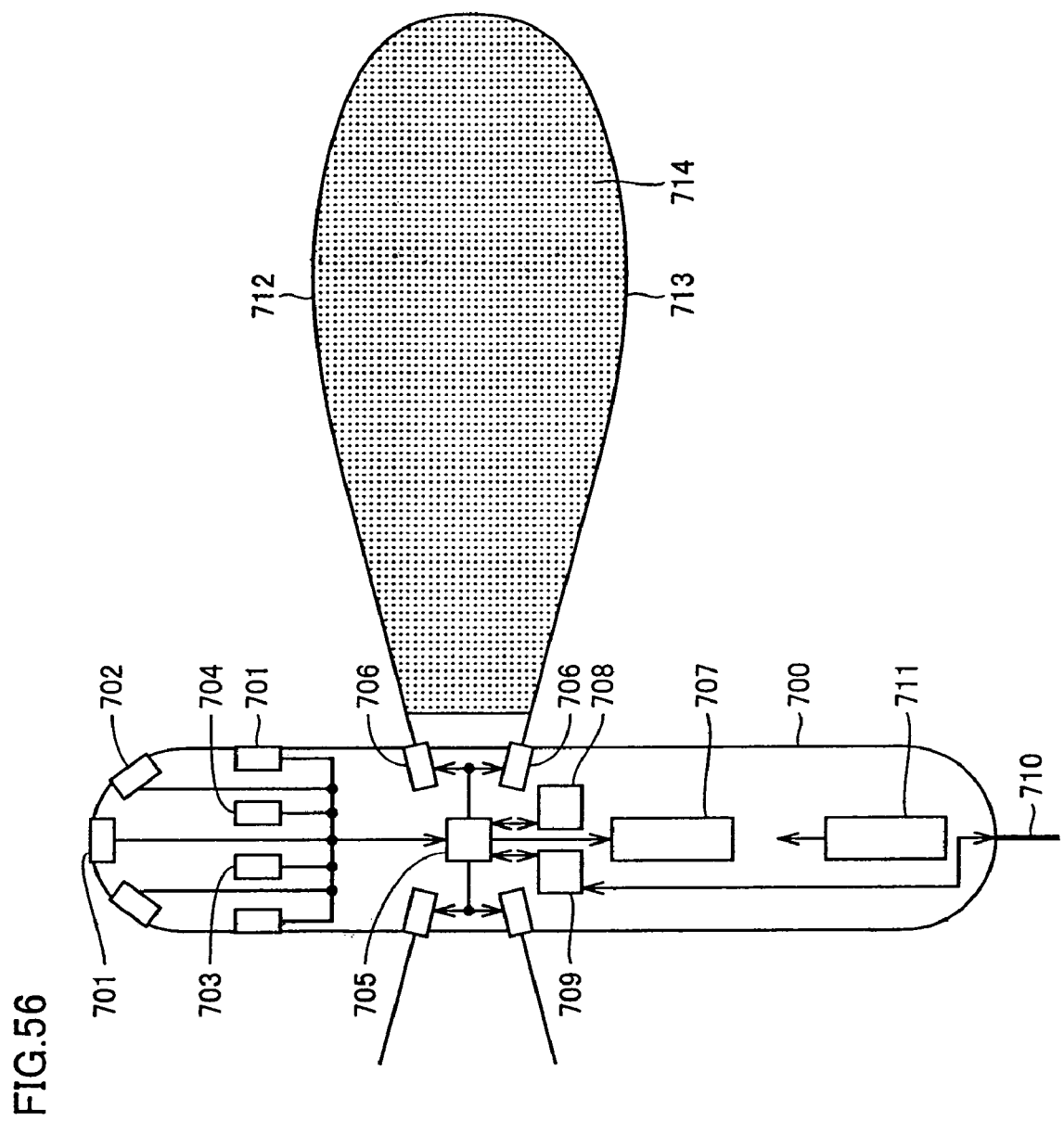
FIG. 56 is a schematic plan view showing a structure of the fluttering sensing robot in accordance with said another embodiment.

FIG. 56 shows an overall structure of the fluttering apparatus of the present invention. The wing on the left side along the direction of progress (upward on the sheet) is not shown. On a main body 700, an ultrasonic sensor 701, an infrared sensor 702, an acceleration sensor 703 and an angular acceleration sensor 704 are arranged. Results of detection by these sensors are transmitted to a fluttering control portion 705.

Fluttering control portion 705 processes information such as distance between the fluttering apparatus and an obstacle or a person near the apparatus, from the results detected by the ultrasonic sensor 701 or infrared sensor 702. Further, information such as the state of flight, target position or attitude of the fluttering apparatus is;processed from the results detected by acceleration sensor 703 or angular acceleration sensor 704, and driving control of left and right actuators 706 and a center of gravity control portion 707 is determined.

Though ultrasonic sensor 701 and infrared sensor 702 are used as means for detecting an obstacle existing around the fluttering sensing robot and acceleration sensor 703 and angular acceleration sensor 704 are used as means for detecting position and attitude of the fluttering sensing robot, the sensors are not limited to these, and any sensor that can measure environmental conditions, position and attitude of the present fluttering sensing robot may be used.

For example, the attitude of the fluttering apparatus can be calculated from acceleration information obtained by arranging two acceleration sensors capable of measuring acceleration in three axial directions orthogonally crossing with each other, arranged at different positions of main body 700. Further, it is possible to calculate position and attitude of the fluttering apparatus by providing a magnetic field distribution in the space in which the fluttering apparatus moves, and by detecting the magnetic field distribution by a magnetic sensor.

In FIG. 56, sensors represented by acceleration sensor 703 and angular acceleration sensor 704 are shown as components separate from fluttering control portion 705. In order to reduce weight, the sensors may be formed integrally with and on the same substrate as fluttering control portion 705 by micromachining technique, for example.

Though wing drive is open-loop controlled in the present fluttering apparatus, closed-loop control is also possible by providing an angle sensor of the wing at a root of the wing and using angle information obtained from the angle sensor.

When flow of the fluid in the space where the apparatus flies is known and flight is possible in accordance with a predetermined method of fluttering, the sensors listed above are not essential.

Fluttering control portion 705 is connected to a memory portion 708, and existing data necessary for fluttering control may be read from memory portion 708. Further, information obtained by sensors 701 to 704 may be fed to memory portion 708 and to rewrite information in memory portion 708 as needed, whereby the fluttering sensing robot may have learning function.

When the information obtained by sensors 701 to 704 is to be simply stored in memory portion 708, sensors 701 to 704 may be directly connected to memory portion 703, not through fluttering control portion 705. Alternatively, fluttering control portion 705 may be connected to communication control portion 709, for data input to/output from communication control portion 709. Communication control portion 709 transmits/receives data to/from an external apparatus (other fluttering apparatus, a base station or the like) through an antenna portion 710.

Such a communication function enables speedy transfer of data obtained by the fluttering sensing robot and stored in memory portion 708 to an external apparatus. Further, it is possible to receive from an external apparatus information that cannot be obtained by the fluttering sensing robot and to store such information in memory portion 708, so that such information can be used for fluttering control. Without storing a large amount of map information fully in the fluttering sensing robot, it is possible to obtain map information of a desired area as needed from a base station.

Though antenna portion 710 is shown as a bar protruding from an end of main body 700 in the example shown in FIG. 56, it may have any shape or arrangement provided that an antenna function is attained. For example, a loop shaped antenna may be formed on the wing, utilizing front wing shaft 712 or rear wing shaft 713. Alternatively, the antenna may be contained in main body 700, or the antenna and communication control portion 709 may be integrated.

Ultrasonic sensor 701, infrared sensor 702, acceleration sensor 703, angular acceleration sensor 704, fluttering control portion 705, left and right actuators 706, center of gravity control portion 707, memory portion 708, communication control portion 709 and antenna portion 710 are driven by a current supplied from a power supply portion 711.

Though electric power is used as driving energy, a internal combustion engine may be used. An actuator utilizing physiological oxidation-reduction reaction as can be seen in the muscle of insects may be used. Further, a method of obtaining energy for driving the actuator from the outside may be possible. For example, a therminoic element, an electromagnetic wave or the like may be used for the electric power.

(Method of Flight)

For simplicity of description, it is assumed that external force acting on the present fluttering sensing robot is only the fluid force received by the wing from the fluid and the gravity acting on the fluttering sensing robot (a product of the mass of the fluttering apparatus and gravitational acceleration). For the fluttering sensing robot to fly constantly, it is necessary that the following relation is satisfied in time average of one fluttering operation:

(vertically upward fluid force acting on the wing)>(gravity acting on the fluttering apparatus).

One fluttering operation means a down stroke of the wing followed by an up stroke of the wing.

For the robot to rise with the vertically upward fluid force being dominant, the following relation must be satisfied:

(vertically upward fluid force acting on the wing in a down stroke)>(vertically downward fluid force acting on the wing in an up stroke).

Here, a method by which the vertically upward fluid force acting on the wing in a down stroke (hereinafter referred to as "fluid force for down stroke") is made larger than the vertically downward fluid force acting on the wing in an up stroke (hereinafter referred to as "fluid force for an up stroke") will be described, which is a method of fluttering corresponding to but simplified from the manner of fluttering of an insect.

For simplicity of description, the behavior of the fluid or the force of the fluid on the wing will be described with reference to main components thereof. The magnitude of the buoyancy force obtained by the fluttering method and the gravity acting on the fluttering sensing robot (hereinafter referred to as "weight") will be described later.

In order to make the fluid force for a down stroke larger than the fluid force for an up stroke, the down stroke should be such that the volume of a space in which the wing film 106 moves in the down stroke is maximized. For this purpose, the wing film 106 should be moved downward approximately parallel to the horizontal plane, whereby almost maximum fluid force can be obtained.

By contrast, for the up stroke, the wing should be moved upward such that the volume of the space in which wing film 106 moves is minimized. For this purpose, the wing film 106 should be moved upward approximately at a right angle with respect to the horizontal plane, and the fluid force exerted on the wing is approximately minimized.

Thus, assume that wing shafts 103 and 104 are reciprocated by an angle $\gamma$ upward and downward with the position where the shafts are aligned approximately with the horizontal plane being the center, when the wing shafts 103 and 104 are reciprocated about the rotation axis 800 by rotary actuators 101 and 102. Further, the reciprocating motion of rear wing shaft 104 is adapted to be delayed by an appropriate phase $\phi$ from the reciprocating motion of the front wing shaft 103.

Accordingly, in the series of reciprocating motions of the wing shown in FIGS. 45 to 52 (representing an example where $\phi=20°$), front wing shaft 303 of rotary actuator 301 which is at a higher position is moved downward earlier in the down stroke shown in FIGS. 45 to 48, and therefore tip ends of front and rear wing shafts 303 and 304 and the wing film 306 come closer to horizontal.

In the up stroke shown in FIGS. 49 to 52, difference in height of the tip ends of wing shafts 303 and 304 increases and wing film 306 comes closer to vertical. As a result, the amount of fluid moved downward or upward by the wing film 306 spread across front and rear wing shafts 303 and 304 becomes different. In this fluttering sensing robot, the fluid force for the down stroke becomes larger than the fluid force for the up stroke, and hence buoyancy force is generated.

The vector of the buoyancy force inclines forward or backward by changing the phase difference φ. When it is inclined forward, the apparatus moves forward, when it is inclined backward, the apparatus moves backward and when it is directed directly upward, the apparatus hovers. In the actual flight, it is possible to control fluttering frequency f or fluttering angle γ, in addition to phase difference φ. Though fluttering elevation θ is fixed in the present fluttering apparatus, a function of changing this angle may be added to increase the degree of freedom.

(Fluttering Control)

The actual fluttering control will be described in greater detail. In the above described fluttering apparatus, the torsion angle α provided by the tip end of the wing in the down stroke or up stroke can be approximately represented by the following equation, where l represents wing length (length of the wing film along the front and rear wing shafts), w represents wing width (distance between front and rear wing shafts), γ represents fluttering angle, τ represents phase of the fluttering motion (the instant of highest up stroke being 0° and the lowest down stroke being 180°), and φ represents phase difference between the front and rear wing shafts (see FIGS. 45 to 47):

$$\tan \alpha = (w/l) \cdot [\sin(\gamma \cdot \cos \tau) - \sin\{\gamma \cdot \cos(\tau + \phi)\}]$$

Actually, the front and rear wing shafts are elastic and deformable, and therefore, the torsion angle α may vary to some extent. Further, the angle is smaller closer to the root of the wing shaft. For simplicity of description, the angle α in accordance with the above equation will be used for the following discussion.

Vertical component F of the fluid force acting on the wing free of torsion is approximately given by the following equation, where ρ represents density of the fluid, γ represents fluttering angle and f represents fluttering frequency.

$$F = (4/3) \cdot \pi^2 \rho w \gamma^2 f^2 l^3 \cdot \sin^2 \tau \cdot \cos(\gamma \cdot \cos \tau)$$

Horizontal component of the fluid force acting on the wing is canceled, when motions of the left and right wings are the same.

When the wing has a torsion angle of α, components L and D which are vertical and horizontal to the plane of fluttering motion, respectively, of the component f can be given by:

$$L = F \cdot \cos \alpha \cdot \sin \alpha$$

$$D = F \cdot \cos^2 \alpha$$

Considering elevation θ of fluttering, vertical component A that must be balanced with gravity and horizontal component J that will be the thrust of forward/backward motion are as follows:

For the down stroke $$A\downarrow = -L \cdot \cos \theta + D \cdot \sin \theta$$

$$J\downarrow = -L \cdot \sin \theta - D \cdot \cos \theta$$

For the up stroke $$A\uparrow = L \cdot \cos \theta - D \cdot \sin \theta$$

$$L\uparrow = L \cdot \sin \theta + D \cdot \cos \theta$$

Actual buoyancy or thrust is given as an integration of one period of the fluttering motion.

Figure 57:
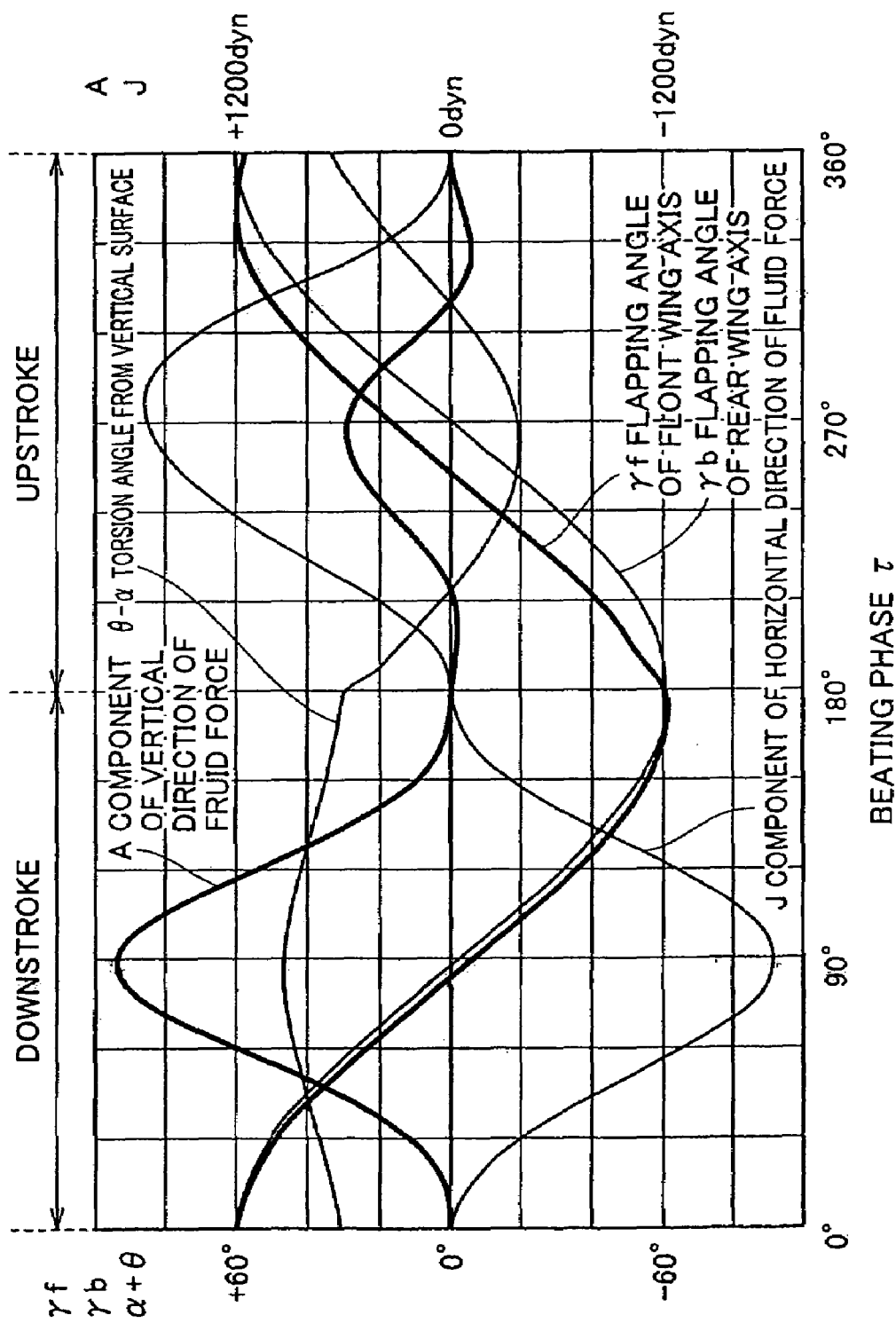
FIG. 57 is a first graph representing changes in force acting on the wing and the angle with respect to the beating phase, respectively, in said another embodiment.

Based on the foregoing, time change of the vertical component A and the horizontal component J together with the time change of angles are plotted in FIG. 57 as an example of flight control, where the length of the wing of the fluttering sensing robot 1=4 cm, wing width w=1 cm, fluttering elevation θ=30°, fluttering angle γ=60°, fluttering frequency f=50 Hz, phase difference for the down stroke θ↓=4° and phase difference for the up stroke θ↑=16°.

The abscissa represents the time corresponding to one period, as phase τ. The former half represents a down stroke and the latter half represents an up stroke. Curves of the graphs represent changes with time of fluttering angle γ f of the front wing shaft, fluttering angle γ b of the rear wing shaft, torsion angle of the wing from a horizontal plane (α+θ), and vertical and horizontal components A and J of the fluid force.

In this example, vertical component A of the fluid force per unit time is larger in the down stroke than in the up stroke, and therefore, one wing provides vertically upward fluid force of about 500 dyn as an average for one period. Namely, if the weight of the fluttering sensing robot is about 1 g or smaller, it can be lifted by two wings. The horizontal component J of the fluid force per unit time is almost cancelled in one period, and hence, a fluttering sensing robot having the weight of about 1 g can hover.

Here, when the phase difference for the down stroke φ↓ is made larger or when the phase difference for the up stroke φ↑ is made smaller, the apparatus can move forward. At this time, for horizontal forward movement, it is desired that the frequency f be reduced slightly. On the contrary, when the phase difference for the down stroke φ↓ is made smaller or the phase difference for the up stroke φ↑ is made larger, the apparatus can move backward. For horizontal backward movement, it is desired that the frequency f be increased slightly.

When the phase difference for the up stroke φ↑ is kept at 16° while the phase difference for the down stroke φ↓ is enlarged to 7°, or when the phase difference for the down stroke φ↓ is kept at 4° while the phase difference for the up stroke φ↑ is made smaller to 11° with the fluttering frequency f decreased to f=48 Hz, the fluttering sensing robot can move horizontally forward at the speed of 1 m in the initial 1 second.

When the phase difference for the up stroke φ↑ is kept at 16° and the phase difference for the down stroke φ↓ is made smaller to 1°, or when the phase difference for the down stroke φ↓ is kept at 4° while the phase difference for the up stroke φ↑ is enlarged to 24° with the fluttering frequency f increased to f=54 Hz, the robot can move horizontally backward at the speed of about 1 m for the initial 1 second.

In order to raise or lower the fluttering apparatus in the hovering state, the frequency f may be increased or decreased. During horizontal flight, upward movement and downward movement can be controlled mainly by the frequency f. By increasing the frequency f, the fluttering sensing robot moves upward, and by lowering frequency f, the fluttering sensing robot moves downward.

In the present example, the torsion angle α of the wing is slowly changed during an up stroke or a down stroke, in order to reduce load on the actuator. As the fluttering motion to obtain buoyancy, the torsion angle α may be set at a predetermined value during an up stroke or down stroke and the torsion angle α may be abruptly changed at the transition point from a down stroke to an up stroke or from an up stroke to the down stroke.

Figure 58:
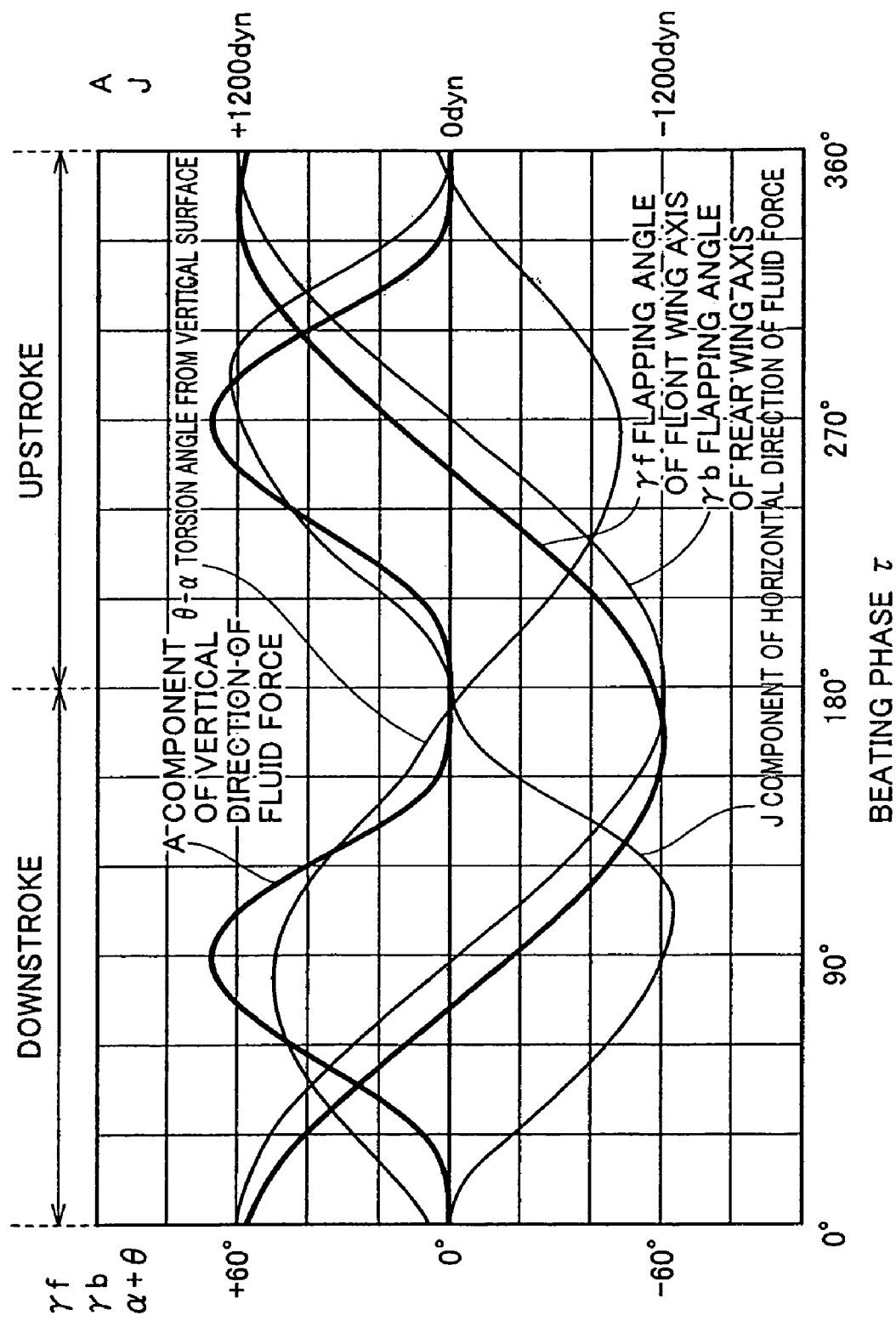
FIG. 58 is a second graph representing changes in the force acting on the wing and the angle with respect to the beating phase, in accordance with said another embodiment.

FIG. 58 shows change with time of the vertical component A and horizontal component J together with the change with time of the angles, where fluttering elevation θ=0°. This example shows a fluttering motion conceived from the hovering of a humming bird. Steering to the left or to the right may be realized by generating a difference in thrust of left and right wings, if it is possible to separately control fluttering motions of the left and right wings.

For example, when the apparatus is flying forward and is to be turned to the right, the fluttering angle γ of the right wing should be made smaller than that of the left wing, or phase difference between the front wing shaft and the rear wing shaft of the right wing is made larger than that of the left wing, or alternatively, the fluttering elevation θ of the right wing should be made smaller than the left wing, if the fluttering elevation θ is controllable. Thus, the thrust of the right wing becomes lower relative to the thrust of the left wing, and hence the robot can turn to the right. When the fluttering sensing robot is to be turned to the left, the control is opposite.

When separate control of the left and right wings is not possible as in the fluttering sensing robot shown in FIG. 55, a center of gravity control portion 707 that is mounted in the fluttering apparatus shown in FIG. 56 may be mounted in the present fluttering sensing robot so as to shift the center of gravity of the fluttering sensing robot to the left or to the right, to enable turning to the left or to the right.

For example, by shifting the center of gravity to the right, inclining the right wing downward and the left wing upward, and by increasing the frequency f, the fluttering sensing robot can turn to the right. By shifting the center of gravity to the left and by increasing the frequency f in the similar manner, the fluttering sensing robot can turn to the left. This method is also applicable when separate control of the two wings is possible. In any type of the fluttering sensing robot, it is desired that fluttering frequency f for the left be set to the same value as the fluttering frequency f for the right, so as to keep stable the attitude of the robot.

Though a group robot system having a fluttering sensing robot used as the sensing robot has been described in the two embodiments above, the robot is not limited thereto. Any robot may be used, including a remote controllable helicopter, a humanoid robot that works with two legs, or a group robot in the shape of fish may be used, provided that the base station can control operation, detection of an object, communication and the like of the robot as a group robot system.

Finally, the structure and effects obtained thereby of the fluttering sensing robot (or fluttering pheromone robot) used in the group robot system of the present embodiments will be summarized.

The fluttering sensing robot in accordance with the present embodiments includes a flying body including a wing portion for flying in a space where a fluid exists, a driving portion and a main body. The driving portion causes a down stroke by which the wing portion is moved downward from above, and an up stroke by which the wing portion moves upward from below. The wing portion is attached to the main body, and the driving portion is mounted on the main body. As a time average of the series of down stroke and up stroke operations, vertically upward force among the forces exerted by the fluid to the wing portion becomes larger than the gravity acting on the flying body.

By this structure, as a time average from the down stroke to the up stroke of fluttering operation of the wing portion, vertically upward force among the forces exerted by the fluid on the wing portion becomes larger than the gravity acting on the flying body, and hence buoyancy acts on the flying body. As a result, the flying body can move without touching the ground.

For buoyancy to act on the flying body, it is desirable that the volume of a space in which the wing portion moves in the down stroke is larger than the volume of the space in which the wing moves in the up stroke. When the buoyancy is balanced with the gravity acting on the flying body, hovering becomes possible, that is, the device can stay in the air apart from the ground.

It is desirable that the flying body is used as moving means for performing a prescribed work indoors, or moving means for performing prescribed work outdoors.

As the flying body obtains buoyancy and can move apart from the ground, it can move in a house where there are various and many objects such as pieces of furniture of which positions are changed with time, while avoiding such obstacles. Thus it can easily perform prescribed work such as monitoring the condition of each room. When used outdoors, the flying body can move freely without any influence of obstacles at a disaster site or geography of general field, for example, and it can easily perform a prescribed work such as information collection.

Specifically, the wing portion has a wing body and a wing shaft supporting the wing body. Desirably, the driving portion changes a torsion angle formed by a tip end portion of the wing body and a phantom prescribed reference plane, by driving the wing shaft.

Thus, magnitude or direction of the fluid force exerted by the fluid on the wing portion changes, so that the flying body can move upward, downward, forward or backward.

In order to make the volume of the space in which the wing portion moves in a down stroke larger than the volume of the space in which the wing portion moves in an up stroke, it is necessary for the driving portion to make different the torsion angle for the down stroke and the torsion angle for the up stroke.

Further, it is desirable that the driving portion changes with time the torsion angle.

This enables smooth change of the attitude of the wing portion, avoiding abrupt action of the fluid force on the wing portion.

The wing shaft includes one wing shaft and the other wing shaft, the wing body includes a film formed bridging between the one wing shaft and the other wing shaft, and it is desirable for the driving portion to drive one wing shaft and the other wing shaft separately.

Here, by driving the one wing shaft and the other wing shaft separately, the torsion angle can easily be changed.

Desirably, the wing shaft performs a reciprocating operation on a phantom plane with the driving portion being a fulcrum, the main body extends in one direction, and an elevation formed by the direction of extension of the main body and the phantom plane is variable.

Here, the degree of freedom of fluttering motion becomes higher, realizing more complicated fluttering motion. By increasing the elevation and controlling torsion angle, flight at higher speed becomes possible. By making the elevation substantially 0°, hovering with high maneuverability like a humming bird becomes possible.

Specifically, it is desired that the wing portion has a main shaft and a wing body formed from the main shaft in a direction approximately orthogonal to the direction of extension of the main shaft, and that the driving portion changes torsion angle formed by a phantom plane in contact with the wing body and a prescribed phantom reference plane including the main shaft, by driving the main shaft.

Thus, magnitude or direction of the fluid force exerted by the fluid on the wing portion is changed, so that the flying body can move upward, downward, forward or backward.

In order to change the attitude of the wing portion by such a main shaft, it is desirable that the driving portion includes an actuator having at least three degrees of freedom.

Desirably, the wing portion is formed on one side and the other side of approximately the center of the main body, and that the driving portion drives the wing portion formed on one side and the wing portion formed on the other side separately.

Here, the attitude of the wing portion formed one side and the wing portion formed on the other side can be changed separately, and hence the direction of the flying body can be changed easily.

Further, it is desirable that the apparatus further includes a sensor portion for grasping environmental conditions, a memory portion for storing information, or a communication portion for transmitting/receiving information.

When a sensor portion is provided, it becomes possible to obtain information of position, attitude or velocity of the flying body, position or moving velocity of obstacles around the flying body, or environmental information such as temperature or brightness, enabling more appropriate fluttering control. When a memory portion is provided, it becomes possible to store the obtained environmental information, and therefore, the flying body comes to have learning function. When a communication portion is provided, information can be exchanged between a plurality of flying bodies and a base station, and by exchanging the obtained information, coordinated activity between each of the plurality of flying bodies can readily be realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sensing robot searching for an object under control by a base station, wherein
a plurality of said sensing robots are used for searching for said object, and each of said plurality of sensing robots can be controlled by said base station such that manner related to searching of said object by each of said plurality of sensing robots differs in accordance with distance from said base station.

2. A sensing robot searching for an object under control by a base station, used in a robot system in which communication system is set to have a hierarchical structure having said base station as an uppermost layer and a plurality of layers formed by a plurality of said sensing robots,
said sensing robot having a function of transmitting information related to searching of said object from the sensing robot belonging to a layer lower than itself to an upper layer of said hierarchical structure, and a function of transmitting information related to operation of the sensing robot belonging to a layer lower than itself to one layer lower than said hierarchical structure, and
said sensing robot being controllable by said base station such that, when said object is searched for, manner of searching of said object of each of said plurality of sensing robots differ layer by layer of said hierarchical structure.

3. A sensing robot searching for an object under control by a base station, controlled by said base station such that manner related to searching of said object by sensing robot is changed stage by stage of searching of said object.

4. A sensing robot searching for an object under control by a base station, wherein
when a plurality of said sensing robots search for said object, the sensing robots are controlled by said base station such that the sensing robots search for said object by moving along with movement of said base station, while maintaining tolerable range of positional relation with said base station.

5. A sensing robot used for searching for an object under control by a base station, wherein
when a plurality of said sensing robots search for said object, the manner related to searching of said object is controlled differently from other sensing robots.

* * * * *